US007243131B1

(12) United States Patent
Inoue

(10) Patent No.: US 7,243,131 B1
(45) **Date of Patent: *Jul. 10, 2007**

(54) INFORMATION PROCESSING SYSTEM USING REMOTE CONTROL, WITH DEVICE AND METHOD THEREFOR

(75) Inventor: Hiraku Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/600,236

(22) PCT Filed: Nov. 17, 1999

(86) PCT No.: PCT/JP99/06411

§ 371 (c)(1), (2), (4) Date: Jul. 13, 2000

(87) PCT Pub. No.: WO00/30104

PCT Pub. Date: May 25, 2000

(30) Foreign Application Priority Data

Nov. 17, 1998 (JP) ................................ 10/327018

(51) Int. Cl.
*G06F 15/167* (2006.01)

(52) U.S. Cl. ....................... 709/208; 709/210; 709/213

(58) Field of Classification Search ................ 709/219, 709/253, 208, 209, 210; 710/108, 110, 313, 710/200

See application file for complete search history.

(56) References Cited

U.S. PATENT DOCUMENTS 5,802,017 A * 9/1998 Sato et al. ..................... 369/2
5,887,194 A * 3/1999 Carson et al. ................ 710/36
6,141,702 A * 10/2000 Ludtke et al. ................. 710/5
6,321,308 B1 * 11/2001 Arnon et al. ............... 711/147
6,496,896 B1 * 12/2002 Inoue ......................... 710/306
6,630,889 B1 * 10/2003 Morikawa .............. 340/825.72
6,665,020 B1 * 12/2003 Stahl et al. ................. 348/552
6,910,086 B1 * 6/2005 Inoue et al. ................ 710/110

FOREIGN PATENT DOCUMENTS

| | | |
|---|---|---|
| EP | 0 898 278 A2 | 2/1999 |
| JP | 8-55080 | 2/1996 |
| JP | 9-128888 | 5/1997 |
| JP | 11-39791 | 2/1999 |
| WO | WO 98/17033 | 4/1998 |
| WO | WO 9817033 A1 * | 4/1998 |
| WO | WO 98/27767 | 6/1998 |

OTHER PUBLICATIONS

Martin, T.W., "1394:High-Performance Serial Bus for Desktop and Portable Computers," Computer Technology Review, Westworld Production, vol. 14, No. 6, Jun. 1, 1994, Beverly Hill, CA.
Printer Working Group C et al., "PWG-C Proposal to the 1394 Trade Association AV WG: AV/C Managed Asynchronous Serial Bus Connections," Internet Citation, Jul. 7, 1998.
George Penokie: "Persistent Reservations," Internet Citation, Nov. 4, 1998.
Irlenbusch et al., "Towards a resillient shared memory concept for distributed persistent object systems," System Sciences, vol. III, Proceedings of the Twenty-Eighth Hawaii International Conference on Wailea, HI, 1995.
European Search Report dated Nov. 16, 2006.

* cited by examiner

*Primary Examiner*—Patrice Winder
(74) *Attorney, Agent, or Firm*—Finnegan, Henderson, Farabow, Garrett & Dunner, L.L.P.

(57) ABSTRACT

A personal computer that is a controller transmits a reserve request for reserving a remote control. An MD recorder/player that is a target sets a reserve mode corresponding to the reserve request. The MD recorder/player prohibits another controller from performing a remote control by another controller. In addition, the MD recorder/player prohibits local key operations other than reproduction keys, a stop key, and an eject key. Thus, only the personal computer can perform an operation control for updating management information of the MD recorder/player. Thus, a mismatch of management information due to a remote control of another controller and a local key operation can be prevented.

50 Claims, 59 Drawing Sheets

OPERATION OF INTERACTIVE CHANGEOVER KEY 307

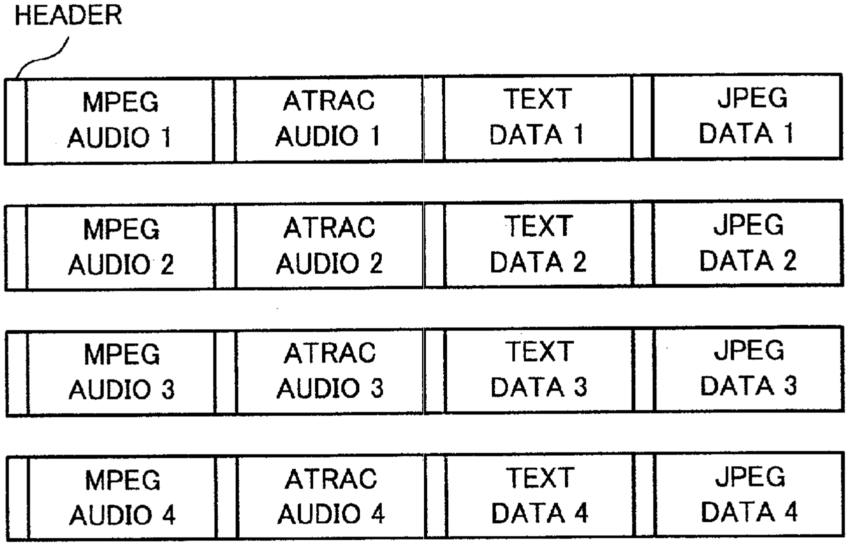
Fig. 7A
Fig. 7B
Fig. 7C
Fig. 7D
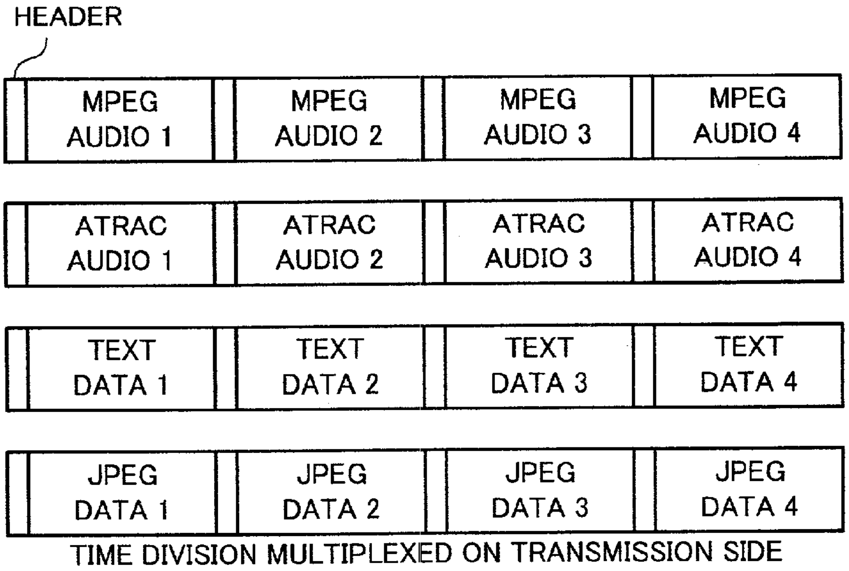
Fig. 7E
Fig. 7F
Fig. 7G
Fig. 7H ROOT DIRECTORY
(SERVICE GATEWAY)
DIRECTORY
FILE
FILE
FILE
Stream
FILE
Stream Event
BIOP MESSAGE
(OBJECT)

Service Gateway
DIRECTORY
FILE
Stream
Stream Event
MODULE

BIOP HEADER
DIVIDED INTO BLOCKS

BLOCK
DDB
DSI
DIJ

CONVERSION INTO DSM-CC SECTION

CARROUSEL
TRANSMITTED

Fig. 15A

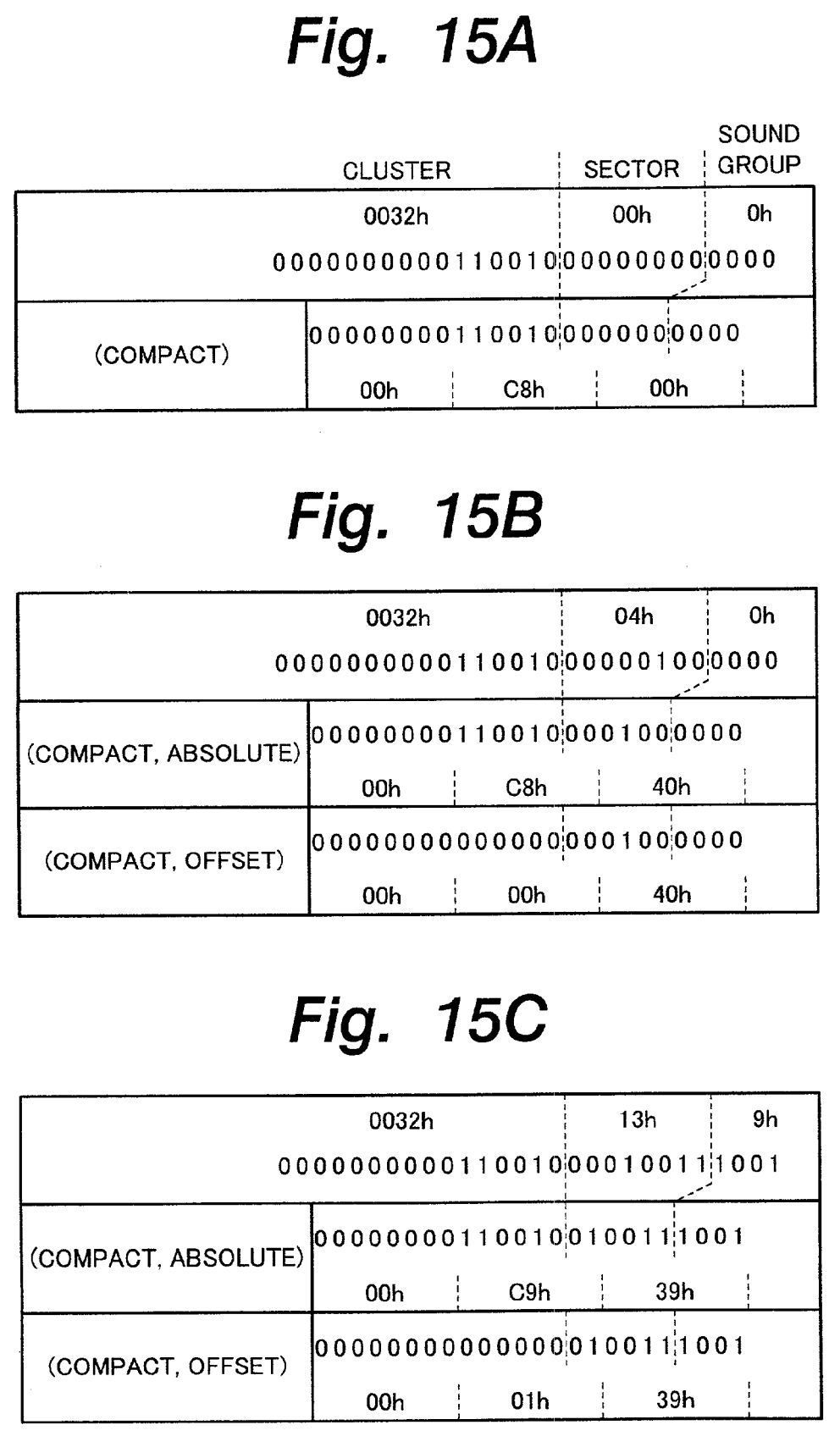

| | CLUSTER | SECTOR | SOUND GROUP |
|---|---|---|---|
| | 0032h<br>0000000000110010 | 00h<br>00000000 | 0h<br>0000 |
| (COMPACT) | 000000001100100000000000<br>00h \| C8h \| 00h | | |

Fig. 15B

| | | | |
|---|---|---|---|
| | 0032h<br>0000000000110010 | 04h<br>00000100 | 0h<br>0000 |
| (COMPACT, ABSOLUTE) | 000000001100100001000000<br>00h \| C8h \| 40h | | |
| (COMPACT, OFFSET) | 000000000000000001000000<br>00h \| 00h \| 40h | | |

Fig. 15C

| | | | |
|---|---|---|---|
| | 0032h<br>0000000000110010 | 13h<br>00010011 | 9h<br>1001 |
| (COMPACT, ABSOLUTE) | 000000001100100100111001<br>00h \| C9h \| 39h | | |
| (COMPACT, OFFSET) | 000000000000000100111001<br>00h \| 01h \| 39h | | |

Fig. 17

| | | 16bit | | 16bit | | |
|---|---|---|---|---|---|---|
| | | MSB LSB | MSB LSB | MSB LSB | MSB LSB | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | Sector (00h) | MODE (02h) | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used sectors | 8 |
| | | 00000000 | 00000000 | 00000000 | 00000000 | 9 |
| | | 00000000 | 00000000 | 00000000 | Disc serial No. | 10 |
| POINTER PORTION | | Disc | ID | P-DFA | P-EMPTY | 11 |
| POINTER PORTION | | P-FRA | P-TNO1 | P-TNO2 | P-TNO3 | 12 |
| POINTER PORTION | | P-TNO4 | P-TNO5 | P-TNO6 | P-TNO7 | 13 |
| POINTER PORTION | | | | | | |
| POINTER PORTION | | P-TNO248 | P-TNO249 | P-TNO250 | P-TNO251 | 74 |
| POINTER PORTION | | P-TNO252 | P-TNO253 | P-TNO254 | P-TNO255 | 75 |
| | | 00000000 | 00000000 | 00000000 | 00000000 | 76 |
| | | 00000000 | 00000000 | 00000000 | 00000000 | 77 |
| TABLE PORTION (255 PART TABLES) | (01h) | START ADDRESS | (TRACK ADDRESS) | | TRACK MODE | 78 |
| TABLE PORTION (255 PART TABLES) | | END ADDRESS | | | LINK INFO. | 79 |
| TABLE PORTION (255 PART TABLES) | (02h) | START ADDRESS | (TRACK ADDRESS) | | TRACK MODE | 80 |
| TABLE PORTION (255 PART TABLES) | | END ADDRESS | | | LINK INFO. | 81 |
| TABLE PORTION (255 PART TABLES) | (03h) | START ADDRESS | (TRACK ADDRESS) | | TRACK MODE | 82 |
| TABLE PORTION (255 PART TABLES) | | END ADDRESS | | | LINK INFO. | 83 |
| TABLE PORTION (255 PART TABLES) | | | | | | |
| TABLE PORTION (255 PART TABLES) | (FCh) | START ADDRESS | (TRACK ADDRESS) | | TRACK MODE | 580 |
| TABLE PORTION (255 PART TABLES) | | END ADDRESS | | | LINK INFO. | 581 |
| TABLE PORTION (255 PART TABLES) | (FDh) | START ADDRESS | (TRACK ADDRESS) | | TRACK MODE | 582 |
| TABLE PORTION (255 PART TABLES) | | END ADDRESS | | | LINK INFO. | 583 |
| TABLE PORTION (255 PART TABLES) | (FEh) | START ADDRESS | (TRACK ADDRESS) | | TRACK MODE | 584 |
| TABLE PORTION (255 PART TABLES) | | END ADDRESS | | | LINK INFO. | 585 |
| TABLE PORTION (255 PART TABLES) | (FFh) | START ADDRESS | (TRACK ADDRESS) | | TRACK MODE | 586 |
| TABLE PORTION (255 PART TABLES) | | END ADDRESS | | | LINK INFO. | 587 |

U-TOC, SECTOR 0

Fig. 19

| | | 16bit | | 16bit | | |
|---|---|---|---|---|---|---|
| | | MSB LSB | MSB LSB | MSB LSB | MSB LSB | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | Sector(01h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER PORTION | | 00000000 | 00000000 | 00000000 | P-EMPTY | 11 |
| POINTER PORTION | | 00000000 | P-TNA1 | P-TNA2 | P-TNA3 | 12 |
| POINTER PORTION | | P-TNA4 | P-TNA5 | P-TNA6 | P-TNA7 | 13 |
| POINTER PORTION | | P-TNA248 | P-TNA249 | P-TNA250 | P-TNA251 | 74 |
| POINTER PORTION | | P-TNA252 | P-TNA253 | P-TNA254 | P-TNA255 | 75 |
| SLOT PORTION, 255 + 1 SLOTS | (00h) | DISC NAME | | | | 76 |
| SLOT PORTION, 255 + 1 SLOTS | | DISC NAME | | | LINK INFO. | 77 |
| SLOT PORTION, 255 + 1 SLOTS | (01h) | DISC NAME/TRACK NAME | | | | 78 |
| SLOT PORTION, 255 + 1 SLOTS | | DISC NAME/TRACK NAME | | | LINK INFO. | 79 |
| SLOT PORTION, 255 + 1 SLOTS | (02h) | DISC NAME/TRACK NAME | | | | 80 |
| SLOT PORTION, 255 + 1 SLOTS | | DISC NAME/TRACK NAME | | | LINK INFO. | 81 |
| SLOT PORTION, 255 + 1 SLOTS | (03h) | DISC NAME/TRACK NAME | | | | 82 |
| SLOT PORTION, 255 + 1 SLOTS | | DISC NAME/TRACK NAME | | | LINK INFO. | 83 |
| SLOT PORTION, 255 + 1 SLOTS | (FEh) | DISC NAME/TRACK NAME | | | | 584 |
| SLOT PORTION, 255 + 1 SLOTS | | DISC NAME/TRACK NAME | | | LINK INFO. | 585 |
| SLOT PORTION, 255 + 1 SLOTS | (FFh) | DISC NAME/TRACK NAME | | | | 586 |
| SLOT PORTION, 255 + 1 SLOTS | | DISC NAME/TRACK NAME | | | LINK INFO. | 587 |

U-TOC, SECTOR 1

Fig. 20

| | | 16bit | | 16bit | | |
|---|---|---|---|---|---|---|
| | | MSB LSB | MSB LSB | MSB LSB | MSB LSB | |
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | Cluster H | Cluster L | Sector(02h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER PORTION | | 00000000 | 00000000 | 00000000 | P-EMPTY | 11 |
| | | 00000000 | P-TRD1 | P-TRD2 | P-TRD3 | 12 |
| | | P-TRD4 | P-TRD5 | P-TRD6 | P-TRD7 | 13 |
| | | ... | ... | ... | ... | |
| | | P-TRD248 | P-TRD249 | P-TRD250 | P-TRD251 | 74 |
| | | P-TRD252 | P-TRD253 | P-TRD254 | P-TRD255 | 75 |
| SLOT PORTION, 255 + 1 SLOTS | (00h) | DISC RECORD DATE/TIME | | | | 76 |
| | | | | MAKER CODE | MODEL CODE | 77 |
| | (01h) | TRACK RECORD DATE/TIME | | | | 78 |
| | | | | MAKER CODE | MODEL CODE | 79 |
| | (02h) | TRACK RECORD DATE/TIME | | | | 80 |
| | | | | MAKER CODE | MODEL CODE | 81 |
| | (03h) | TRACK RECORD DATE/TIME | | | | 82 |
| | | | | MAKER CODE | MODEL CODE | 83 |
| | | ... | ... | ... | ... | |
| | (FEh) | TRACK RECORD DATE/TIME | | | | 584 |
| | | | | MAKER CODE | (LINK INFO.) | 585 |
| | (FFh) | TRACK RECORD DATE/TIME | | | | 586 |
| | | | | MAKER CODE | (LINK INFO.) | 587 |

U-TOC, SECTOR 2

Fig. 21

| | | 16bit | | 16bit | | |
|---|---|---|---|---|---|---|
| | | MSB LSB | MSB LSB | MSB LSB | MSB LSB | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | Sector(04h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | CHARACTER CODE | 10 |
| | | 00000000 | 00000000 | 00000000 | P-EMPTY | 11 |
| POINTER PORTION | | 00000000 | P-TNA1 | P-TNA2 | P-TNA3 | 12 |
| POINTER PORTION | | P-TNA4 | P-TNA5 | P-TNA6 | P-TNA7 | 13 |
| POINTER PORTION | | P-TNA248 | P-TNA249 | P-TNA250 | P-TNA251 | 74 |
| POINTER PORTION | | P-TNA252 | P-TNA253 | P-TNA254 | P-TNA255 | 75 |
| SLOT PORTION, 255 + 1 SLOTS | (00h) | DISC NAME | | | | 76 |
| SLOT PORTION, 255 + 1 SLOTS | | DISC NAME | | | LINK INFO. | 77 |
| SLOT PORTION, 255 + 1 SLOTS | (01h) | DISC NAME/TRACK NAME | | | | 78 |
| SLOT PORTION, 255 + 1 SLOTS | | DISC NAME/TRACK NAME | | | LINK INFO. | 79 |
| SLOT PORTION, 255 + 1 SLOTS | (02h) | DISC NAME/TRACK NAME | | | | 80 |
| SLOT PORTION, 255 + 1 SLOTS | | DISC NAME/TRACK NAME | | | LINK INFO. | 81 |
| SLOT PORTION, 255 + 1 SLOTS | (03h) | DISC NAME/TRACK NAME | | | | 82 |
| SLOT PORTION, 255 + 1 SLOTS | | DISC NAME/TRACK NAME | | | LINK INFO. | 83 |
| SLOT PORTION, 255 + 1 SLOTS | (FEh) | DISC NAME/TRACK NAME | | | | 584 |
| SLOT PORTION, 255 + 1 SLOTS | | DISC NAME/TRACK NAME | | | LINK INFO. | 585 |
| SLOT PORTION, 255 + 1 SLOTS | (FFh) | DISC NAME/TRACK NAME | | | | 586 |
| SLOT PORTION, 255 + 1 SLOTS | | DISC NAME/TRACK NAME | | | LINK INFO. | 587 |

U-TOC, SECTOR 4

Fig. 22

| | 16 bit even m | | 16 bit odd m | | |
|---|---|---|---|---|---|
| | Wm B | Wm A | Wm B | Wm A | |
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | Cluster H | Cluster L | Sector(00h) | MODE(02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | (00h) | (00h) | 7 |
| | Used Sector 3 | Used Sector 2 | Used Sector 1 | Used Sector 0 | 8 |
| | (00h) | (00h) | (00h) | (00h) | 9 |
| | (00h) | (00h) | (00h) | (00h) | 10 |
| POINTER PORTION | (00h) | (00h) | (00h) | (P-EMPTY) | 11 |
| POINTER PORTION | (P-BLANK) | (00h) | (00h) | (00h) | 12 |
| | (00h) | (00h) | (00h) | (00h) | 13 |
| | (00h) | (00h) | (00h) | (00h) | 14 |
| | (00h) | (00h) | (00h) | (00h) | 15 |
| | (00h) | (00h) | (00h) | (00h) | 16 |
| | | | | | |
| | | | | | |
| | (00h) | (00h) | (00h) | (00h) | 74 |
| | (00h) | (00h) | (00h) | (00h) | 75 |
| | (00h) | (00h) | (00h) | (00h) | 76 |
| | (00h) | (00h) | (00h) | (00h) | 77 |
| TABLE PORTION (99 PART TABLES) (01h) | Start address | | | (00h) | 78 |
| | End address | | | LINK INFO. | 79 |
| (02h) | Start address | | | (00h) | 80 |
| | End address | | | LINK INFO. | 81 |
| (03h) | Start address | | | (00h) | 82 |
| | End address | | | LINK INFO. | 83 |
| (04h) | Start address | | | (00h) | 84 |
| | End address | | | LINK INFO. | 85 |
| ⋮ | | | | | 86 |
| (63h) | Start address | | | (00h) | 274 |
| | End address | | | LINK INFO. | 275 |
| (64h) | (zeros) | | | | 276 |
| ⋮ | (zeros) | | | | 277 |
| | (zeros) | | | | |
| (FFh) | (zeros) | | | | 586 |
| | (zeros) | | | | 587 |

AUX-TOC, SECTOR 0 (AREA ALLOCATION TABLE)

Fig. 23

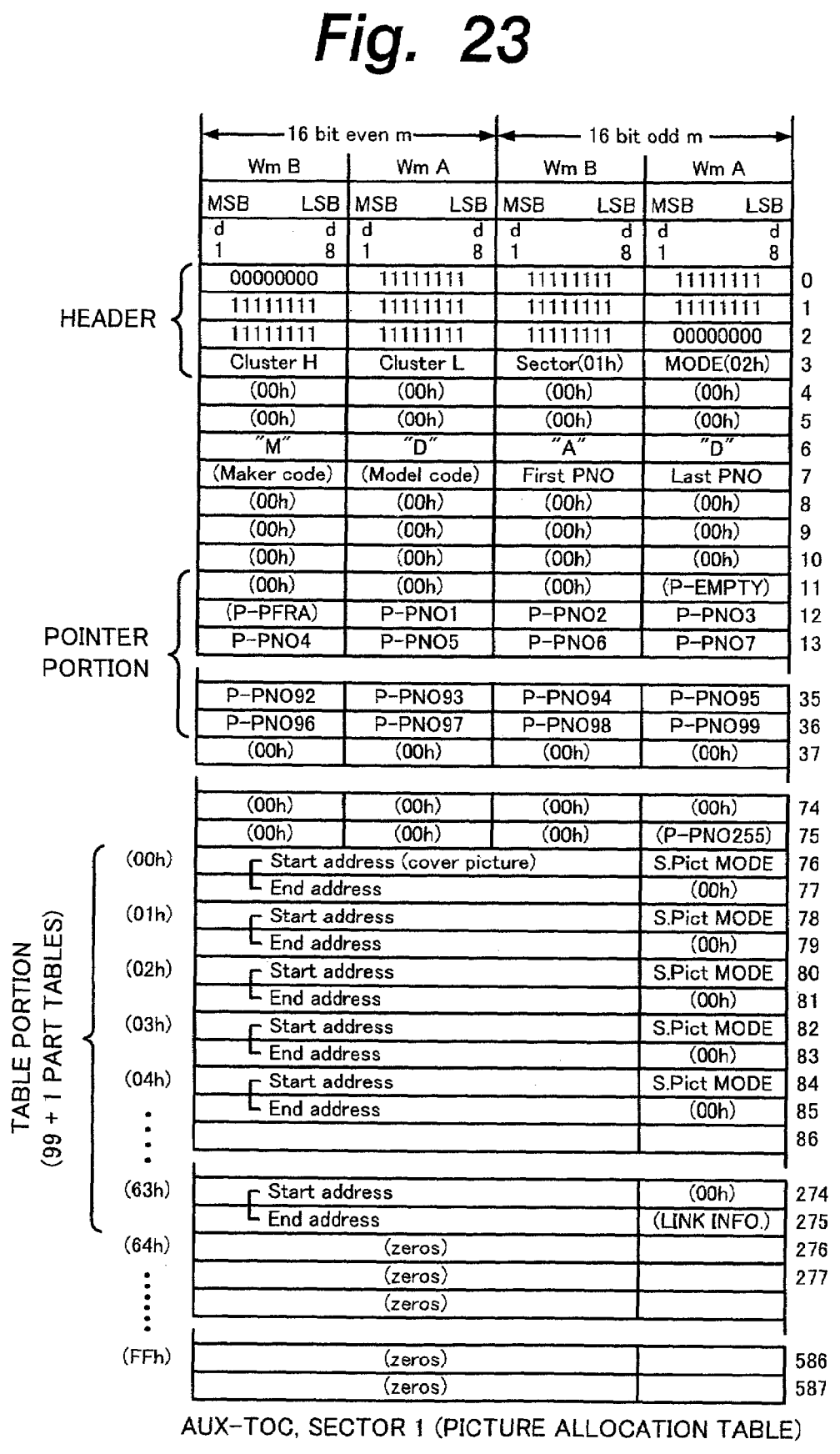

| | | 16 bit even m | | 16 bit odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | Sector(01h) | MODE(02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First PNO | Last PNO | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER PORTION | | (00h) | (00h) | (00h) | (P-EMPTY) | 11 |
| POINTER PORTION | | (P-PFRA) | P-PNO1 | P-PNO2 | P-PNO3 | 12 |
| POINTER PORTION | | P-PNO4 | P-PNO5 | P-PNO6 | P-PNO7 | 13 |
| POINTER PORTION | | | | | | |
| POINTER PORTION | | P-PNO92 | P-PNO93 | P-PNO94 | P-PNO95 | 35 |
| POINTER PORTION | | P-PNO96 | P-PNO97 | P-PNO98 | P-PNO99 | 36 |
| | | (00h) | (00h) | (00h) | (00h) | 37 |
| | | | | | | |
| | | (00h) | (00h) | (00h) | (00h) | 74 |
| | | (00h) | (00h) | (00h) | (P-PNO255) | 75 |
| TABLE PORTION (99 + 1 PART TABLES) | (00h) | Start address (cover picture) | | | S.Pict MODE | 76 |
| TABLE PORTION (99 + 1 PART TABLES) | | End address | | | (00h) | 77 |
| TABLE PORTION (99 + 1 PART TABLES) | (01h) | Start address | | | S.Pict MODE | 78 |
| TABLE PORTION (99 + 1 PART TABLES) | | End address | | | (00h) | 79 |
| TABLE PORTION (99 + 1 PART TABLES) | (02h) | Start address | | | S.Pict MODE | 80 |
| TABLE PORTION (99 + 1 PART TABLES) | | End address | | | (00h) | 81 |
| TABLE PORTION (99 + 1 PART TABLES) | (03h) | Start address | | | S.Pict MODE | 82 |
| TABLE PORTION (99 + 1 PART TABLES) | | End address | | | (00h) | 83 |
| TABLE PORTION (99 + 1 PART TABLES) | (04h) | Start address | | | S.Pict MODE | 84 |
| TABLE PORTION (99 + 1 PART TABLES) | | End address | | | (00h) | 85 |
| TABLE PORTION (99 + 1 PART TABLES) | ⋮ | | | | | 86 |
| TABLE PORTION (99 + 1 PART TABLES) | (63h) | Start address | | | (00h) | 274 |
| TABLE PORTION (99 + 1 PART TABLES) | | End address | | | (LINK INFO.) | 275 |
| | (64h) | (zeros) | | | | 276 |
| | ⋮ | (zeros) | | | | 277 |
| | | (zeros) | | | | |
| | (FFh) | (zeros) | | | | 586 |
| | | (zeros) | | | | 587 |

AUX-TOC, SECTOR 1 (PICTURE ALLOCATION TABLE)

Fig. 24

| | 16 bit even m | | 16 bit odd m | | |
|---|---|---|---|---|---|
| | Wm B | Wm A | Wm B | Wm A | |
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector(02h) | MODE(02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First PIF | Last PIF | 7 |
| | (00h) | (00h) | (00h) | (00h) | 8 |
| | (00h) | (00h) | (00h) | (00h) | 9 |
| | (00h) | (00h) | (00h) | char. code | 10 |
| POINTER PORTION | (00h) | (00h) | (00h) | (P-EMPTY) | 11 |
| | (00h) | P-PIF1 | P-PIF2 | P-PIF3 | 12 |
| | P-PIF4 | P-PIF5 | P-PIF6 | P-PIF7 | 13 |
| | | | | | |
| | P-PIF92 | P-PIF93 | P-PIF94 | P-PIF95 | 35 |
| | P-PIF96 | P-PIF97 | P-PIF98 | P-PIF99 | 36 |
| | (00h) | (00h) | (00h) | (00h) | 37 |
| | | | | | |
| | | | | | |
| | (00h) | (00h) | (00h) | (00h) | 74 |
| | (00h) | (00h) | (00h) | (P-PIF255) | 75 |
| TABLE PORTION (255 + 1 SLOTS) (00h) | cover picture information | | | | 76 |
| | cover picture information | | | LINK INFO. | 77 |
| (01h) | cover picture or still picture information | | | | 78 |
| | cover picture or still picture information | | | LINK INFO. | 79 |
| (02h) | cover picture or still picture information | | | | 80 |
| | cover picture or still picture information | | | LINK INFO. | 81 |
| (03h) | cover picture or still picture information | | | | 82 |
| | cover picture or still picture information | | | LINK INFO. | 83 |
| (04h) | cover picture or still picture information | | | | 84 |
| | cover picture or still picture information | | | LINK INFO. | 85 |
| ⋮ | | | | | 86 |
| | | | | | |
| (63h) | cover picture or still picture information | | | | 274 |
| | cover picture or still picture information | | | LINK INFO. | 275 |
| (64h) | cover picture or still picture information | | | | 276 |
| | cover picture or still picture information | | | LINK INFO. | 277 |
| ⋮ | | | | | |
| | | | | | |
| (FFh) | cover picture or still picture information | | | | 586 |
| | cover picture or still picture information | | | LINK INFO. | 587 |

AUX-TOC, SECTOR 2 (PICTURE INFORMATION TABLE)

Fig. 25

| | | 16 bit even m | | 16 bit odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | Cluster H | Cluster L | Sector(03h) | MODE(02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TNP | Last TNP | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER PORTION | | (00h) | (00h) | (00h) | (P-EMPTY) | 11 |
| | | (00h) | P-TNP1 | P-TNP2 | P-TNP3 | 12 |
| | | P-TNP4 | P-TNP5 | P-TNP6 | P-TNP7 | 13 |
| | | P-TNP92 | P-TNP93 | P-TNP94 | P-TNP95 | 35 |
| | | P-TNP96 | P-TNP97 | P-TNP98 | P-TNP99 | 36 |
| | | (00h) | (00h) | (00h) | (00h) | 37 |
| | | (00h) | (00h) | (00h) | (00h) | 74 |
| | | (00h) | (00h) | (00h) | (P-TNP255) | 75 |
| TABLE PORTION (99 + 1 SLOTS) | (00h) | zeros | | | P-PNOj | 76 |
| | | zeros | | | LINK INFO. | 77 |
| | (01h) | Start offset address | | | P-PNOj | 78 |
| | | End offset address | | | LINK INFO. | 79 |
| | (02h) | Start offset address | | | P-PNOj | 80 |
| | | End offset address | | | LINK INFO. | 81 |
| | (03h) | Start offset address | | | P-PNOj | 82 |
| | | End offset address | | | LINK INFO. | 83 |
| | (04h) | Start offset address | | | P-PNOj | 84 |
| | | End offset address | | | LINK INFO. | 85 |
| | ⋮ | | | | | 86 |
| | (63h) | Start offset address | | | P-PNOj | 274 |
| | | End offset address | | | LINK INFO. | 275 |
| | (64h) | (zeros) | | | | 276 |
| | ⋮ | (zeros) | | | | 277 |
| | | (zeros) | | | | |
| | (FFh) | (zeros) | | | | 586 |
| | | (zeros) | | | | 587 |

AUX-TOC, SECTOR 3 (PICTURE PLAYBACK SEQUENCE TABLE)

Fig. 26

| | | 16 bit even m | | 16 bit odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | Sector(04h) | MODE(02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TXNO | Last TXNO | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER PORTION | | (00h) | (00h) | (00h) | (P-EMPTY) | 11 |
| POINTER PORTION | | (P PFRA) | P-TXNO1 | P-TXNO2 | P-TXNO3 | 12 |
| POINTER PORTION | | P-TXNO4 | P-TXNO5 | P-TXNO6 | P-TXNO7 | 13 |
| POINTER PORTION | | P-TXNO92 | P-TXNO93 | P-TXNO94 | P-TXNO95 | 35 |
| POINTER PORTION | | P-TXNO96 | P-TXNO97 | P-TXNO98 | P-TXNO99 | 36 |
| | | (00h) | (00h) | (00h) | (00h) | 37 |
| | | (00h) | (00h) | (00h) | (00h) | 74 |
| | | (00h) | (00h) | (00h) | (P-TXNO255) | 75 |
| TABLE PORTION (99 + 1 PART TABLES) | (00h) | Start address (cover text) | | | Text MODE | 76 |
| | | End address | | | LINK INFO. | 77 |
| | (01h) | Start address | | | Text MODE | 78 |
| | | End address | | | LINK INFO. | 79 |
| | (02h) | Start address | | | Text MODE | 80 |
| | | End address | | | LINK INFO. | 81 |
| | (03h) | Start address | | | Text MODE | 82 |
| | | End address | | | LINK INFO. | 83 |
| | (04h) | Start address | | | Text MODE | 84 |
| | | End address | | | LINK INFO. | 85 |
| | ⋮ | | | | | 86 |
| | (63h) | Start address | | | Text MODE | 274 |
| | | End address | | | LINK INFO. | 275 |
| | (64h) | (zeros) | | | | 276 |
| | ⋮ | (zeros) | | | | 277 |
| | | (zeros) | | | | |
| | (FFh) | (zeros) | | | | 586 |
| | | (zeros) | | | | 587 |

AUX-TOC, SECTOR 4 (TEXT ALLOCATION TABLE)

Fig. 27

| | | 16 bit even m | | 16 bit odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | Sector(05h) | MODE(02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TXIF | Last TXIF | 7 |
| | | (00h) | (00h) | (00h) | (00h) | 8 |
| | | (00h) | (00h) | (00h) | (00h) | 9 |
| | | (00h) | (00h) | (00h) | char. code | 10 |
| POINTER PORTION | | (00h) | (00h) | (00h) | (P-EMPTY) | 11 |
| POINTER PORTION | | (00h) | P-TXIF1 | P-TXIF2 | P-TXIF3 | 12 |
| POINTER PORTION | | P-TXIF4 | P-TXIF5 | P-TXIF6 | P-TXIF7 | 13 |
| POINTER PORTION | | | | | | |
| POINTER PORTION | | P-TXIF92 | P-TXIF93 | P-TXIF94 | P-TXIF95 | 35 |
| POINTER PORTION | | P-TXIF96 | P-TXIF97 | P-TXIF98 | P-TXIF99 | 36 |
| | | (00h) | (00h) | (00h) | (00h) | 37 |
| | | | | | | |
| | | (00h) | (00h) | (00h) | (00h) | 74 |
| | | (00h) | (00h) | (00h) | (P-TXIF255) | 75 |
| TABLE PORTION (255 + 1 SLOTS) | (00h) | cover text information | | | | 76 |
| TABLE PORTION (255 + 1 SLOTS) | | cover text information | | | LINK INFO. | 77 |
| TABLE PORTION (255 + 1 SLOTS) | (01h) | cover text or text information | | | | 78 |
| TABLE PORTION (255 + 1 SLOTS) | | cover text or text information | | | LINK INFO. | 79 |
| TABLE PORTION (255 + 1 SLOTS) | (02h) | cover text or text information | | | | 80 |
| TABLE PORTION (255 + 1 SLOTS) | | cover text or text information | | | LINK INFO. | 81 |
| TABLE PORTION (255 + 1 SLOTS) | (03h) | cover text or text information | | | | 82 |
| TABLE PORTION (255 + 1 SLOTS) | | cover text or text information | | | LINK INFO. | 83 |
| TABLE PORTION (255 + 1 SLOTS) | (04h) | cover text or text information | | | | 84 |
| TABLE PORTION (255 + 1 SLOTS) | ⋮ | cover text or text information | | | LINK INFO. | 85 |
| TABLE PORTION (255 + 1 SLOTS) | | | | | | 86 |
| TABLE PORTION (255 + 1 SLOTS) | (63h) | cover text or text information | | | | 274 |
| TABLE PORTION (255 + 1 SLOTS) | | cover text or text information | | | LINK INFO. | 275 |
| TABLE PORTION (255 + 1 SLOTS) | (64h) | cover text or text information | | | | 276 |
| TABLE PORTION (255 + 1 SLOTS) | ⋮ | cover text or text information | | | LINK INFO. | 277 |
| TABLE PORTION (255 + 1 SLOTS) | | cover text or text information | | | | |
| TABLE PORTION (255 + 1 SLOTS) | (FFh) | cover text or text information | | | | 586 |
| TABLE PORTION (255 + 1 SLOTS) | | cover text or text information | | | LINK INFO. | 587 |

AUX-TOC, SECTOR 5 (TEXT INFORMATION TABLE)

Fig. 28

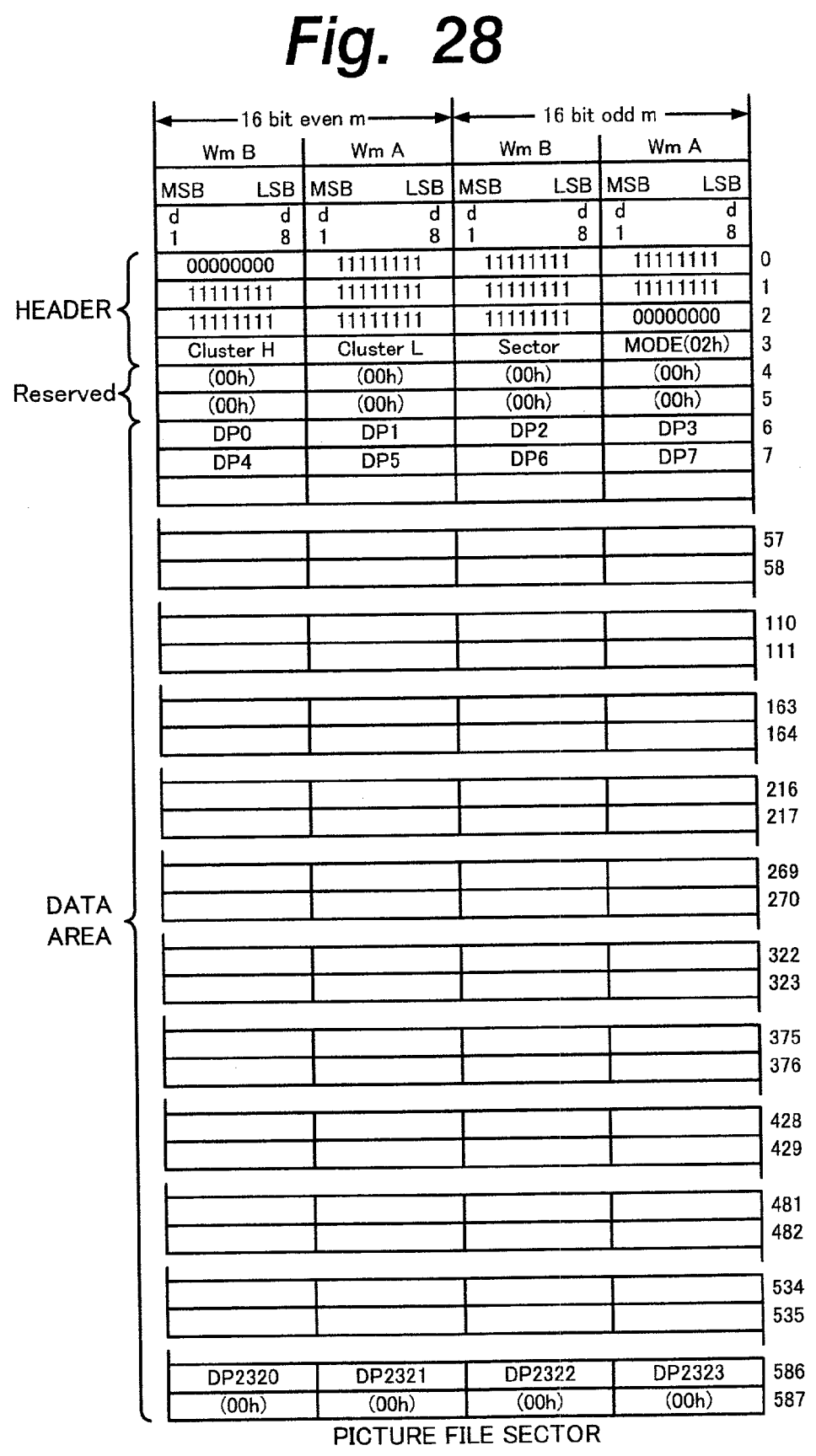

| | 16 bit even m | | 16 bit odd m | | |
|---|---|---|---|---|---|
| | Wm B | Wm A | Wm B | Wm A | |
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector | MODE(02h) | 3 |
| Reserved | (00h) | (00h) | (00h) | (00h) | 4 |
| | (00h) | (00h) | (00h) | (00h) | 5 |
| DATA AREA | DP0 | DP1 | DP2 | DP3 | 6 |
| | DP4 | DP5 | DP6 | DP7 | 7 |
| | | | | | |
| | | | | | 57 |
| | | | | | 58 |
| | | | | | 110 |
| | | | | | 111 |
| | | | | | 163 |
| | | | | | 164 |
| | | | | | 216 |
| | | | | | 217 |
| | | | | | 269 |
| | | | | | 270 |
| | | | | | 322 |
| | | | | | 323 |
| | | | | | 375 |
| | | | | | 376 |
| | | | | | 428 |
| | | | | | 429 |
| | | | | | 481 |
| | | | | | 482 |
| | | | | | 534 |
| | | | | | 535 |
| | DP2320 | DP2321 | DP2322 | DP2323 | 586 |
| | (00h) | (00h) | (00h) | (00h) | 587 |

PICTURE FILE SECTOR

Fig. 29

| | 16 bit even m | | 16 bit odd m | | |
|---|---|---|---|---|---|
| | Wm B | Wm A | Wm B | Wm A | |
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector | MODE(02h) | 3 |
| Reserved | (00h) | (00h) | (00h) | (00h) | 4 |
| | (00h) | (00h) | (00h) | (00h) | 5 |
| DATA AREA | DT0 | DT1 | DT2 | DT3 | 6 |
| | DT4 | DT5 | DT6 | DT7 | 7 |
| | | | | | |
| | | | | | 57 |
| | | | | | 58 |
| | | | | | 110 |
| | | | | | 111 |
| | | | | | 163 |
| | | | | | 164 |
| | | | | | 216 |
| | | | | | 217 |
| | | | | | 269 |
| | | | | | 270 |
| | | | | | 322 |
| | | | | | 323 |
| | | | | | 375 |
| | | | | | 376 |
| | | | | | 428 |
| | | | | | 429 |
| | | | | | 481 |
| | | | | | 482 |
| | | | | | 534 |
| | | | | | 535 |
| | DT2320 | DT2321 | DT2322 | DT2323 | 586 |
| | (00h) | (00h) | (00h) | (00h) | 587 |

TEXT FILE SECTOR

Fig. 30A

| | | |
|---|---|---|
| d1, d2 (COPY STATUS) | 0h | COPYING OPERATION PERMITTED |
| | 1h | COPYING OPERATION PERMITTED ONLY ONE TIME |
| | 2h | COPYING OPERATION PERMITTED ONLY ONE TIME THROUGH AUTHENTICATED BUS (COPYING OPERATION PROHIBITED THROUGH BUS NOT AUTHENTICATED) |
| | 3h | COPYING OPERATION PROHIBITED |
| d3~d8 | | Reserved (NOT DEFINED) |

S. PICT MODE (COPY STATUS)

Fig. 30B

| | BEFORE COPYING OPERATION | AFTER COPYING OPERATION |
|---|---|---|
| COPY STATUS | 0h (COPYING OPERATION PERMITTED) | 0h (COPYING OPERATION PERMITTED) |
| | 1h (COPYING OPERATION PERMITTED ONLY ONE TIME) | 3h (COPYING OPERATION PROHIBITED) |
| | 2h (COPYING OPERATION PERMITTED ONLY ONE TIME THROUGH AUTHENTICATED BUS) | 3h (COPYING OPERATION PROHIBITED) |
| | 3h (COPYING OPERATION PROHIBITED) | —— |

COPY STATUS UPDATING TABLE

DATA STRUCTURE OF PICTURE (TEXT) INFORMATION FILE

Fig. 32

| | | |
|---|---|---|
| d1–d2 (COPY STATUS) | 0h | COPYING OPERATION PERMITTED |
| | 1h | COPYING OPERATION PERMITTED ONLY ONE TIME |
| | 2h | COPYING OPERATION PERMITTED ONLY ONE TIME THROUGH AUTHENTICATED BUS (COPYING OPERATION PROHIBITED THROUGH BUS NOT AUTHENTICATED) |
| | 3h | COPYING OPERATION PROHIBITED |
| d3–d4 | 0h | sung text |
| | 1h | ARTIST INFORMATION |
| | 2h | LINER NOTE |
| | 3h | OTHERS |
| d5 | 0 | TIME STAMP ABSENT |
| | 1 | TIME STAMP PRESENT |
| d6–d7–d8 | 0h | ASCII |
| | 1h | modified ISO 8859-1 |
| | 2h | Music Shifted JIS |
| | 3h | KS C 5601-1989 |
| | 4h | GB2312-810 |
| | 5h | reserved |
| | 6h | reserved |
| | 7h | plain text |

TEXT MODE

IEEE 1394 BUS CONNECTIONS

Fig. 41

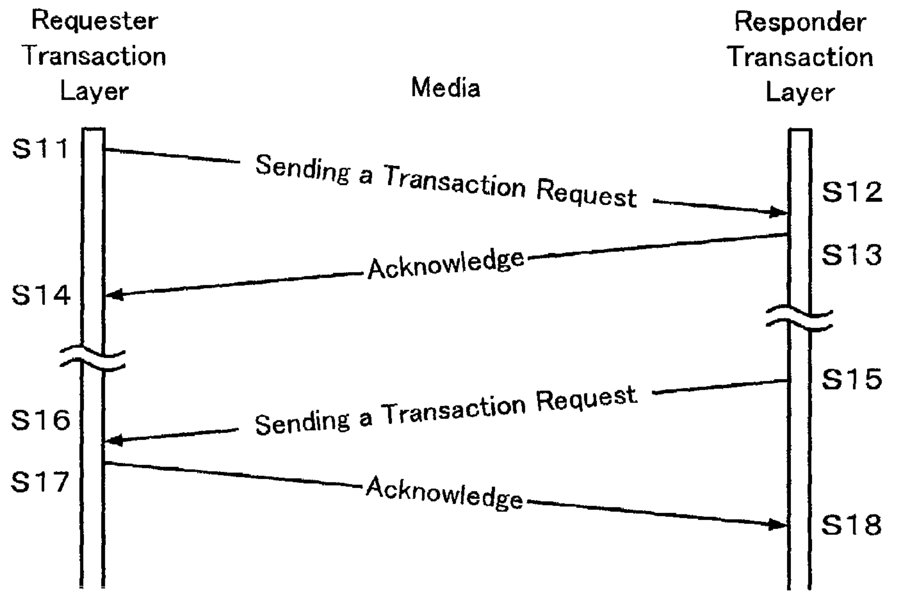

| Sending a Transaction Request | Sending a Transaction Response |
|---|---|
| Write Request (data quadlet) | Write Response<br>No Response (Unified Transaction) |
| Write Request (data block : data length=4 byte) | |
| Write Request (data block : data length≠4 byte) | |
| Read Request (data quadlet) | Read Response (data quadlet) |
| Read Request (data block : data length=4 byte) | Read Response (data block) |
| Read Request (data block : data length≠4 byte) | |
| Lock Request | Lock Response |

Fig. 43

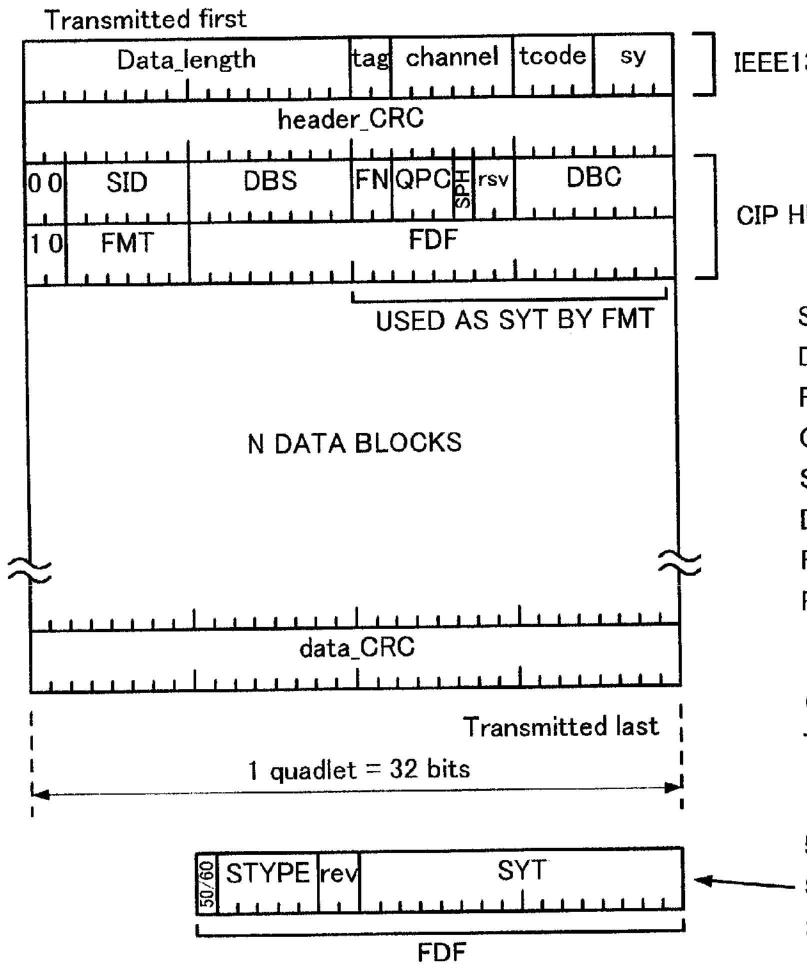

SID : TRANSMISSION NODE NUMBER
DBS : PACKETIZING UNIT (SIZE OF DATA BLOCK)
FN : NUMBER OF PACKETS DIVIDED
QPC : NUMBER OF ADDED QUADLETS DIVIDED
SPH : FLAG OF HEADER OF SOURCE PACKET
DBC : COUNTER FOR DETECTING NUMBER OF PACKETS LOST
FMT : SIGNAL FORMAT
FDF : FORMAT DEPENDENT FIELD (FOR MPEG)
TSF : TIME SHIFT FLAG (FOR DVCR)
50/60 : NUMBER OF FIELDS PER SECOND
STYPE: VIDEO FORMAT (SD OR HD)
SYT : TIME STAMP USED FOR SYNCHRONIZING FRAMES

| | |
|---|---|
| CTS | : ID OF COMMAND SET |
| ctype | : FUNCTIONAL CLASSIFICATION OF COMMAND |
| response | : RESULT OF PROCESS OF COMMAND |
| subunit type | : ADDRESS (DESIGNATES FUNCTIONAL UNIT IN APPARATUS) |
| id | : ADDRESS (IDENTIFIES SAME subunit type) |
| opcode | : COMMAND |
| operand | : PARAMETER OF COMMAND |

Fig. 48 ctype/response

| | | |
|---|---|---|
| Command | 0000 | CONTROL |
| | 0001 | STATUS |
| | 0010 | INQUIRY |
| | 0011 | NOTIFY |
| | 0100<br>~<br>0111 | (reserved) |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved) |
| | 1111 | INTERIM |

Fig. 49A subunit_type

| | |
|---|---|
| 00000 | Monitor |
| ~ | (reserved) |
| 00011 | Disc recorder/player |
| 00100 | VCR |
| 00101 | Tuner |
| 00111 | Camera |
| ~ | (reserved) |
| 11111 | Unit* |

Fig. 49B opcode : Operation Code

| | |
|---|---|
| 00h | VENDOR-DEPENDENT |
| 50h | SEACH MODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | ~ |

*TABLE OF OPCODE IS PROVIDED FOR EACH SUBUNIT

*OPERANDS ARE DEFINED FOR EACH OPCODE

Location of plug address spaces

| Address offset | Description |
|---|---|
| 0 | consumer port |
| 4 | producer port [1] |
| 8.12 . . . . 52 | producer port [2] – to – port [3] |
| 56 | port [14] |
| 60 | reserved |
| 64 | Segment buffer |

plug address space Components

Asynchronous plug organization (2)

TRANSMITTING/RECEIVING PROCEDURES CORRESPONDING TO ASYNCHRONOUS CONNECTION

INFORMATION PROCESSING SYSTEM USING REMOTE CONTROL, WITH DEVICE AND METHOD THEREFOR

TECHNICAL FIELD

The present invention relates to an information transmission method, an information processing method, an information transmission system, and a data processing apparatus that transmit and receive data through a data interface corresponding to a predetermined data communication format.

RELATED ART

As a recording apparatus/reproducing apparatus that can record/reproduce data such as music data, a recording apparatus/reproducing apparatus that uses a record medium such as a magneto-optical disc, a magnetic tape or the like on which an audio signal is recorded as a digital signal. As such a recording and reproducing apparatus, a mini disc recording and reproducing apparatus that can handle a magneto-optical disc is known.

For example, on a mini disc, management information referred to as user TOC (hereinafter referred to as U-TOC) is recorded separately from main data such as music in order to manage areas in which data has been recorded by the user (these areas are referred to as data recorded areas) and areas in which data has not been recorded (these area are referred to as virgin areas). A recording apparatus refers to the U-TOC to determine an area into which data is recorded. A reproducing apparatus refers to the U-TOC to determine an area from which data is reproduced.

In other words, music programs and so forth recorded are managed in the unit of data referred to as track in the U-TOC (namely, as the number of tracks), and a start address, an end address and so forth of the track are recorded in the U-TOC. Further, as regards a non-recorded area (free area) in which no data is recorded, it is managed as a data recordable area, and a start address, an end address and so forth of the non-recorded area are written in the U-TOC.

Further, since areas on the disc are managed with such a U-TOC as described above, an editing process such as division (divide), connection (combine), movement (move: change of the track number) or erasure (erase) of a track that is a unit of recorded data such as a music program can be executed readily and rapidly by updating only the U-TOC.

Furthermore, in the U-TOC, also an area is set that is provided to record and hold a title (disc name) of the disc and/or a title (track name) or the like of each program such as a music program recorded on the disc. Therefore, also such an editing operation as to input such a disc name or a track name as mentioned above can be performed by an operation of the user.

It should be noted that in the specification, the term “program” means a unit of audio data or the like such as a music program as main data recorded on a disc. For example, audio data for one music program represents one program. Also a term “track” is a synonym of “program”. Further, in the specification, also symbols, marks and so forth are treated as characters.

In recent years, digital satellite broadcasts are becoming common. The digital satellite broadcast has a resistance against noise and fading in comparison with for example a conventional analog broadcast, and allows a signal of a high quality to be transmitted. In addition, the digital satellite broadcast features high efficiency of use of frequencies and many channels. In particular, the digital satellite broadcast allows several hundreds of channels to be used with one satellite. In such digital satellite broadcast, a large number of dedicated channels for sports, movies, music, news and so forth are provided and programs for respectively dedicated contents are broadcast on the dedicated channels.

It has been proposed to use such a digital satellite broadcast system so that user can download audio data of a music program or the like or can for example make a purchase contract regarding some commodity while observing a broadcast screen. In other words, the digital satellite broadcast system involves data service broadcast together with the broadcast of ordinary broadcast contents.

As an example, in downloading of music program data, the broadcasting side multiplexes music program data and video data of an album jacket or the like and text data of liner notes (text regarding music programs, artists and so forth) and so forth with respect to the music program data and broadcasts the multiplexed data in parallel to a broadcast program. Upon downloading of such music program data and additional information, a GUI (Graphical User Interface) screen (that is, an operation screen for downloading data) is displayed so as to allow the user to perform interactive operations. Also data for outputting such a GUI screen is multiplexed and broadcast.

On the user side who has a receiver, while a desired channel is selected, a predetermined operation is performed with the receiver so that a GUI screen for downloading music program data is output and displayed. Then, the user performs an operation with the displayed operation screen so that for example the data is supplied to and recorded by a digital audio apparatus connected to the receiver.

Further, in recent years, a data transmission system has been proposed wherein various electronic apparatuses such as digital AV (Audio visual) apparatuses, personal computers and so forth are connected to each other with for example IEEE (Institute of Electrical Engineers) 1394 bus so that data can be communicated therebetween.

With the technical background described above, it is possible to provide an AV system wherein audio data and so forth that can be handled by the mini disc recording and reproducing apparatus described above are broadcast as download data by for example a digital satellite broadcast such that the user side can receive the download data with a digital satellite broadcast receiver and record the received download data to a mini disc with a mini disc player through a data bus.

Further, in such an AV system as described above, so-called remote control operation is possible. For example, when a mini disc recording and reproducing apparatus and a personal computer are connected to each other through a data bus, it is possible to perform an editing process of the mini disc recording and reproducing apparatus on the personal computer apparatus side.

For example, in the standard of a digital interface such as the IEEE 1394, an apparatus that performs a remote controlling operation is referred to as controller, whereas an apparatus that is remotely controlled is referred to as target.

Next, when remote controlling operation is performed between AV systems as a controller and a target connected to each other through a data interface for example if one target can be remotely controlled by a plurality of controllers or if an operation of a local key of an apparatus as a target (for example, an operation key provided on an apparatus body as a target) is valid, there may be differences in processes and their results between the controller and the target.

To solve such differences, the AV system should be structured in such a manner that for example the possibility of which there are differences in processes and their results between the controller and the target may take place, the other side apparatus is notified of this situation, and the apparatus that has been notified of the situation performs a proper process corresponding to the contents of the notification.

However, if such a structure is used, a program or the like that performs a very complicated controlling operation should be prepared against such a situation of which there may be differences in processes and their results between the controller and the target. Consequently, since it is very difficult to design both the controller and the target, such an approach is not practical.

DISCLOSURE OF THE INVENTION

Therefore, taking consideration of the above described problem, an object of the present invention is to solve a situation of which there will be differences in processes and their results between the controller and the target. Another object of the present invention is to structure the controller and the target as simply as possible.

The present invention is an information processing system, having a plurality of information processing apparatuses connected through a data bus corresponding to a predetermined communication format, for performing a remote control with data and various commands transmitted and received between the information processing apparatuses, comprising a first information processing apparatus, and a second information processing apparatus having a data recording and reproducing means for reproducing data from a predetermined record medium, recording data thereto, or editing data recorded thereon, wherein the first information processing apparatus has an operation information transmitting means for transmitting an operation control command to the second information processing apparatus, the operation control command causing a remote control of a predetermined operation of the data recording and reproducing means of the second information processing apparatus to be performed, and a reserve request command transmitting means for generating a reserve request command for requesting the first information processing apparatus for a reservation of a remote control against the second information processing apparatus and transmitting the reserve request command to the second information processing apparatus, and wherein the second information processing apparatus has a receiving means for receiving data transmitted from the outside through the data bus, a response processing means for executing a predetermined process corresponding to one of various commands received by the receiving means so as to enable another information processing apparatus to perform a remote control of the second information processing apparatus, a local operation controlling means for locally performing an operation control for a predetermined operation against the data recording and reproducing means, a first reserve mode setting means for setting, as a reserve mode to be set corresponding to the reserve request command received by the receiving means, the response processing means so as to permit a remote control by the first information processing apparatus and prohibit a remote control by other information processing apparatuses, and a second reserve mode setting means for setting, as a reserve mode to be set corresponding to the reserve request command received by the receiving means, the local operation controlling means so as to enable a predetermined operation of those performed by the local operation controlling means and disable other than the enabled operations.

The present invention is an information processing system, having a plurality of information processing apparatuses connected through a data bus corresponding to a predetermined communication format, for performing a remote control with data and various commands transmitted and received between the information processing apparatuses, comprising a first information processing apparatus, and a second information processing apparatus, wherein the first information processing apparatus has a download data transmitting means for transmitting download data that is downloaded to the second information processing apparatus, a download start/completion request command transmitting means for generating and transmitting a download start request command when the transmission of the download data starts and for generating and transmitting a download completion request command when the transmission of the download data is completed, and a reserve request command transmitting means for generating a reserve request command for requesting the first information processing apparatus for a reservation of a remote control against the second information processing apparatus and transmitting the reserve request command to the second information processing apparatus before the download start request command is transmitted, and wherein the second information processing apparatus has a receiving means for receiving data transmitted through the data bus, a data recording means for recording the download data that is received by the receiving means to a predetermined record medium, a response processing means for executing a predetermined process corresponding to one of various commands received by the receiving means so as to enable another information processing apparatus to perform a remote control of the second information processing apparatus, a local operation controlling means for locally performing an operation control for a predetermined operation against the data recording and reproducing means, a first reserve mode setting means for setting, as a reserve mode to be set corresponding to the reserve request command received by the receiving means, the response processing means so as to permit a remote control by the first information processing apparatus and prohibit a remote control by other information processing apparatuses, and a second reserve mode setting means for setting, as a reserve mode to be set corresponding to the reserve request command received by the receiving means, the local operation controlling means so as to enable a predetermined operation of those performed by the local operation controlling means and disable other than the enabled operations.

The present invention is an information processing apparatus of an information processing system, having a plurality of information processing apparatuses connected through a data bus corresponding to a predetermined communication format, for performing a remote control with data and various commands transmitted and received between the information processing apparatuses, comprising an operation information transmitting means for transmitting an operation control command to a data recording and reproducing apparatus as another information processing apparatus that allows a predetermined process for reproducing data from a predetermined record medium, recording data thereto, or editing data recorded thereon, the operation control command causing a remote control of a predetermined operation of the data recording and reproducing apparatus to be performed, and a reserve request command transmitting means for generating a reserve request command for requesting the local information processing apparatus for a reservation of a remote control against the data recording and reproducing apparatus and transmitting the reserve request command to the data recording and reproducing apparatus.

The present invention is an information processing apparatus of an information processing system, having a plurality of information processing apparatuses connected through a data bus corresponding to a predetermined communication format, for performing a remote control with data and various commands transmitted and received between the information processing apparatuses, comprising a data recording and reproducing means for performing a predetermined process for reproducing data from a predetermined record medium, recording data thereto, or editing data recorded thereon, a local operation controlling means for locally performing an operation control for a predetermined operation against the data recording and reproducing means, a receiving means for receiving data transmitted from the outside through the data bus, a response processing means for executing a predetermined process corresponding to one of various commands received by the receiving means so as to enable an external information processing apparatus to perform a remote control of the local information processing apparatus, a local operation controlling means for locally performing an operation control for a predetermined operation against the data recording and reproducing means, a first reserve mode setting means for setting, as a reserve mode to be set corresponding to a reserve request command received by the receiving means, the reserve request command causing a remote control against the local information processing apparatus to be reserved, the response processing means so as to permit a remote control by an external information processing apparatus that has transmitted the reserve request command and prohibit a remote control by other external information processing apparatuses, and a second reserve mode setting means for setting, as a reserve mode to be set corresponding to the reserve request command received by the receiving means, the local operation controlling means so as to enable a predetermined operation of those performed by the local operation controlling means and disable other than the enabled operations.

The present invention is an information processing apparatus of an information processing system, having a plurality of information processing apparatuses connected through a data bus corresponding to a predetermined communication format, for performing a remote control with data and various commands transmitted and received between the information processing apparatuses, comprising a download data transmitting means for transmitting download data that is downloaded and recorded to another information processing apparatus as a data recording apparatus, a download start/completion request command transmitting means for generating and transmitting a download start request command when the transmission of the download data starts and for generating and transmitting a download completion request command when the transmission of the download data is completed, and a reserve request command transmitting means for generating a reserve request command for requesting the local information processing apparatus for a reservation of a remote control against the data recording apparatus and transmitting the reserve request command to the data recording apparatus before the download start request command is transmitted.

The present invention is an information processing apparatus of an information processing system, having a plurality of information processing apparatuses connected through a data bus corresponding to a predetermined communication format, for performing a remote control with data and various commands transmitted and received between the information processing apparatuses, comprising a receiving means for receiving data transmitted through the data bus, a response processing means for executing a predetermined process corresponding to one of various commands received by the receiving means so as to enable an external information processing apparatus to perform a remote control of the local information processing apparatus, a data recording means for receiving download data transmitted from a transmitting apparatus as an external information processing apparatus by the receiving means and recording the download data to a predetermined record medium, a local operation controlling means for locally performing an operation control for a predetermined operation against the data reproducing means, a first reserve mode setting means for setting, as a reserve mode to be set corresponding to a reserve request command transmitted by the transmitting apparatus and received by the receiving means, the reserve request command causing a remote control against the local information processing apparatus to be reserved, the response processing means so as to permit a remote control by the transmitting apparatus and prohibit a remote control by other external information processing apparatuses, and a second reserve mode setting means for setting, as a reserve mode to be set corresponding to the reserve request command transmitted by the transmitting apparatus and received by the receiving means, the reserve request command causing a remote control against the local information processing apparatus to be reserved, the local operation controlling means so as to enable a predetermined operation of those performed by the local operation controlling means and disable other than the enabled operations.

The present invention is an information processing method for an information processing system, having a plurality of information processing apparatuses connected through a data bus corresponding to a predetermined communication format, for performing a remote control with data and various commands transmitted and received between the information processing apparatuses, the information processing system having at least a first information processing apparatus, and a second information processing apparatus having a data recording and reproducing means for reproducing data from a predetermined record medium, recording data thereto, or editing data recorded thereon, for the first information processing apparatus, the information processing method comprising the steps of transmitting an operation control command to the second information processing apparatus, the operation control command causing a remote control of a predetermined operation of the data recording and reproducing means of the second information processing apparatus to be performed (as operation information transmitting step), and generating a reserve request command for requesting the first information processing apparatus for a reservation of a remote control against the second information processing apparatus and transmitting the reserve request command to the second information processing apparatus (as reserve request command transmitting step), and for the second information processing apparatus, the information processing method compressing the steps of receiving data transmitted from the outside through the data bus (as receiving step), executing a predetermined process corresponding to one of various commands received at the receiving step so as to enable another information processing apparatus to perform a remote control of the second information processing apparatus (as response processing step), locally performing an operation control for a predetermined operation against the data recording and reproducing means (as local operation controlling step), setting, as a reserve mode to be set corresponding to the reserve request command received at the receiving step, at the response processing step so as to permit a remote control by the first information processing apparatus and prohibit a remote control by other information processing apparatuses (as first reserve mode setting step), and setting, as a reserve mode to be set corresponding to the reserve request command received at the receiving step, at the local operation controlling step so as to enable a predetermined operation of those performed at the local operation controlling step and disable other than the enabled operations (as second reserve mode setting step).

The present invention is an information processing method for an information processing system, having a plurality of information processing apparatuses connected through a data bus corresponding to a predetermined communication format, for performing a remote control with data and various commands transmitted and received between the information processing apparatuses, having at least a first information processing apparatus, and a second information processing apparatus, wherein for the first information processing apparatus, the information processing method comprises the steps of transmitting download data that is downloaded to the second information processing apparatus (as download data transmitting step), generating and transmitting a download start request command when the transmission of the download data starts and for generating and transmitting a download completion request command when the transmission of the download data is completed (as download start/completion request command transmitting step), and generating a reserve request command for requesting the first information processing apparatus for a reservation of a remote control against the second information processing apparatus and transmitting the reserve request command to the second information processing apparatus before the download start request command is transmitted (as reserve request command transmitting step), and wherein for the second information processing apparatus, the information processing method comprises the steps of receiving data transmitted through the data bus (as receiving step), recording the download data that is received at the receiving step to a predetermined record medium (as data recording step), executing a predetermined process corresponding to one of various commands received at the receiving step so as to enable another information processing apparatus to perform a remote control of the second information processing apparatus (as response processing step), locally performing an operation control for a predetermined operation against the data recording and reproducing step (as local operation controlling step), setting, as a reserve mode to be set corresponding to the reserve request command received at the receiving step, the response processing step so as to permit a remote control by the first information processing apparatus and prohibit a remote control by other information processing apparatuses (as first reserve mode setting step), and setting, as a reserve mode to be set corresponding to the reserve request command received at the receiving step, the local operation controlling step so as to enable a predetermined operation of those performed at the local operation controlling step and disable other than the enabled operations (as second reserve mode setting step).

The present invention is an information processing method for an information processing apparatus of an information processing system, having a plurality of information processing apparatuses connected through a data bus corresponding to a predetermined communication format, for performing a remote control with data and various commands transmitted and received between the information processing apparatuses, the information processing method comprising the steps of transmitting an operation control command to a data recording and reproducing apparatus as another information processing apparatus that allows a predetermined process for reproducing data from a predetermined record medium, recording data thereto, or editing data recorded thereon, the operation control command causing a remote control of a predetermined operation of the data recording and reproducing apparatus to be performed (as operation information transmitting step), and generating a reserve request command for requesting the local information processing apparatus for a reservation of a remote control against the data recording and reproducing apparatus and transmitting the reserve request command to the data recording and reproducing apparatus (as reserve request command transmitting step).

The present invention is an information processing method for an information processing apparatus of an information processing system, having a plurality of information processing apparatuses connected through a data bus corresponding to a predetermined communication format, for performing a remote control with data and various commands transmitted and received between the information processing apparatuses, the information processing method comprising the steps of performing a predetermined process for reproducing data from a predetermined record medium, recording data thereto, or editing data recorded thereon (as data recording and reproducing step), locally performing an operation control for a predetermined operation against the data recording and reproducing step (as local operation controlling step), receiving data transmitted from the outside through the data bus (as receiving step), executing a predetermined process corresponding to one of various commands received at the receiving step so as to enable an external information processing apparatus to perform a remote control of the local information processing apparatus (as response processing step), locally performing an operation control for a predetermined operation against the data recording and reproducing step (as local operation controlling step), setting, as a reserve mode to be set corresponding to a reserve request command received at the receiving step, the reserve request command causing a remote control against the local information processing apparatus to be reserved, the response processing step so as to permit a remote control by an external information processing apparatus that has transmitted the reserve request command and prohibit a remote control by other external information processing apparatuses (as first reserve mode setting step), and setting, as a reserve mode to be set corresponding to the reserve request command received at the receiving step, the local operation controlling step so as to enable a predetermined operation of those performed at the local operation controlling step and disable other than the enabled operations (as second reserve mode setting step).

The present invention is an information processing method for an information processing apparatus of an information processing system, having a plurality of information processing apparatuses connected through a data bus corresponding to a predetermined communication format, for performing a remote control with data and various commands transmitted and received between the information processing apparatuses, the information processing method comprising the steps of transmitting download data that is downloaded and recorded to another information processing apparatus as a data recording apparatus (as download data transmitting step), generating and transmitting a download start request command when the transmission of the download data starts and for generating and transmitting a download completion request command when the transmission of the download data is completed (as download start/completion request command transmitting step), and generating a reserve request command for requesting the local information processing apparatus for a reservation of a remote control against the data recording apparatus and transmitting the reserve request command to the data recording apparatus before the download start request command is transmitted (as reserve request command transmitting step).

The present invention is an information processing method for an information processing apparatus of an information processing system, having a plurality of information processing apparatuses connected through a data bus corresponding to a predetermined communication format, for performing a remote control with data and various commands transmitted and received between the information processing apparatuses, the information processing method comprising the steps of receiving data transmitted through the data bus (as receiving step), executing a predetermined process corresponding to one of various commands received at the receiving step so as to enable an external information processing apparatus to perform a remote control of the local information processing apparatus (as response processing step), receiving download data transmitted from a transmitting apparatus as an external information processing apparatus received at the receiving step and recording the download data to a predetermined record medium (as data recording step), locally performing an operation control for a predetermined operation against the data reproducing step (as local operation controlling step), setting, as a reserve mode to be set corresponding to a reserve request command transmitted by the transmitting apparatus and received at the receiving step, the reserve request command causing a remote control against the local information processing apparatus to be reserved, the response processing step so as to permit a remote control by the transmitting apparatus and prohibit a remote control by other external information processing apparatuses (as first reserve mode setting step), and setting, as a reserve mode to be set corresponding to the reserve request command transmitted by the transmitting apparatus and received at the receiving step, the reserve request command causing a remote control against the local information processing apparatus to be reserved, the local operation controlling step so as to enable a predetermined operation of those performed at the local operation controlling step and disable other than the enabled operations (as second reserve mode setting step).

With the structure described above, an apparatus (information processing apparatus) that performs a remote controlling operation as a controller transmits a reserve requesting command before it performs the remote controlling operation. Another apparatus (information processing apparatus) that is remotely controlled as a target sets a reserve mode corresponding to the reserve request command. In other words, the remote controlling operation from any other controller than the controller that has transmitted the reserve request command is prohibited. In addition, the operations that can be performed by an operation key portion (local operation control means) disposed in the controller is limited. Consequently, according to the present invention, while the target is being remotely controlled by a particular controller, it is not remotely controlled by any other controller. Moreover, when an operation by the local operation control means of for example the controller may cause differences in processes and their results between apparatuses, the operation is invalidated.

Likewise, in the case that an apparatus serving as a controller transmits download data and another apparatus serving as a target receives and records the download data, while data is being downloaded, a reserve mode in which the remote controlling operation from any other controller than the controller that has transmitted the reserve request command is prohibited and the operation by the local operation control means is prohibited is set. Consequently for example a remote controlling operation by another controller can be prohibited. In addition, an operation by the local operation control means that may adversely affects the downloading operation can be prevented.

BRIEF DESCRIPTION OF DRAWINGS

FIG. 7 is a schematic diagram for explaining a time division multiplexing structure of transmission data;

FIG. 15 is a schematic diagram for explaining addresses of the disc according to the embodiment;

FIG. 17 is a schematic diagram for explaining sector 0 of U-TOC according to the embodiment;

FIG. 19 is a schematic diagram for explaining sector 1 of U-TOC according to the embodiment;

FIG. 20 is a schematic diagram for explaining sector 2 of U-TOC according to the embodiment;

FIG. 21 is a schematic diagram for explaining sector 4 of U-TOC according to the embodiment;

FIG. 22 is a schematic diagram for explaining sector 0 of AUX-TOC according to the embodiment;

FIG. 23 is a schematic diagram for explaining sector 1 of AUX-TOC according to the embodiment;

FIG. 24 is a schematic diagram for explaining sector 2 of AUX-TOC according to the embodiment;

FIG. 25 is a schematic diagram for explaining sector 3 of AUX-TOC according to the embodiment;

FIG. 26 is a schematic diagram for explaining sector 4 of AUX-TOC according to the embodiment;

FIG. 27 is a schematic diagram for explaining sector 5 of AUX-TOC according to the embodiment;

FIG. 28 is a schematic diagram for explaining a picture file sector according to the embodiment;

FIG. 29 is a schematic diagram for explaining a text file sector according to the embodiment;

FIG. 30 is a schematic diagram for explaining copy statuses and a copy status updating table according to the embodiment;

FIG. 32 is a schematic diagram for explaining definitions for a text mode;

FIG. 41 is a process transition diagram showing basic communication rules (transaction rules) in an asynchronous communication;

FIG. 43 is a schematic diagram showing the structure of a CIP;

FIG. 48 is a schematic diagram for explaining definitions of a ctype/response of an asynchronous packet;

FIG. 49 is a schematic diagram for explaining an example of definitions of subunit_type and opcode of an asynchronous packet;

BEST MODES FOR CARRYING OUT THE INVENTION

Next, an embodiment of the present invention will be described in the following order.

1. Digital Satellite Broadcast Receiving System 1-1. Overall Structure 1-2. Operation with GUI Screen 1-3. Ground Station 1-4. Transmission Format 1-5. IRD 1-6. Mini Disc Recording and Reproducing Apparatus 1-6-1. Structure of MD Recorder/Player 1-6-2. Sector Format and Address Format 1-6-3. Area Structure 1-6-4. U-TOC 1-6-4-1. U-TOC, Sector 0

1-6-4-2. U-TOC, Sector 1

1-6-4-3. U-TOC, Sector 2

1-6-4-3. U-TOC, Sector 4

1-6-5. AUX-TOC 1-6-5-1. AUX-TOC, Sector 0

1-6-5-2. AUX-TOC, Sector 1

1-6-5-3. AUX-TOC, Sector 2

1-6-5-4. AUX-TOC, Sector 3

1-6-5-5. AUX-TOC, Sector 4

1-6-5-6. AUX-TOC, Sector 5

1-6-6. Data File 1-6-6-1. Picture File Sector 1-6-6-2. Text File Sector 1-7. Personal Computer 2. Data Communication through IEEE 1394 Standard according to Embodiment 2-1. Outline 2-2. Stack Model 2-3. Signal Transmission Form 2-4. Bus Connection Between Apparatuses 2-5. Packets 2-6. Transaction Rule 2-7. Addressing 2-8. CIP (Common Isochronous Packet)

2-9. Connection Management 2-10. Command and Response corresponding to FCP 2-11. AV/C Command Packets 2-12. Plugs 2-13. Transmitting Procedure corresponding to Asynchronous Connection 2-14. Background of Present Invention 2-15. Remote Control according to Embodiment 2-16. Remote Control according to Embodiment (in Download State)

1. Digital Satellite Broadcast Receiving System 1-1. Overall Structure

As an embodiment of the present invention, an AV system that transmits and receives data through an IEEE 1394 bus will be described. In this example, the AV system can receive a digital satellite broadcast and download the received data.

First of all, an outline of a digital satellite broadcast transmitting and receiving system that includes the AV system according to the embodiment of the present invention will be described.

Figure 1:
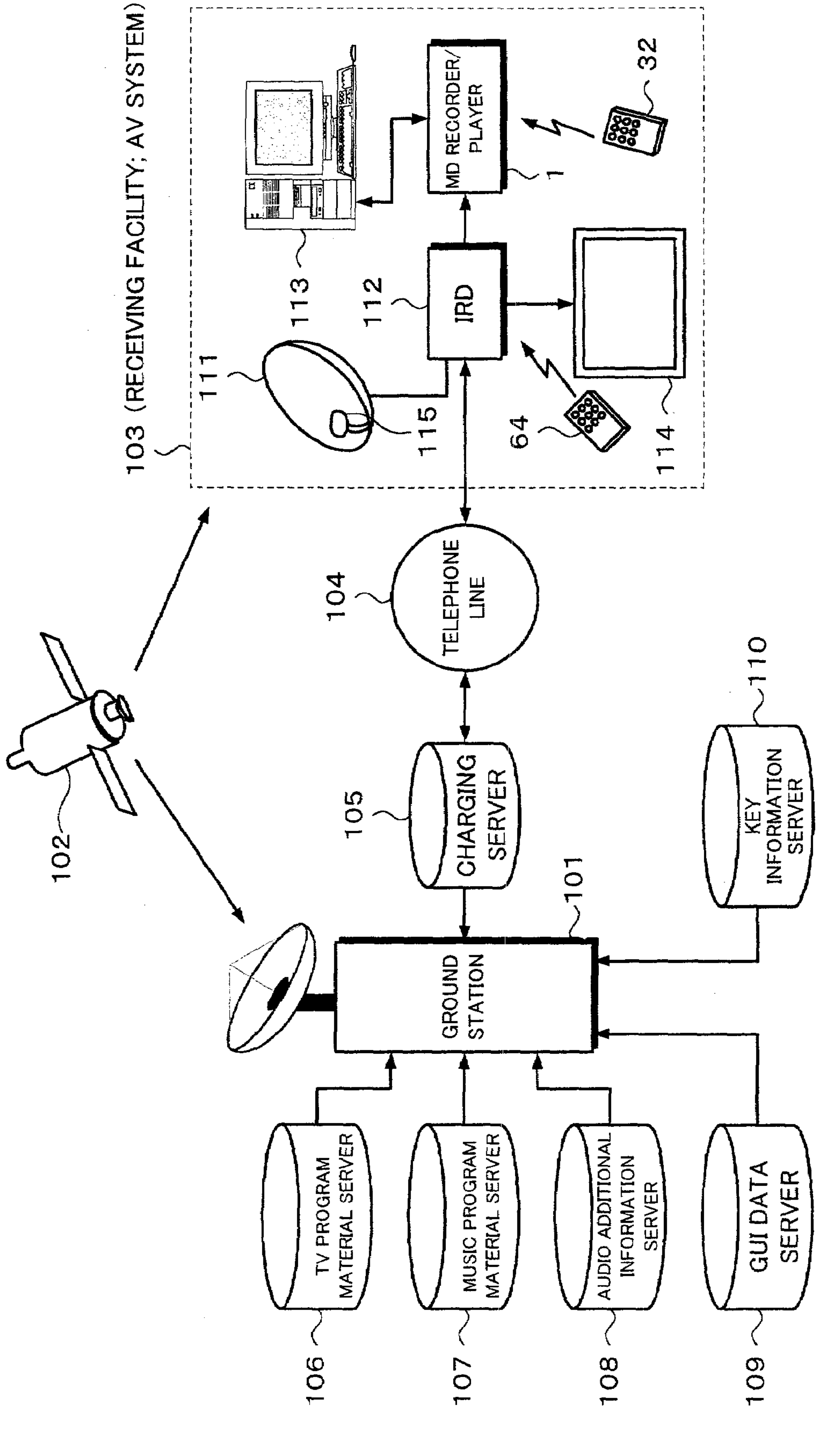
FIG. 1 is a block diagram showing an example of the structure of a digital satellite broadcast receiving system according to an embodiment of the present invention.

FIG. 1 shows the overall structure of the digital satellite broadcast system according to the embodiment. Referring to FIG. 1, a material of television program broadcast data, a material of music program data, audio additional information, and GUI data are supplied from a television program material server 106, a music program material server 107, an audio additional information server 108, and a GUI data server 109 to a digital satellite broadcast ground station 101, respectively.

The television program material server 106 is a server that provides a material of a conventional broadcast program. A material of a music broadcast supplied from the television program material server 106 contains a moving picture and audio data. As an example of a music broadcast program, a moving picture and audio data of the television program material server 106 are used so as to broadcast a moving picture and audio data for promoting a new music program.

The music program material server 107 is a server that provides an audio program using an audio channel. The material of the audio program is only audio data. The music program material server 107 supplies materials of audio programs of a plurality of audio channels to the ground station 101.

In a broadcast of a program of each audio channel, the same music program is broadcast repeatedly at predetermined intervals. The audio channels are independent and can be used in various manners. For example, in one audio channel, latest Japanese popular music programs may be repeatedly broadcast at predetermined intervals. In another audio channel, latest foreign popular music programs are repeatedly broadcast at predetermined intervals.

The audio additional information server 108 is a server that provides time information and so forth of a music program that is output from the music program material server 107.

The GUI data server 109 provides “GUI data” that forms a GUI screen that is used for operations of the user. For a GUI screen used for downloading a music program, the GUI data server 109 provides video data and text data for a list page of music programs to be delivered and/or an information page of such music programs, data for a still picture of an album jacket, and so forth. In addition, the GUI data server 109 provides so-called EPG (Electrical Program Guide) data that is used to display a program list on the AV system 103 side.

The “GUI data” is created corresponding to for example MHEG (Multimedia Hypermedia Information coding Experts Group) system. The MHEG is an international standard for scenario description for handling multimedia information, procedures, operations and so forth and combinations of them as objects, encoding the objects, and producing a title (for example, as a GUI screen) therewith. According to the embodiment, MHEG-5 is used.

The ground station 101 multiplexes information supplied from the television program material server 106. music program material server 107, audio additional information server 108 and GUI data server 109 and transmits the multiplexed information.

According to the embodiment, video data supplied from the television program material server 106 is compression-encoded corresponding to the MPEG (Moving Picture Experts Group) 2 system. In addition, audio data supplied from the television program material server 106 is compression-encoded corresponding to the MPEG 2 audio system. On the other hand, audio data supplied from the music program material server 107 is compression-encoded for each audio channel corresponding to one of the MPEG 2 audio system and the ATRAC (Adoptive Transform Acoustic Coding) system.

When such data is multiplexed, the data is encrypted using key information supplied from a key information server 110.

An example of an internal structure of the ground station 101 will be described later.

A signal transmitted from the ground station 101 is received by a receiving facility (hereinafter referred to sometimes as AV system) 103 disposed in each home through a satellite 102. The satellite 102 has a plurality of transponders. One transponder has a transmission capacity of for example 30 Mbps. The AV system 103 disposed in each home has a parabola antenna 111, an IRD (Integrated Receiver Decoder) 112, a monitor apparatus 114, an MD recorder/player 1, and a personal computer 113.

The AV system 103 shown in FIG. 1 further has a remote controller 64 and a remote controller 32. With the remote controller 64, the user operates the IRD 112. With the remote controller 32, the user operates the MD recorder/player 1

A signal that is broadcast through the satellite 102 is received by the parabola antenna 111. The received signal is converted into a signal of a predetermined frequency by an LNB (low Noise Block down converter) 115 disposed to the parabola antenna 111 and then supplied to the IRD 112.

As general operations, the IRD 112 selects a signal of a predetermined channel from the received signal, demodulates video data and audio data of a program selected from the received signal, and outputs the demodulated video data and audio data as a video signal and an audio signal. In addition, the IRD 112 outputs GUI screen data corresponding to GUI data that has been multiplexed with program data and that has been received. Output data of the IRD 112 is supplied to for example the monitor apparatus 114. Thus, the monitor apparatus 114 can display an image and output audio data of the program received and selected by the IRD 112. In addition, the monitor apparatus 114 can display a GUI screen corresponding to a predetermined operation of the user as will be described later.

The MD recorder/player 1 can record and reproduce audio data to or from a mini disc loaded therein. Moreover, the MD recorder/player 1 can record still picture data (a picture file) of an album jacket or the like and text data (a text file) of the words of a music program, a liner note and so forth associated with audio data (music program data) to a disc, and reproduce and output data of such a picture file, a text file and so forth recorded on the disc in synchronization with a reproduction time of the audio data from the disc.

It should be noted that such data of a picture file, a text file and so forth associated with the above-described audio data is hereinafter referred to as "AUX data" corresponding to handling on the MD recorder/player 1 that will be described later.

The personal computer 113 can edit for example data received by the IRD 112 or data reproduced by the MD recorder/player 1 and perform various desired editing processes for the received data. In addition, corresponding to a user's operation, the personal computer 113 can control the IRD 112 or the MD recorder/player 1.

Figure 2:
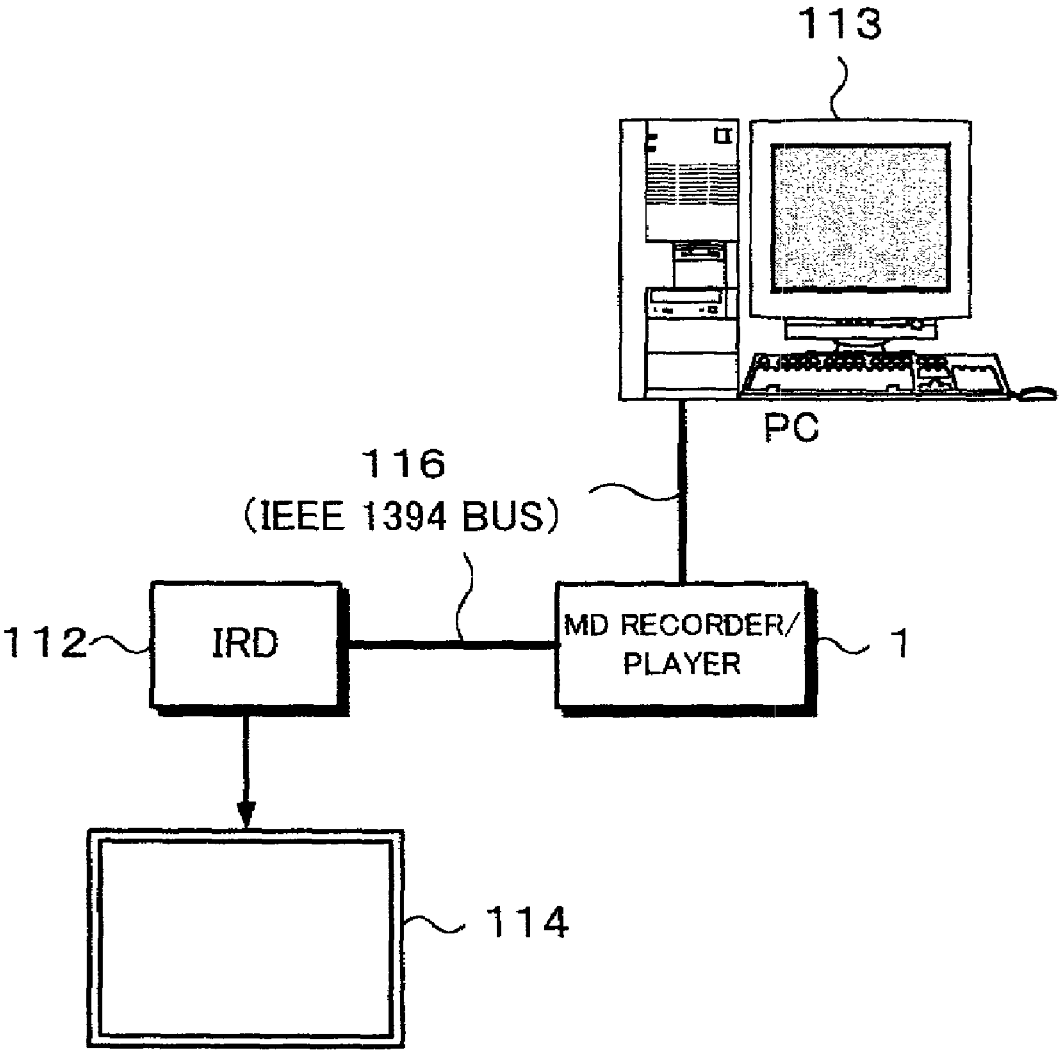
FIG. 2 is a block diagram showing an example of the structure of a receiving facility (AV system) according to the embodiment.

In the AV system 103 according to the embodiment, the IRD 112, the MD recorder/player 1 and the personal computer 113 are connected to each other through an IEEE 1394 bus 116 as shown in FIG. 2.

In other words, each of the IRD 112, the MD recorder/player 1 and the personal computer 113 that compose the AV system 103 has a data interface corresponding to the IEEE 1394 as a data transmission standard.

Consequently, according to the embodiment, audio data (downloaded data) received by the IRD 112 can be directly received and recorded in a compressed state corresponding to the ATRAC system. In addition, AUX data uploaded from the transmission side can be downloaded and recorded together with such audio data.

The IRD 112 can communicate with for example a charging server 105 through a telephone line 104 as shown in FIG. 1. An IC card on which various types of information are stored in such a manner as described later is inserted into the IRD 112. For example, if audio data of a music program is downloaded, history information thereof is stored to the IC card. The stored information of the IC card is sent to the charging server 105 at a predetermined event or timing through the telephone line 104. The charging server 105 charges the user for an amount of money corresponding to the received history information.

As is clear from the above description, in the system according to the present invention, the ground station 101 multiplexes video data and audio data supplied as a material of a music program broadcast from the television program material server 106, audio data supplied as a material of an audio channel from the music program material server 107, audio data supplied from the audio additional information server 108 and GUI data supplied from the GUI data server 109 and transmits the multiplexed data.

When the broadcast is received by the AV system 103 disposed in each home, the user can watch and listen to a program of a selected channel with for example the monitor apparatus 114. In addition, as a GUI screen using GUI data transmitted together with data of a program, firstly an EPG (Electrical Program Guide) screen can be displayed so that the user can search for a program or the like. Secondly, according to the embodiment, when a predetermined operation is performed with a GUI screen for a particular service other than a conventional program broadcast, a special service other than a conventional program service provided by the broadcasting system can be used.

For example, with a GUI screen for downloading an audio (music program) data, the user can download audio data of a desired music program and record the downloaded audio data to the MD recorder/player 1.

According to the embodiment, a data service broadcast that provides the user with a special service other than a conventional program broadcast and that requires an operation for the above-described GUI screen may have interactivity and thereby sometimes referred to as "interactive broadcast".

1-2. Operation with GUI Screen

Next, an example of the use of the above-described interactive broadcast, that is, an example of operation with a GUI screen, will be described briefly with reference to FIGS. 3 and 4. In this example, the case that music program data (audio data) is downloaded will be described.

First, principal operation keys of the remote controller 64 used by the user to operate the IRD 112 will be described with reference to FIG. 3.

Figure 3:
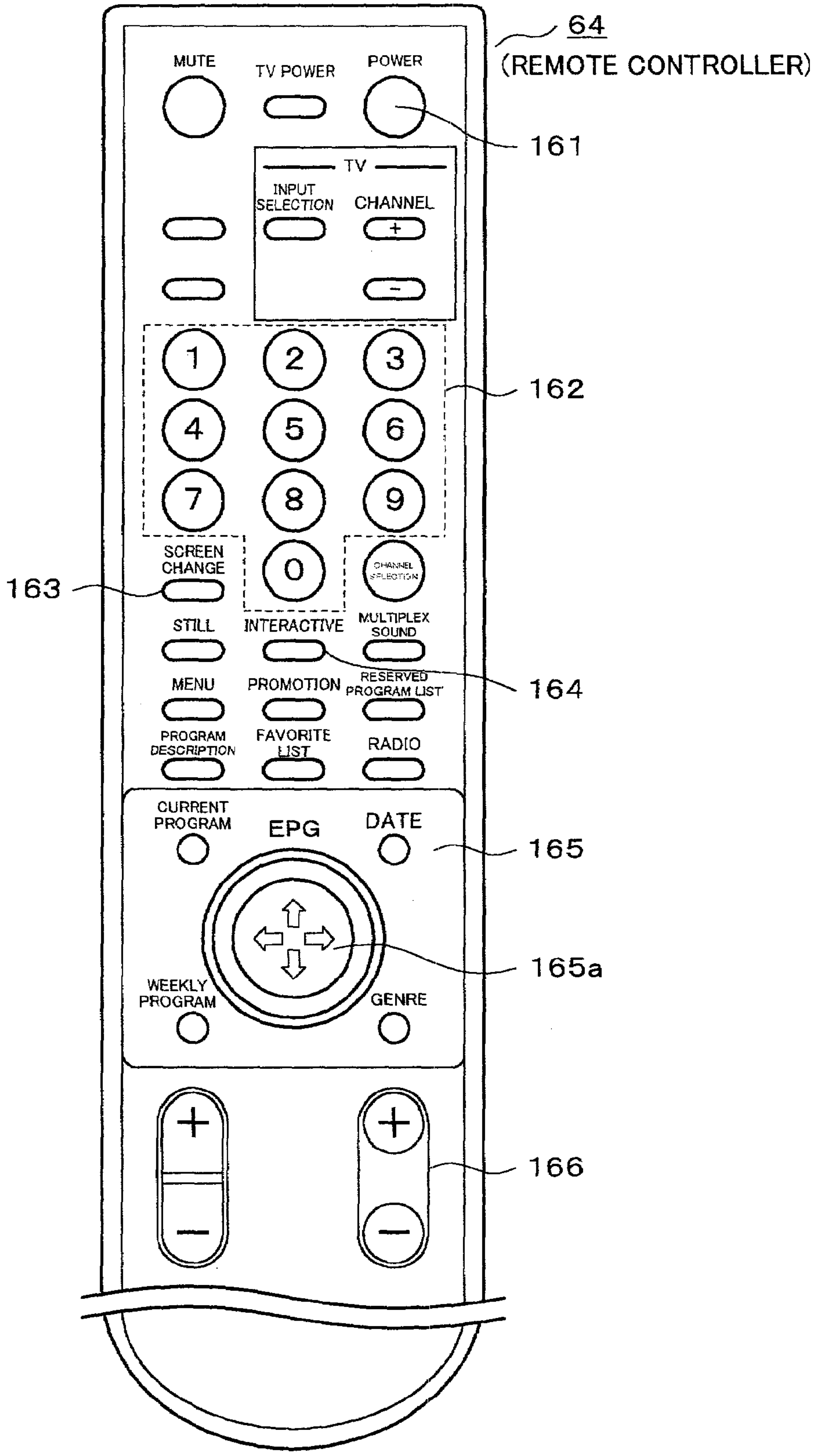
FIG. 3 is a front view showing an appearance of a remote controller for an IRD.

FIG. 3 shows an operation panel surface of the remote controller 64. The operation panel has various keys. Among them, a power key 161, numeral keys 162, a screen display changeover key 163, an interactive changeover key 164, an EPG key panel portion 165 and a channel key 166 are described.

The power key 161 is a key for turning on/off the power supply to the IRD 112. The numeral keys 162 are key for selecting a channel or inputting numeric values on for example a GUI screen with numerals designated.

The screen display changeover key 163 is a key for changing over between for example a conventional broadcast screen and an EPG screen. For example, after an EPG screen is evoked with the screen display changeover key 163, when a key on the EPG key panel portion 165 is operated, a program can be searched on a screen of an electronic program guide. In addition, an arrow mark key 165*a* on the EPG key panel portion 165 can be used to move a cursor on a GUI screen for a service that will be described later.

The interactive changeover key 164 is provided to change over between a conventional broadcast screen and a GUI screen for a service associated with a broadcast program.

The channel key 166 is provided to change over channels of the IRD 112 one by one in an ascending order or a descending order of the channel numbers.

The remote controller 64 according to the embodiment has various keys so as to perform various operations for the monitor apparatus 114 and so forth. For simplicity, the description for keys and so forth provided for the monitor apparatus 114 is omitted.

Next, a real example of the operation for a GUI screen will be described with reference to FIG. 4.

Figure 4A:
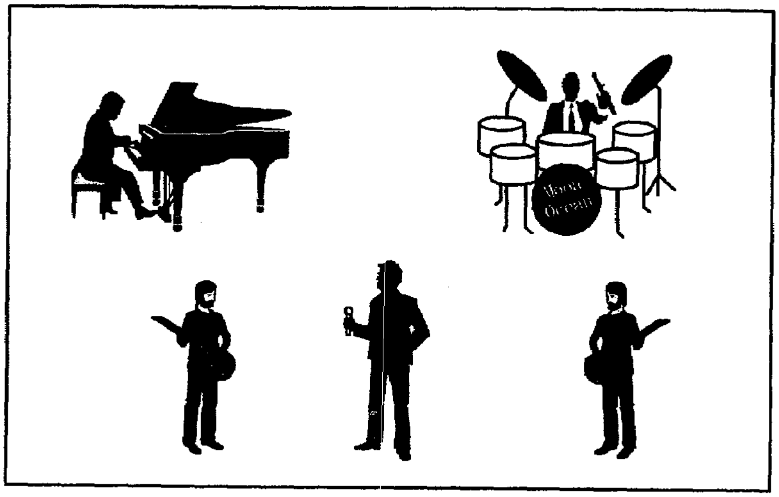
FIG. 4 is a schematic diagram showing a switch-over between a broadcast screen and a GUI screen.
Figure 4B:
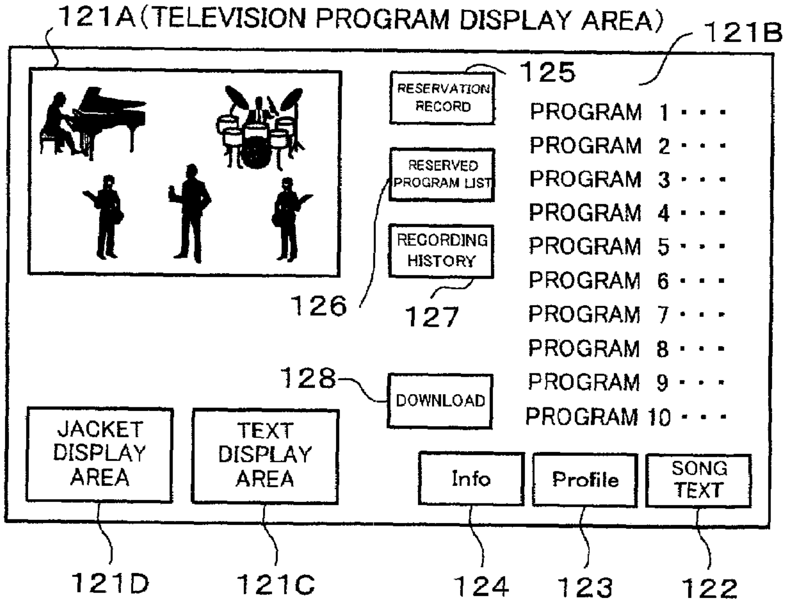

When a broadcast is received and a desired channel is selected by the AV system 103, a moving picture corresponding to a program material supplied from the television program material server 106 is displayed on the display screen of the monitor apparatus 114 as shown in FIG. 4(*a*). In other words, the contents of a conventional program are displayed on the monitor apparatus 114. In this example, it is assumed that for example a music program is displayed. Also, it is assumed that a download service (interactive broadcast) of audio data is associated with the music program.

When the user operates the interactive changeover key 164 of the remote controller 64 while the music program is displayed, the current screen is switched to the GUI screen for downloading of the audio data as shown in FIG. 4(*b*).

On the GUI screen, a reduced image of the video data (shown in FIG. 4(*a*)) supplied from the television program material server 106 is displayed in a television program display area 121A at an upper left portion of the display screen of the monitor apparatus 114.

A music program list 121B of individual audio channels that are broadcast is displayed at an upper right portion of the display screen. A text display area 21C and a jacket display area 121D are displayed at a lower left portion of the display screen. Furthermore, a song text display button 122, a profile display button 123, an information display button 124, a reservation record button 125, a reserved program list display button 126, a recording history display button 127 and a download button 128 are disposed on a right side portion of the screen.

While observing the titles of music programs displayed on the music program list 121B, the user searches a desired music program. When the user has found a desired music program, he or she operates the arrow mark key 165*a* (in the EPG key panel portion 165) of the remote controller 64 to place the cursor at the position of the music program and then enters the selected music program (for example, presses a central position of the arrow mark key 165*a*).

Thus, the user can listen to the music program selected with the cursor. In other words, since the same music program is repeatedly broadcast at intervals of a predetermined time period in each audio channel, the current audio channel is switched to the audio channel of the selected music program by the IRD 112. Thus, the selected music program is output so that the user can listen to the music while the display screen in the television program display area 121A does not vary. At this point, a still image of the MD jacket of the music program is displayed in the jacket display area 121D.

In such a state, when the user places the cursor at the song text display button 122 and then enters it (hereinafter, these operation is referred to as "pressing the button"), the song text of the music program is displayed in the text display area 121C in synchronization with the audio data. Likewise, when the user presses the profile display button 123 or the information display button 124, a profile of an artist corresponding to the music program, concert information, or the like is displayed in the text display area 121C. In such a manner, the user can know what music program is being currently delivered. In addition, the user can know detailed information of each music program.

If the user wants to purchase the music program to which he or she has listened, he or she will press the download button 128. When the download button 128 is pressed, the audio data of the selected music program is downloaded and recorded to a disc by the MD recorder/player 1. Along with audio data of the music program, song text of the music program, profile information of the artist, still picture data of the jacket, and so forth can be downloaded.

Whenever audio data of a music program is downloaded in such a manner, the history information is stored to the IC card inserted into the IRD 112. The information stored in the IC card is read by the charging server 105 for example once a month. Then, the user is charged for an amount of money corresponding to the history of use of the data service. Consequently, the copyright of each downloaded music program can be protected.

In addition, when the user wants to reserve a downloading operation, he or she will press the reservation record button 125. When the user has pressed the reservation record button 125, the current GUI screen is switched to a list of music programs which can be reserved. The list is displayed on the entire screen. For example, the list may show music programs searched every hour, every week, or every channel or the like. When the user selects a music program that he or she wants to reserve to download from the list. The information of the selected music program is registered to the IRD 112. When the user wants to check for all music programs that he or she has already reserved to download, he or she presses the reserved program list display button 126 so as to display them on the entire screen. Each of the music programs reserved in such a manner is downloaded by the IRD 112 at the reserved time. The downloaded music program is recorded to the disc by the MD recorder/player 1.

When the user wants to check for music programs which have been downloaded, he or she presses the recording history display button 127 so as to display a list of music programs that have been downloaded on the entire screen.

In this manner, with the AV system 103 according to the present invention, a list of music programs is displayed on a GUI screen of the monitor apparatus 114. When the user selects a music program on the GUI screen, the user can listen to the music program and know the song text thereof, the profile of the artist, and so forth. In addition, the user can download the music program, reserve the downloading operation of the music program, and display the history of the downloading operation, a list of music programs reserved for the downloading operation, and so forth.

As will be described in brief, a GUI screen as shown in FIG. 4(*b*), a display change for the GUI screen corresponding to an operation of the user, and an audio output can be accomplished by defining the relation of objects as a scenario description corresponding to the above-described MHEG system. In this example, the objects are video data as parts corresponding to the various buttons and material data displayed in the display areas shown in FIG. 4(*b*).

In the specification, an environment of which an output form (image display, audio output, or the like) of information corresponding to a certain object is accomplished by defining the relation of objects as a scenario description such as a GUI screen is referred to as "scene". In this case, it is assumed that an object that forms one scene includes a file as a scenario description.

As described above, in the digital satellite broadcasting system according to the present invention, a broadcast program is delivered. In addition, audio data of music programs is delivered using a plurality of audio channels.

Then, the MD recorder/player, the user can search for a desired music program using a list of music programs that are delivered or the like and easily record the audio data of the desired music program to a disc medium.

As other services rather than the program delivering service of the digital satellite broadcast system, it is possible to consider various services other than the downloading service of music program data. For example, a service for broadcasting a commodity guide program referred to as television shopping and allowing the user to make a purchase contract on a GUI screen may be considered.

1-3. Ground Station

In the above sections, the digital satellite broadcasting system according to the embodiment has been described in brief. Next, the digital satellite broadcasting system will be described in detail. First, the structure of the ground station 101 will be described with reference to FIG. 5.

In the following description, the following assumptions will be applied.

According to the embodiment, to transmission data from the ground station 101 to the AV system 103 through the satellite 102, the DSM-CC (Digital Storage Media-Command and Control) protocol is used.

As well known, the DSM-CC (MPEG-part 6) system defines commands and controlling methods for retrieving an MPEG encoded bit stream stored on a digital storage medium (DSM) or storing a stream to the DSM through a particular network. According to the embodiment, the DSM-CC system is adopted as a transmission standard for the digital satellite broadcast system.

To transmit contents (a set of objects) of a data broadcasting service (for example, a GUI screen) or the like) corresponding to the DSM-CC system, it is necessary to define a description format for contents. According to the embodiment, the above-described MHEG is used as a definition of the description format.

Figure 5:
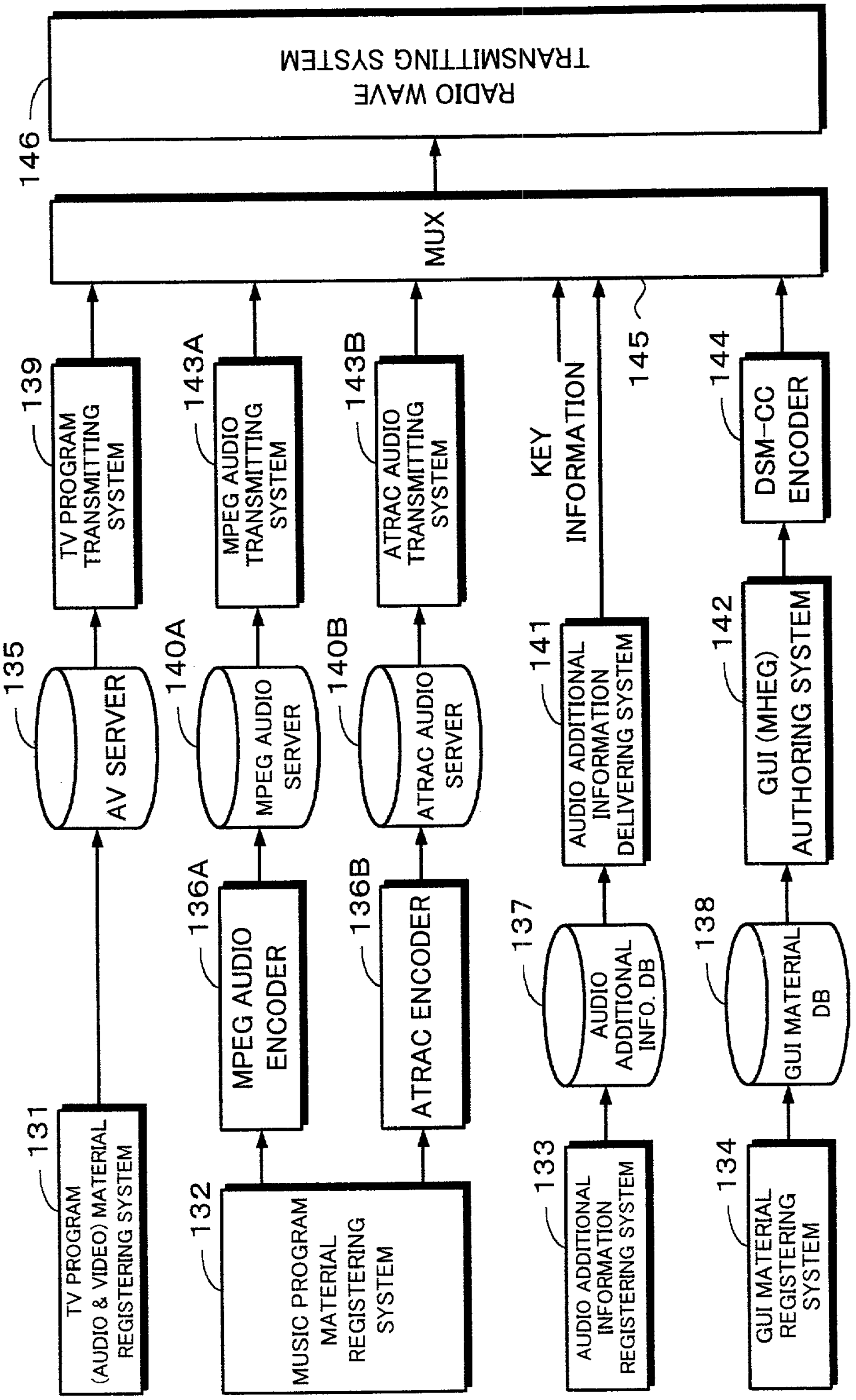
FIG. 5 is a block diagram showing an example of the structure of a ground station.

In the ground station 101 shown in FIG. 5, a television program material registering system 131 registers material data supplied from the television program material server 106 to an AV server 35. The material data is sent to a television program transmitting system 139. The television program transmitting system 139 compresses video data corresponding to for example the MPEG 2 system and packetizes audio data corresponding to for example the MPEG 2 audio system. An output signal of the television program transmitting system 139 is sent to a multiplexer 145.

A music program material registering system 132 supplies material data (audio data) received from the music program material server 107 to an MPEG 2 audio encoder 136A and an ATRAC encoder 136B. The MPEG 2 audio encoder 136A and the ATRAC encoder 136B perform an encoding process (compression-encoding process) for the audio data supplied thereto and register the encoded data to an MPEG audio server 140A and an ATRAC audio server 140B, respectively.

The MPEG audio data registered to the MPEG audio server 140A is sent to an MPEG audio transmitting system 143A. The MPEG audio server 140A packetizes the MPEG audio data and sends the packetized data to the multiplexer 145. The ATRAC data registered in the ATRAC audio server 140B is sent as quadruple speed ATRAC data to an ATRAC audio transmitting system 143B. The ATRAC audio transmitting system 143B packetizes the quadruple speed ATRAC data and sends the packetized data to the multiplexer 145.

An audio additional information registering system 133 registers audio additional information that is material data received from the audio additional information server 108 to an audio additional information database 137. The audio additional information registered to the audio additional information database 137 is sent to an audio additional information transmitting system 141. Likewise, the audio additional information transmitting system 141 packetizes the audio additional information and sends the packetized data to the multiplexer 145.

A GUI material registering system 134 registers GUI data, which is material data received from the GUI data server 109, to a GUI material database 138.

The GUI material data registered to the GUI material database 138 is sent to a GUI authoring system 142. The GUI authoring system 142 processes the GUI material data so that a GUI screen is displayed (namely, a "scene" shown in FIG. 4 is output).

In other words, in the case of a GUI screen for downloading a music program, data sent from the GUI authoring system 142 includes still picture data of an album jacket, text data of the song text of the music program, and audio data to be output corresponding to a user's operation.

These types of data described above are referred to as mono medium. With an MHEG authoring tool, the GUI authoring system 142 encodes such mono medium data and handles it as an object.

Then, contents corresponding to the MHEG-5 system are generated along with a scenario description file (script) that defines the relation of objects so that video and audio data corresponding to the display form of such a scene (GUI screen) described with reference to FIG. 4(*b*) and an operation corresponding thereto are obtained. On such a GUI screen as shown in FIG. 4(*b*), video and audio data (MPEG video data and MPEG audio data) corresponding to material data of the television program material server 106, MPEG audio data corresponding to music program material data of the music program material server 107, and so forth are displayed and output data corresponding to a user's operation is obtained.

Thus, in the scenario description file, when necessary, the GUI authoring system 042 handles video and audio data corresponding to material data of the television program material server 106, MPEG audio data corresponding to music program material data of the music program material server 107, and audio additional information corresponding to the audio additional information server 108 as objects and defines them with MHEG scripts.

Data of MHEG contents sent from the GUI authoring system 142 may be script files and various still picture files or text data files as objects. The still picture data is for example data of 640×480 pixels compressed corresponding to the JPEG (Joint photograph Experts Group) system whereas the text data is a file of for example less than 800 characters.

Data of MHEG contents obtained by the GUI authoring system 142 is sent to a DSM-CC encoder 144.

The DSM-CC encoder 144 converts the MHEG contents data into a transport stream (hereinafter referred to simply as TS (Transport Stream)) of a format with which it can be multiplexed with data streams of video data and audio data corresponding to the MPEG 2 format. Next, the DSM-CC encoder 144 packetizes the transport stream and outputs the packetized data to the multiplexer 145.

The multiplexer 145 multiplexes video packets and audio packets received from the television program transmitting system 139, audio packets received from the MPEG audio transmitting system 143A, quadruple speed audio packets received from the ATRAC audio transmitting system 143B, audio additional information packets received from the audio additional information transmitting system 141, and GUI data packets received from the GUI authoring system 142 on time axis and encrypts the multiplexed data with key information that is output from the key information server 110 (FIG. 1).

Output data of the multiplexer 145 is sent to a radio wave transmitting system 146. The radio wave transmitting system 146 performs various processes for example an adding process of error correction codes, a modulating process, and a frequency converting process for the received data and transmits the resultant signal to the satellite 102 through an antenna.

1-4. Transmission Format

Next, a transmission format according to the present embodiment defined corresponding to the DSM-CC system will be described.

Figure 6:
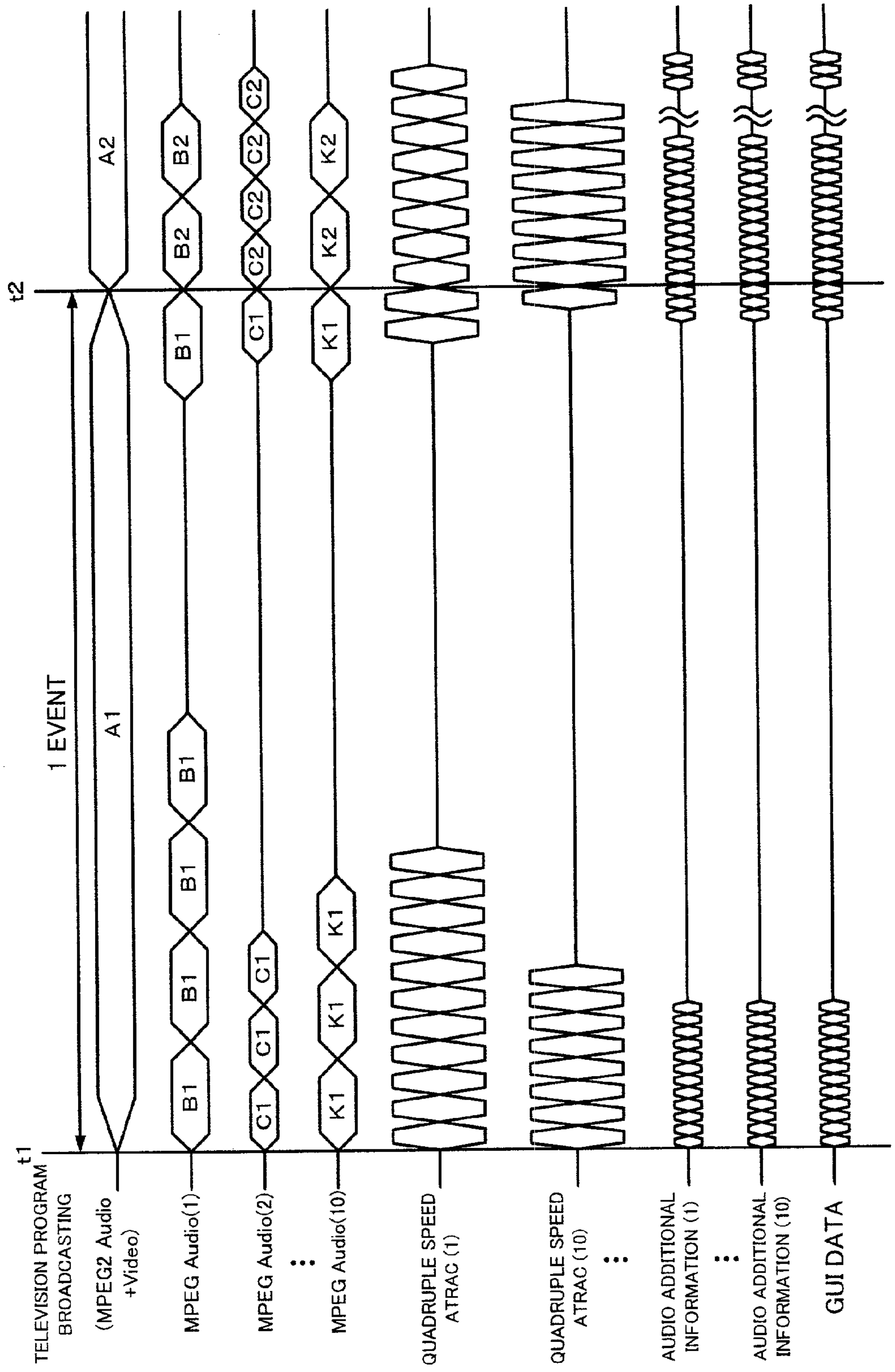
FIG. 6 is a chart showing data transmitted from the ground station.

FIG. 6 shows an example of data transmitted from the ground station 101 to the satellite 102. It should be noted that as described above the various types of data shown in FIG. 6 are multiplexed on a time base. In addition, as shown in FIG. 6, an event occurs in a time period from time t1 to time t2. Another event occurs after time t2. In the case of a channel of a music program, an event is for example a unit of which a set of lineup of a plurality of music programs is changed. The time period of each event is approximately 30 minutes or around one hour.

As shown in FIG. 6, in the event from time t1 to time t2, a program having predetermined contents A1 is broadcast as a conventional broadcast program of a moving pictures. In the event starting from time t2, another program having contents A2 is broadcast as a conventional broadcast program of both a moving picture and audio data.

MPEG audio channels (1) to (10) are prepared for 10 channels from channel CH1 to channel CH10. In this example, in each of the audio channels CH1, CH2, CH3, . . . , CH10, the same music program is repeatedly transmitted while one event is broadcast. In other words, in the period of the event from time t1 to time t2, a music program B1 is repeatedly transmitted in the audio channel CH1, and another music program C1 is repeatedly transmitted in the audio channel CH2. Likewise, a music program K1 is repeatedly transmitted in the audio channel CH10. This applies to quadruple speed ATRAC audio channels (1) to (10) that follow the audio channels (1) to (10).

In other words, in FIG. 6, when the channel number of an MPEG audio channel is equal to the channel number of a quadruple speed ATRAC audio channel, the music program transmitted in the MPEG audio channel is the same as the music program transmitted in the quadruple speed ATRAC audio channel. In addition, the numeral in the parentheses that represents a channel number of audio additional information represents audio additional information added to audio data having the same channel number. Furthermore, still picture data and text data transmitted as GUI data are formed for each channel. These types of data are time division multiplexed in MPEG 2 transport packets as shown in FIG. 7(*a*) to FIG. 7(*d*) and transmitted. Then, data is restructured by the IRD 112 as shown in FIG. 7(*e*) to FIG. 7(*h*) using header information of each data packet.

In the transmission data shown in FIGS. 6 and 7, at least GUI data used for a data service (interactive broadcast) is logically formed in the following manner corresponding to the DSM-CC system. Next, only data of a transport stream that is output from the DSM-CC encoder 144 will be described.

Figures 8A, 8B, 8C, 8D, 8E, 8F:
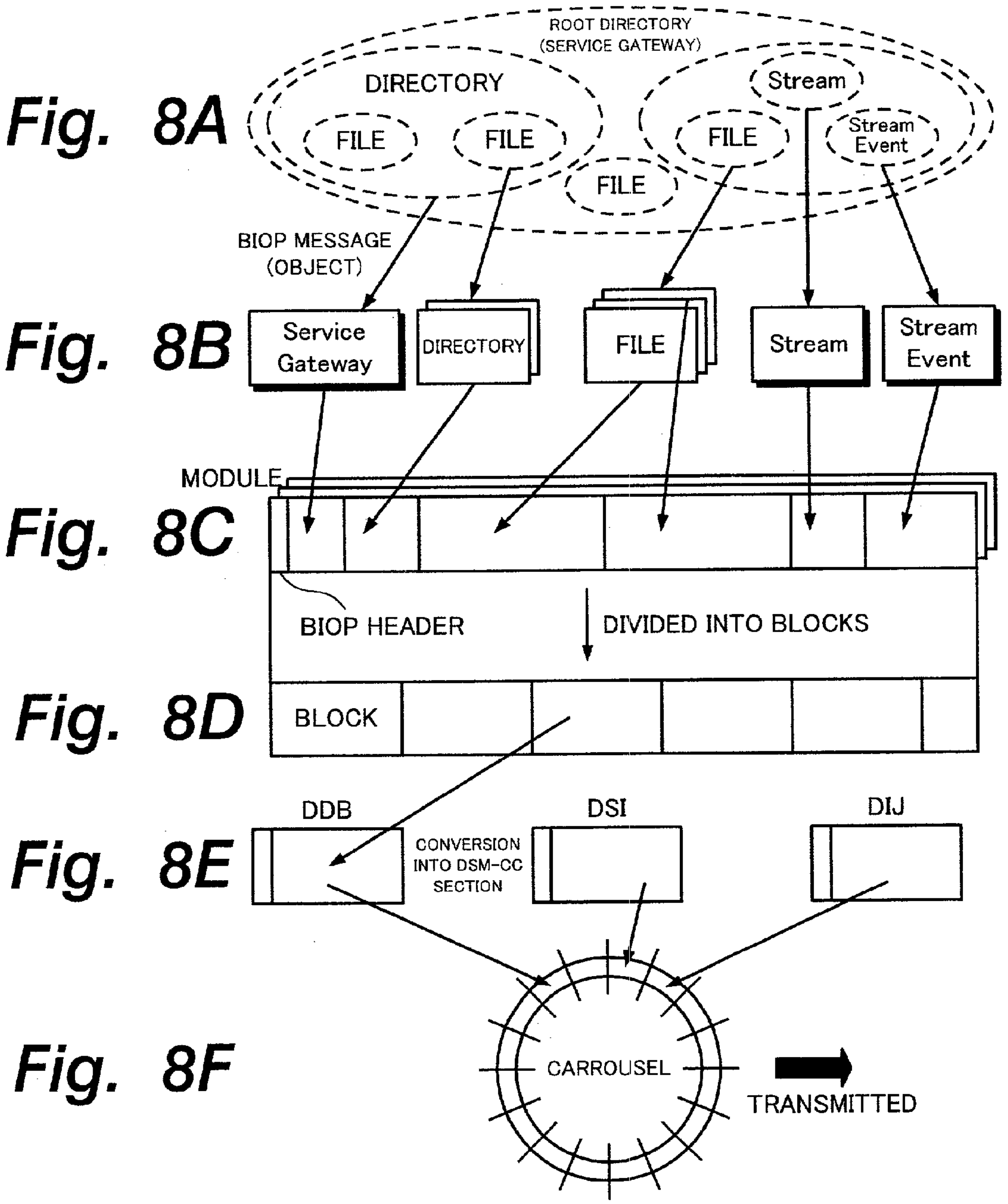
FIG. 8 is a schematic diagram for explaining a transmission format of an DSM-CC.

As shown in FIG. 8 (*a*), all data broadcasting services transmitted corresponding to the DSM-CC system according to the embodiment are contained in a root directory named Service Gateway. The service Gateway includes several types of objects that are directories, files, streams, and stream events.

In these objects, the files are various data files of still pictures, audio data, text data, and MHEG scripts.

The streams include information to be linked to other data services and AV streams (MPEG video data and audio data of a television program material, MPEG audio data and ATRAC audio data as a music program material, and so forth).

The stream events include similar link information and time information.

The directories are folders in which data relating to each other is collected.

In the DSM-CC system, each of such unit information and the Service Gateway is handled as an object as shown in FIG. 8(*b*) and each object is converted into a form of a BIOP message.

According to the present invention, since the categorization of three types of objects as files, streams, and stream events is not essential, they are represented with objects as files.

In the DSM-CC system, a data unit referred to as module shown in FIG. 8(*c*) is generated. The module is a variable length data unit that contains at least one BIOP message object and a BIOP header. The module is also a buffering unit of received data on the reception side that will be described later.

In the DSM-CC system, in the case that one module is formed of a plurality of objects, the relation between objects is not specifically defined or restricted. In an extreme case, even if one module is formed of two or more objects of different scenes that do not relate to each other, the module does not violate the rules of the DSM-CC system.

The module is generally divided into data fixed length units that are referred to as "blocks" as shown in FIG. 8(*d*) so that it is transmitted in a form of a section defined in the MPEG 2 format. However, the last block of the module may not be a fixed length block. This is because according to the MPEG 2 format, one section should not exceed 4 KB.

In this case, the data unit of a block is a synonym of a section.

A header is added to a block into which a module is divided as shown in FIG. 8(*e*) and converted into a form of a message referred to as DDB (Download Data Block).

In parallel with the conversion into DDB, control messages DSI (Download Server Initiate) and DII (Download Indication Information) are generated.

The DSI and the DII are information required for extracting a module from received data on the reception side (IRD 112). The DSI contains an identifier of a carousel (module) (that will be described next), general information of carousel (a time period required for one rotation thereof and a timeout value of the rotation thereof), and so forth. The DSI further contains information for the location of the root directory (Service Gateway) of a data service (in the case of an object carousel system).

The DII is information corresponding to each module included in the carousel. The DII contains information of a size, a version, and a timeout value of each module.

Three types of messages of the DDB, DSI and DII are transmitted periodically and repeatedly corresponding to a data unit of the section as shown in FIG. 8(*f*). Consequently, the receiver side can always receive a module that contains an object necessary for obtaining for example a desired GUI screen (scene).

In the specification, such a transmission system is referred to as "carousel system" because of the similarity to a carousel; a data transmission form shown in FIG. 8(*f*) is referred to as carousel.

In addition, the "carousel system" is categorized as two levels of a "data carousel system" and an "object carousel system". Particularly, in the object carousel system, objects having such attributes as a file, a directory, a stream and a service gateway are transmitted as data using a carousel. The object carousel system is largely different from the data carousel system in that it can handle a directory structure. The system according to the embodiment uses the object carousel system.

GUI data transmitted by a carousel in such a manner, that is, data output from the DSM-CC encoder 144 shown in FIG. 5, is output in the form of a transport stream. The transport stream has a structure as shown in for example FIG. 9.

Figures 9A, 9B, 9C:
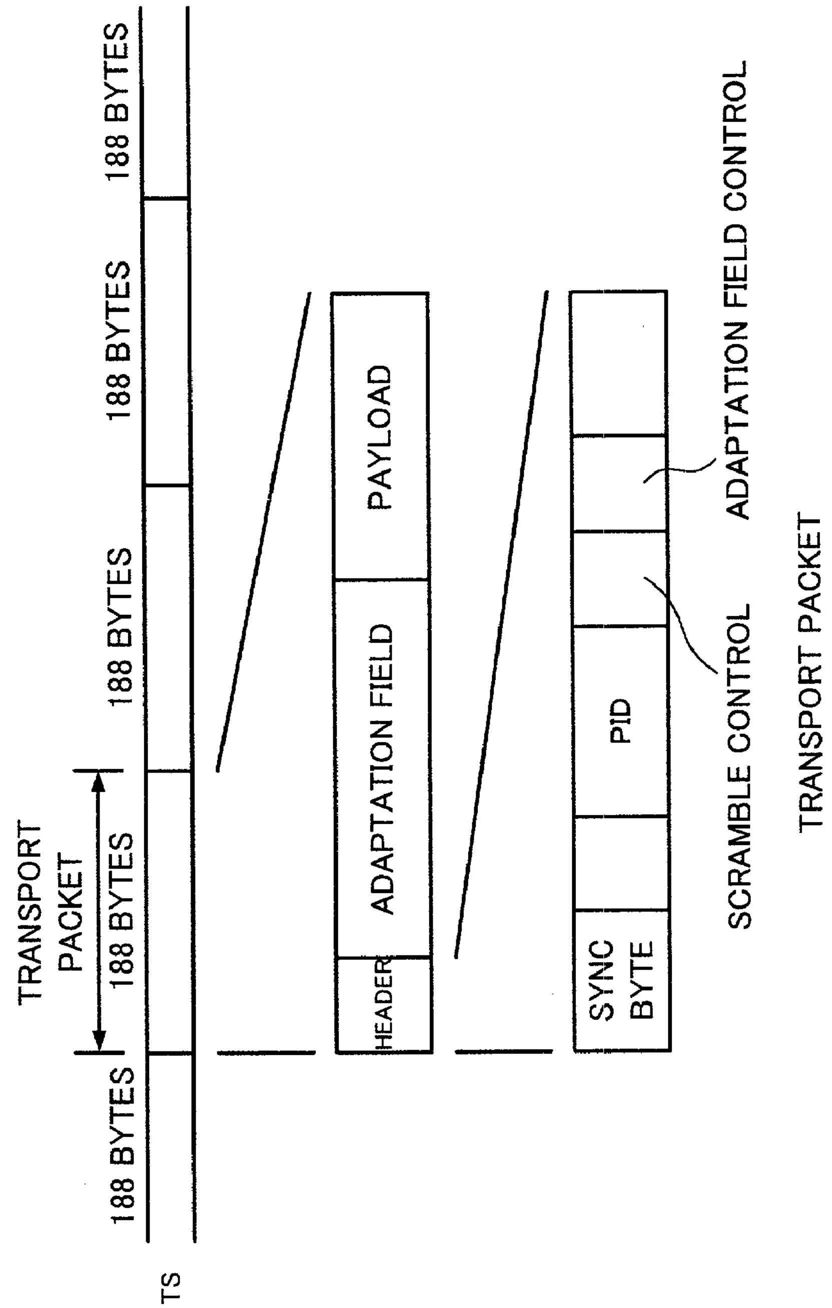
FIG. 9 is a schematic diagram showing the data structure of a transport stream.

FIG. 9(*a*) shows a transport stream. The transport stream is a bit train defined in the MPEG system and is formed of a sequence of fixed length packets (transport packets) of 188 bytes as shown in FIG. 9(*a*).

As shown in FIG. 9(*b*), each transport packet is composed of a header, an adaptation field for allowing additional information to be included in a particular individual packet, and a payload (data area) that is contents (video/audio data and so forth) of the packet.

The substantial length of the header is for example four bytes whose first byte is a synchronization byte as shown in FIG. 9(*c*). The synchronous byte is followed by a PID (Packet_ID) that is identification information of the packet, scramble control information that represents whether or not the packet has been scrambled, adaptation field control information that represents whether or not the header is followed by an adaptation field and a payload (that will be described later).

Corresponding to such control information, the receiver side can descramble each packet and causes a demultiplexer to separate and extract a required packet of video/audio data and so forth. In addition, the receiver side can reproduce time information that is used as a reference for synchronously reproducing video/audio data.

As is clear from the description that precedes, one transport stream is multiplexed with packets of video/audio/data of a plurality of channels. One transport stream is also multiplexed with a signal for selecting a channel (this signal is referred to as PSI (Program Specific Information), information necessary for restricting reception of pay channels corresponding to the user's subscription contract (this information is referred to as EMM/ECM), and SI (Service Information) for accomplishing a service of an EPG or the like. Next, the PSI will be described.

Figures 10A, 10B, 10C, 10D:
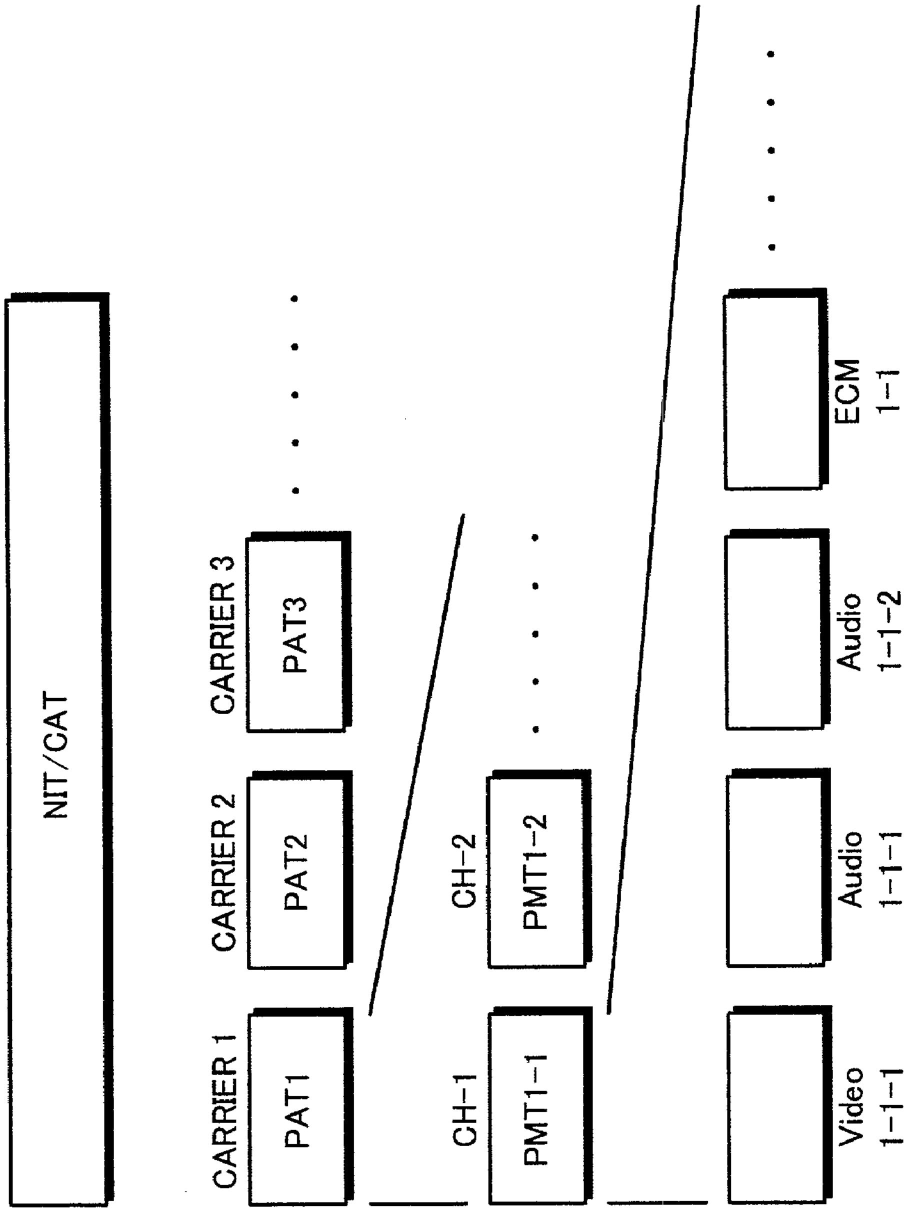
FIG. 10 is a schematic diagram for explaining the table structure of a PSI.

As shown in FIG. 10, the PSI is formed of four tables. Each of the tables is represented in a section format corresponding to the MPEG system.

FIG. 10(*a*) shows a table of an NIT (Network Information Table) and a CAT (Conditional Access Table).

The same NIT is multiplexed with all carriers. The NIT contains various transmission factors (a polarization plane, a carrier frequency, a convolution rate, and so forth) for each carrier and a list of multiplexed channels. The PID of the NIT is 0x0010.

Likewise, the same CAT is multiplexed with all carriers. The CAT contains a PID of an EMM (Entitlement Management Message) packet that is unique information for identifying the restrictive reception system, contract information, and so forth. The PID of the CAT is 0x0001.

FIG. 10(*b*) shows PATs as information unique to individual carriers. Each PAT contains channel information of the carrier and a PID of a PMT that represents contents of the channel. The POD of each PAT is 0x0000.

As information of each channel of a carrier, PMTs (Program Map Tables) shown in FIG. 10(*c*) are provided.

The PMTs are multiplexed with contains of individual channels. For example, the PMTs contain components (video/audio data and so forth) composing individual channels and a PID of an ECM (Encryption Control Message) packet necessary for descrambling these components as shown in FIG. 10(*d*). The PID of each PMT is designated by a PAT.

1-5. IRD

Next, an example of the structure of the IRD 112 disposed in the AV system 103 will be described with reference to FIG. 11.

Figure 11:
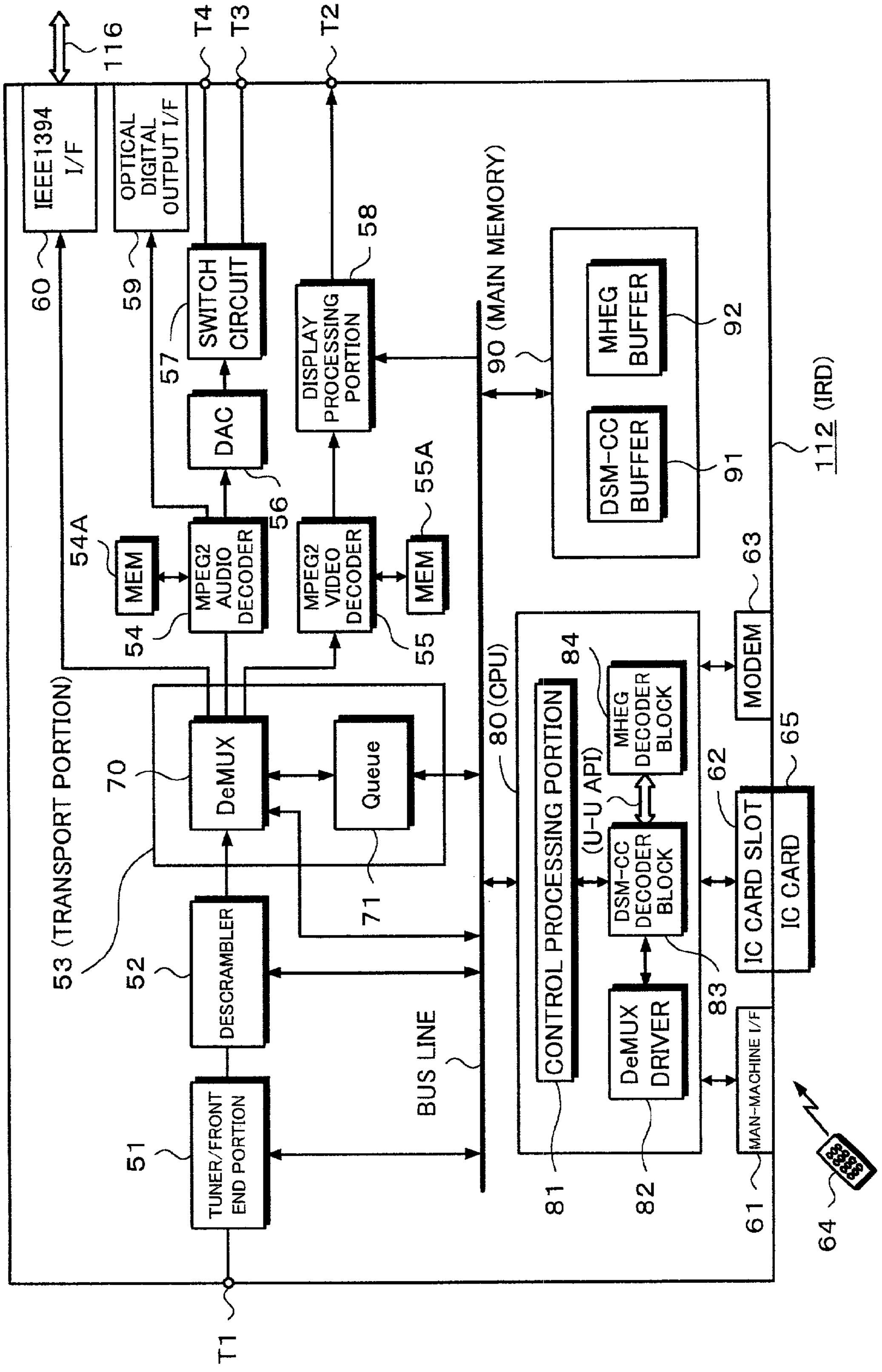
FIG. 11 is a schematic diagram for explaining the structure of the IRD.

The IRD 112 shown in FIG. 11 has an input terminal T1. A received signal is received by the parabola antenna 111 and converted into a signal with a predetermined frequency by the LNB 115 of the parabola antenna 111. The resultant signal is supplied to the input terminal T1 and supplied to a tuner/front end portion 51. Corresponding to a set signal for the transmission factors and so forth received from a CPU (Central Processing Unit) 80, the tuner/front end portion 51 receives a carrier (with a reception frequency) and performs necessary processes such as for example a Viterbi demodulation process and an error correction process for the carrier so as to obtain a transport stream.

The transport stream obtained by the tuner/front end portion 51 is supplied to a descrambler 52. The tuner/front end portion 51 also obtains a PSI packet from the transport stream and updates channel selection information of the PSI packet. Furthermore, the tuner/front end portion 51 obtains the component PID of each channel from the transport stream and sends it to for example the CPU 80. Thus, the CPU 80 uses the obtained PIDs for processing of the received signal.

The descrambler 52 receives descramble key data stored in an IC card 65 through the CPU 80. The CPU 80 sets a PID to the descrambler 52. The descrambler 52 performs a descrambling process corresponding to the descramble key data and the PID and sends the resultant data to a transport portion 53.

The transport portion 53 is composed of a demultiplexer 70 and a queue (Queue) 71 that is for example a DRAM. The queue (Queue) 71 is composed of a plurality of memory areas arranged in a column shape corresponding to modules. For example, according to the embodiment, 32 columns of memory areas are provided. In other words, the queue 71 can store information of up to 32 modules at a time.

As general operations, the demultiplexer 70 separates a required transport packet from the transport stream supplied from the descrambler 52 corresponding to filter conditions that have been set by a DeMUX driver 82 of the CPU 80, when necessary, uses the queue 71 as a working area, obtains data in the format as shown in FIG. 7(*e*) to FIG. 7(*h*), and supplies the obtained data to necessary functional circuit portions.

MPEG video data separated by the demultiplexer 70 is input to an MPEG 2 video decoder 55 while MPEG audio data is input to an MPEG audio decoder 54. Individual packets of the MPEG video/audio data separated by the demultiplexer 70 are input in a format referred to as PES (Packetized Elementary Stream) to the respective decoders.

Data of MHEG contents of the transport stream is separated and extracted for each transport packet from the transport stream by the demultiplexer 70 and written to relevant memory areas of the queue 71 so that the extracted data is arranged for each module. Then, the data of the MHEG contents arranged for each module is written to a DSM-CC buffer 91 in a main memory 90 through the data bus under the control of the CPU 80 and then stored in the DSM-CC buffer 91.

Quadruple speed ATRAC data (compressed audio data) is separated and extracted from the transport stream by the demultiplexer 70 for each transport packet or the like and then output to an IEEE 1394 interface 60. The IEEE 1394 interface 60 can transmit not only of audio data but also video data, text data, various command signals and so forth.

The MPEG 2 video decoder 55 that inputs the MPEG video data in the format of the PES decodes the MPEG video data corresponding to the MPEG 2 format using a memory 55A as a working area. The decoded video data is supplied to a display processing portion 58.

The display processing portion 58 inputs the video data from the above described MPEG 2 video decoder 55 and video data for a GUI screen or the like for a data service obtained by an MHEG buffer 92 of the main memory 90 (that will be described later). The display processing portion 58 performs a required signal process for the video data that has been input in such a manner so as to covert the video data into an analog audio signal corresponding to a predetermined television system. The display processing portion 58 outputs the analog audio signal to an analog video output terminal T2.

Consequently, when the analog video output terminal T2. and a video input terminal of the monitor apparatus 114 are connected, a picture as shown in for example FIG. 4 is displayed.

The MPEG 2 audio decoder 54 that inputs the MPEG audio data in the format of the PES decodes the MPEG audio data corresponding to the MPEG 2 format using a memory 54A as a working area. The decoded audio data is supplied to D/A converter 56 and an optical digital output interface 59.

The D/A converter 56 converts, the input audio data into an analog audio signal and outputs the analog audio signal to a switch circuit 57. The switch circuit 57 selects one of signal paths to analog audio output terminals T3 and T4.

In this example, it is assumed that the analog audio output terminal T3 is disposed so as to be connected to an audio input terminal of the monitor apparatus 114. Meanwhile, the analog audio output terminal T4 is used to output a downloaded music program as an analog signal.

The optical digital output interface 59 converts the input digital audio data into an optical digital signal and outputs the optical digital signal. In this example, the optical digital output interface 59 corresponds to for example the IEC 958.

The main memory 90 is used as a working area for various controlling processes performed by the CPU 80. According to the embodiment, areas for the DSM-CC buffer 91 and the MHEG buffer 92 are allocated to the main memory 90.

The MHEG buffer 92 is used as a working area for video data (for example, video data for a GUI screen) generated corresponding to a script of the MHEG system. The generated video data is supplied to the display processing unit 58 through a bus line.

The CPU 80 controls the entire IRD 112. The CPU 80 causes the demultiplexer 70 to separate and extract data from a data stream.

The CPU 80 further performs a decoding process for data of the obtained MHEG contents so as to form a GUI screen (scene) corresponding to the script and an outputting process for outputting the formed GUI screen data.

To do that, in addition to a control processing portion 81 that performs major controlling processes, the CPU 80 according to the embodiment comprises for example the DeMUX driver 82, a DSM-CC decoder block 83, and an MHEG decoder block 84. According to the embodiment, at least the DSM-CC decoder block 83 and the MHEG decoder block 84 are accomplished by software.

The DeMUX driver 82 sets filter conditions for the demultiplexer 70 corresponding to the PID of the input transport stream.

The DSM-CC decoder block 83 has a function as a DSM-Manager. Thus, the DSM-CC decoder block 83 restructures data as modules stored in the DSM-CC buffer 91 into data of MHEG contents. In addition, the DSM-CC decoder block 83 performs a process in association with a predetermined DSM-CC decoding process and so forth corresponding to an accessing operation of the MHEG decoder block 84.

The MHEG decoder block 84 accesses the data of MHEG contents obtained from the DSM-CC decoder block 83, that is, the data of MHEG contents obtained from the DSM-CC buffer 91 and performs a decoding process for outputting scene data. In short, the MHEG decoder block 84 forms a scene corresponding to the relation between objects defined by a script file of the MHEG contents. In this example, when the MHEG decoder block 84 forms a GUI screen as a scene, the MHEG decoder block 84 uses the MHEG buffer 92 and generates video data for the GUI screen corresponding to the script file stored in the MHEG buffer 92.

As an interface between the DSM-CC decoder block 83 and the MHEG decoder block 84, a U—U API (Application Portability Interface) is used.

The U—U API is an interface for accessing a DSM manager object (that is a server object for accomplishing a function of a DSM). The U—U API performs a process for objects such as a service gateway, a directory, a file, a stream, and a stream event.

A client object can perform a process for those objects with the U—U API.

Next, an example of the operation for extracting an object necessary for forming a scene from a transport stream under the control of the CPU 80 will be described.

The DSM-CC uses an IOR (Interoperable Object Reference) so as to represent the location of an object in a transport stream. The IOR includes an identifier corresponding to a carousel for finding out an object, an identifier of a module that contains the object (this identifier is denoted by module_id), and an identifier for identifying an object in one module (this identifier is denoted by object_key). In addition, the IOR includes tag information for identifying a DII that has information of the module that contains the object (this tag is denoted by association_tag).

In addition, the DII having the module information includes information of module_id, the module size, and the module version of each of at least one modules and tag (association_tag) information for identifying the module.

When the CPU 80 has identified an IOR extracted from a transport stream, an object represented by the IOR is received and separated by for example processes that follow.

(Pr1) The DeMUX driver 82 of the CPU 80 searches an elementary stream having the same value as the association_tag of the IOR (this elementary stream is denoted by ES) from an ES loop of the PMP of the carousel and obtains a PID. The ES having the PID contains the DII.

(Pr2) The PID and a table_id_extension are set as filter conditions to the demultiplexer 70. Thus, the demultiplexer 70 separates the DII and outputs it to the CPU 80.

(Pr3) The association_tag of a module corresponding to the module_id included in the former IOR is obtained from the DII.

(Pr4) An ES having the same value as the association_tag is searched from the ES loop (carousel) of the PMT and then a PID is obtained. The desired module is included in the ES that has the PID.

(Pr5) With the PID and the module_id that are set as filter conditions, transport packets are filtered by the demultiplexer 70. Transport packets separated and extracted corresponding to the filter conditions are stored to predetermined memory areas (columns) of the queue 71. Thus, desired modules are finally formed.

(Pr6) An object that corresponds to the object_key included in the preceding IOR is extracted as a desired object from the module. The object extracted from the module is written to for example a predetermined area of the DSM-CC buffer 91.

For example, by repeating the above-described operations, desired target objects are collected and stored to the DSM-CC buffer 91. Thus, MHEG contents that form a necessary scene are obtained.

A man-machine interface 61 receives a command signal from the remote controller 64 and sends it to the CPU 80. The CPU 80 executes a predetermined controlling process so as to operate an apparatus corresponding to the received command signal.

An IC card 65 is inserted into an IC card slot 62. The CPU 80 performs reading and writing operations of information from and to the IC card 65 inserted in the IC card slot 62.

A modem 63 is connected to the charging server 105 through the telephone line 104. A communication is made between the IRD 112 and the charging server 105 under the control of the CPU 80.

Next, flows of signals from video/audio sources in the IRD 112 structured as described above will be supplementally described with reference to the display form shown in FIG. 4.

When a conventional program is output in the form shown in FIG. 4(*a*), MPEG video data and MPEG audio data of a necessary program are extracted from an input transport stream and then decoded. The decoded MPEG video data and the decoded MPEG audio data are output to the analog video output terminal T2 and the analog audio output terminal T3, respectively. Thus, the monitor apparatus 114 can display the image of the broadcast program and output audio data thereof.

On the other hand, when a GUI screen shown in FIG. 4(*b*) is output, data of MHEG contents necessary for the GUI screen (scene) is separated and extracted from an input transport stream by the transport portion 53 and stored to the DSM-CC buffer 91. Then, the DSM-CC decoder block 83 and the MHEG data block 84 process the obtained data and thereby the MHEG buffer 92 generates video data for the scene (GUI screen). The video data is supplied to the analog video output terminal T2 through the display processing portion 58. Thus, the monitor apparatus 114 displays the GUI screen.

In addition, when a music program is selected from a list 121B of music programs on the GUI screen shown in FIG. 4(*b*) and audio data of the music program is demonstrated, MPEG audio data of the music program is obtained by the demultiplexer 70. Then, the MPEG audio data is output as an analog audio signal to the monitor apparatus 114 through the MPEG audio decoder 54, a D/A converter 56, a switch circuit 57 and an analog audio output terminal T3.

On the other hand, when the download button 128 is pressed on the GUI screen shown in FIG. 4(*b*) so as to download audio data, audio data of a music program to be downloaded is extracted by the demultiplexer 70 and output to the analog audio output terminal T4, the optical digital output interface 59 or the IEEE 1394 interface 60.

Next, when the MD recorder/player 1 is connected through the IEEE 1394 bus 116 to the IEEE 1394 interface 60, quadruple speed ATRAC data of the downloaded music program is extracted by the demultiplexer 70 and recorded to a disc loaded in the MD recorder/player 1 from the IEEE 1394 interface 60 through the IEEE 1394 bus 116. In addition, in this case, still picture data (a picture file) of an album jacket that has been compressed corresponding to for example the JPEG system and text data (a text file) of a song text, a profile of the artist, and so forth of the music program are extracted from the transport stream by the demultiplexer 70 and sent from the IEEE 1394 interface 60 to the MD recorder/player 1 through the IEEE 1394 bus 116. The MD recorder/player 1 can record such still picture data and text data to predetermined areas of the disc loaded therein.

1-6. Mini Disc Recording and Reproducing Apparatus

1-6-1. Structure of MD Recorder/Player

Figure 12:
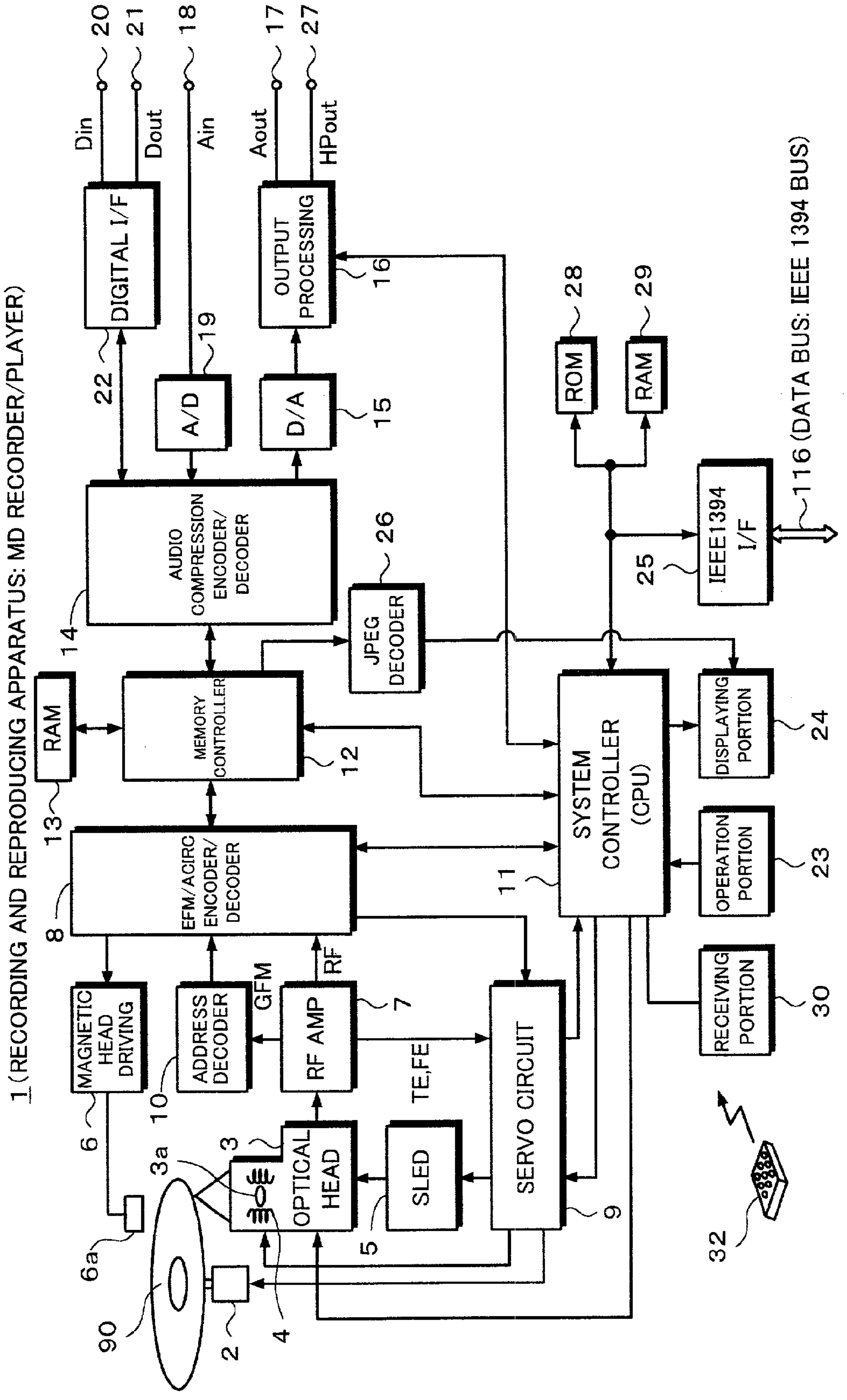
FIG. 12 is a block diagram showing the structure of a recording and reproduction apparatus according to the embodiment of the present invention.

FIG. 12 shows the internal structure of the recording and reproducing apparatus (MD player/recorder) 1 disposed in the AV system 3 according to the embodiment.

A magneto-optical disc (mini disc) 90 on which audio data is recorded is rotate-driven by a spindle motor 2. When data is recorded/reproduced to/from the magneto-optical disc 90, a laser beam is radiated from an optical head 3 to the magneto-optical disc 90.

When data is recorded, the optical head 3 outputs a high level laser beam for heating a recording track to a Curie temperature. On the other hand, when data is reproduced, the optical head 3 outputs a (comparatively) low level laser beam for detecting data from reflected light by a magnetic Kerr effect.

To do that, the optical head 3 comprises an optical system and a detector. The optical system comprises a laser diode serving as a laser outputting means, a polarizing beam splitter, an objective lens 3*a*, and so forth. The detector detects reflected light. The objective lens 3*a* is supported by a biaxial mechanism 4 so that the objective lens 3*a* is moved in the radial direction of and in the directions toward or away from the disc.

A magnetic head 6*a* is disposed at a position opposite to the optical head 3 across the disc 90. The magnetic head 6*a* applies to the magneto-optical disc 90 a magnetic field modulated with data supplied thereto.

The entire optical head 3 and the magnetic head 6*a* are supported by a sled mechanism 5 so that they are moved in the radial direction of the disc.

Information detected from the disc 90 by the reproducing operation of the optical head 3 is supplied to an RF amplifier 7. The RF amplifier 7 performs an arithmetic process for the supplied information and extracts a reproduction RF signal, a tracking error signal TE, a focusing error signal FE, groove information GFM (absolute position information recorded as pre-grooves (wobbling grooves) on the magneto-optical disc 90), and so forth.

The extracted reproduction RF signal is supplied to an encoder/decoder portion 8. The tracking error signal TE and the focusing error signal FE are supplied to a servo circuit 9. The groove information GFM is supplied to an address decoder 10.

The servo circuit 9 generates various servo driving signals corresponding to the supplied tracking error signal TE and focusing error signal FE, a track jump instruction or an access instruction (received from a system controller 11 that is a microcomputer), rotational speed detection information of the spindle motor 2, and so forth. With the generated signals, the servo circuit 9 controls the biaxial mechanism 4 and the sled mechanism 5 to perform the focusing and tracking controlling operations and controls the spindle motor 2 to rotate at constant linear velocity (CLV).

The address decoder 10 decodes the supplied groove information GFM and extracts address information. The address information is supplied to the system controller 11. The system controller 11 uses the supplied address information for various controlling operations.

The encoder/decoder portion 8 performs an EFM demodulating process and a decoding processes corresponding to for example CIRC method for the reproduction RF signal. At this point, the encoder/decoder 8 extracts an address, sub code data, and so forth and supplies them to the system controller 11.

Audio data (sector data) obtained by the EFM demodulating process and the decoding process corresponding to for example CIRC method performed by the encoder/decoder portion 8 is temporarily written to a buffer memory 13 by a memory controller 12. Data that is read from the disc 90 by the optical head 3 and reproduction data in the system from the optical head 3 to the buffer memory 13 are intermittently transferred at 1.41 Mbits/see.

The data written to the buffer memory 13 is read at a timing at which the reproduction data is transferred at 0.3 Mbits/see. The data that is read from the buffer memory 13 is supplied to an encoder/decoder portion 14. The encoder/decoder portion 14 performs a process for the reproduction signal such as a decoding process corresponding to the audio compression process and converts the resultant signal to a digital audio signal sampled with 44.1 KHz and quantized with 16 bits.

The digital audio signal is converted into an analog signal by a D/A converter 15. An output processing portion 16 adjusts the level and impedance of the analog signal received from the D/A converter and outputs the resultant signal as an analog audio signal Aout from a line output terminal 17 to an external apparatus. In addition, the output signal of the output processing portion 16 is supplied as a headphone output HPout to a headphone output terminal 27. The headphone output HPout is output from the headphone output terminal 27 to a headphone connected thereto.

The digital audio signal that has been decoded by the encoder/decoder portion 14 is supplied to a digital interface portion 22. Thus, the digital audio signal is can be output as a digital audio signal Dout from a digital output terminal 21 to an external apparatus. The digital audio signal is output to the external apparatus with for example an optical cable.

When a recording operation is performed for the magneto-optical disc 90, a record signal (analog audio signal Ain) is supplied to an A/D converter 19 through a line input terminal 18. The record signal is converted into digital data by the A/D converter 19 and then supplied to the encoder/decoder portion 14. The encoder/decoder portion 14 performs an audio compression encoding process for the digital data.

On the other hand, when a digital audio signal Din is supplied from an external apparatus to a digital input terminal 20, the digital interface portion 22 extracts control codes and so forth from the digital audio signal Din. Thereafter, the resultant audio signal is supplied to the encoder/decoder portion 14. The encoder/decoder 14 performs an audio compression encoding process for the audio data.

It should be noted that with a microphone input terminal (not shown), a microphone input signal may be used as a record signal.

The compressed record data received from the encoder/decoder portion 14 are temporarily written and stored to the buffer memory 13 by the memory controller 12 and then read for a predetermined amount of data at a time and sent to the encoder/decoder portion 8. Then, the encoder/decoder portion 8 performs an encoding process such as CIRC encoding process or EFM modulation encoding process for the record data that is read from the buffer memory 13 and supplies the encoded data to a magnetic head driving circuit 6.

The magnetic head driving circuit 6 supplies a magnetic head driving signal to the magnetic head **6*a* corresponding to the encoded record data received from the encoder/decoder portion 8. In other words, the magnetic head driving circuit 6 causes the magnetic head 6*a* to apply a magnetic field of the N or S pole to the magneto-optical disc 90. At this point, the system controller 11 supplies a control signal to the optical head 3 so that the optical head 3** outputs a laser beam of a recording level.

An operation portion 23 is a portion operated by the user. The operation portion 23 includes operation keys, a dial, and so forth that serve as operation elements. The operation elements include those for recording and reproducing operations (such as reproduction, record, pause, stop, FF (fast forward), REW (rewind) and AMS (program head position search), those for play modes (such as normal reproduction, program reproduction, and shuffle reproduction), those for display mode changeover operations on a displaying portion 24, and those for program editing operations (such as track (program) divide, track combine, track erasure, track name input, and disc name input).

Operation information corresponding to the operations of the operation keys and the dial is supplied to the system controller 11. The system controller 11 executes an operation control corresponding to the control information.

The recording and reproducing apparatus 1 according to the embodiment further includes a receiving portion 30. The receiving portion 30 receives a command signal of for example infrared rays from the remote controller 32, decodes the received command signal, and outputs the decoded command signal as a command code (operation information) to the system controller 11. The system controller 11 executes an operation control corresponding to the operation information received from the receiving portion 30.

A displaying operation of the displaying portion 24 is controlled by the system controller 11.

In other words, when the system controller 11 executes the displaying operation, it sends display data to a display driver of the displaying portion 24. The display driver drives a displaying operation of a displaying apparatus such as a liquid crystal panel corresponding to the supplied data so that the displaying apparatus displays required numerals, characters, symbols and so forth.

The displaying portion 24 displays an operation mode state of a disc from which data is being recorded or reproduced, a track number, a record time/reproduction time, an editing operation state, and so forth.

Character information (such as a track name) that is managed in association with a program as main data can be recorded to the disc 90. When such character information is input, the input characters are displayed. In addition, character information that is read from the disc is displayed.

In this example, sub data (AUX data) that is a data file independent from data of a music program and so forth can be recorded to the disc 90.

A data file as AUX data is information of characters, still pictures, and so forth. Such characters and still pictures can be displayed on the displaying portion 24.

According to the embodiment, a JPEG decoder 26 is provided as a structure that allows the displaying portion 24 to display still pictures and characters of AUX data.

In other words, according to the embodiment, still picture data of a data file as AUX data is recorded in the form of a file compressed corresponding to the JPEG (Joint photographic Coding Experts Group) system. The JPEG decoder 26 inputs a file of still picture data that has been reproduced from the disc 90 and stored in for example the buffer memory 13 through the memory controller 12, decompresses the input file corresponding to the JPEG system, and outputs resultant data to the displaying portion 24. Consequently, the still picture data as the AUX data is displayed on the displaying portion 24.

However, when character information or still picture information of AUX data is output, a full dot displaying apparatus or a CRT displaying apparatus that has a comparatively large screen and that can use the screen freely to some extent may be preferably. Therefore, the AUX data may be displayed on an external monitor apparatus or the like that is connected to an interface portion 25.

In addition, although the user can record an AUX data file to the disc 90, it is sometimes necessary to use an image scanner, a personal computer, or a keyboard as an inputting device. In this case, information of an AUX data file may be input from such an apparatus to the mini disc recording and reproducing apparatus 1 through the interface portion 25.

According to the embodiment, an IEEE 1394 interface is used as the interface portion 25. Therefore, in the following description, the interface portion 25 will be sometimes represented as IEEE 1394 interface 25. Accordingly, the IEEE 1394 interface 25 can be connected to various external apparatuses through the IEEE 1394 bus 116.

The system controller 11 is a microcomputer that has a CPU, an internal interface portion, and so forth. The system controller 11 controls the above-mentioned various operations.

A program ROM 28 stores a program and so forth that accomplish the various operations of the recording and reproducing apparatus 1. When necessary, a work RAM 29 stores data, programs, and so forth that allow the system controller 11 to execute various processes.

When a recording/reproducing operation is performed for the disc 90, management information, that is, the P-TOC (pre-mastered TOC) and the U-TOC (user TOC) recorded on the disc 90 should be read. The system controller 11 determines an address of an area to which data is recorded or an address of an area from which data is reproduced on the disc 90 corresponding to the management information.

The management information is stored in the buffer memory 13.

When the disc 90 is loaded to the recording and reproducing apparatus 1, the system controller 11 reproduces and read the innermost circumference 151 of the disc 90 on which the management information is recorded and stores the management information to the buffer memory 13 so that the system controller 11 can reference the management information for the later recording/reproducing/editing operations.

The U-TOC is rewritten corresponding to a recording process or an editing process of program data. More particularly, whenever a recording operation or an editing operation is performed, the system controller 11 updates the U-TOC information stored in the buffer memory 13 and rewrites the U-TOC area of the disc 90 at a predetermined timing corresponding to the rewriting operation.

An AUX data file is recorded to the disc 90 along with a program. An AUX-TOC is formed on the disc 90 for managing the AUX data file.

The system controller 11 also reads the AUX-TOC along with the U-TOC and stores the AUX-TOC to the buffer memory 13. When necessary, the system controller 11 can refer to the AUX data management state.

In addition, when necessary, the system controller 11 reads an AUX data file at a predetermined timing (or along with the AUX-TOC) and stores the AUX data file to the buffer memory 13. Then, at an output timing managed with the AUX-TOC, the system controller 11 causes the displaying portion 24 or the external apparatus connected to the IEEE 1394 interface portion 25 to output characters and an image.

1-6-2. Sector Format and Address Format

Next, data units referred to as sector and cluster will be described with reference to FIG. 13.

Figure 13:
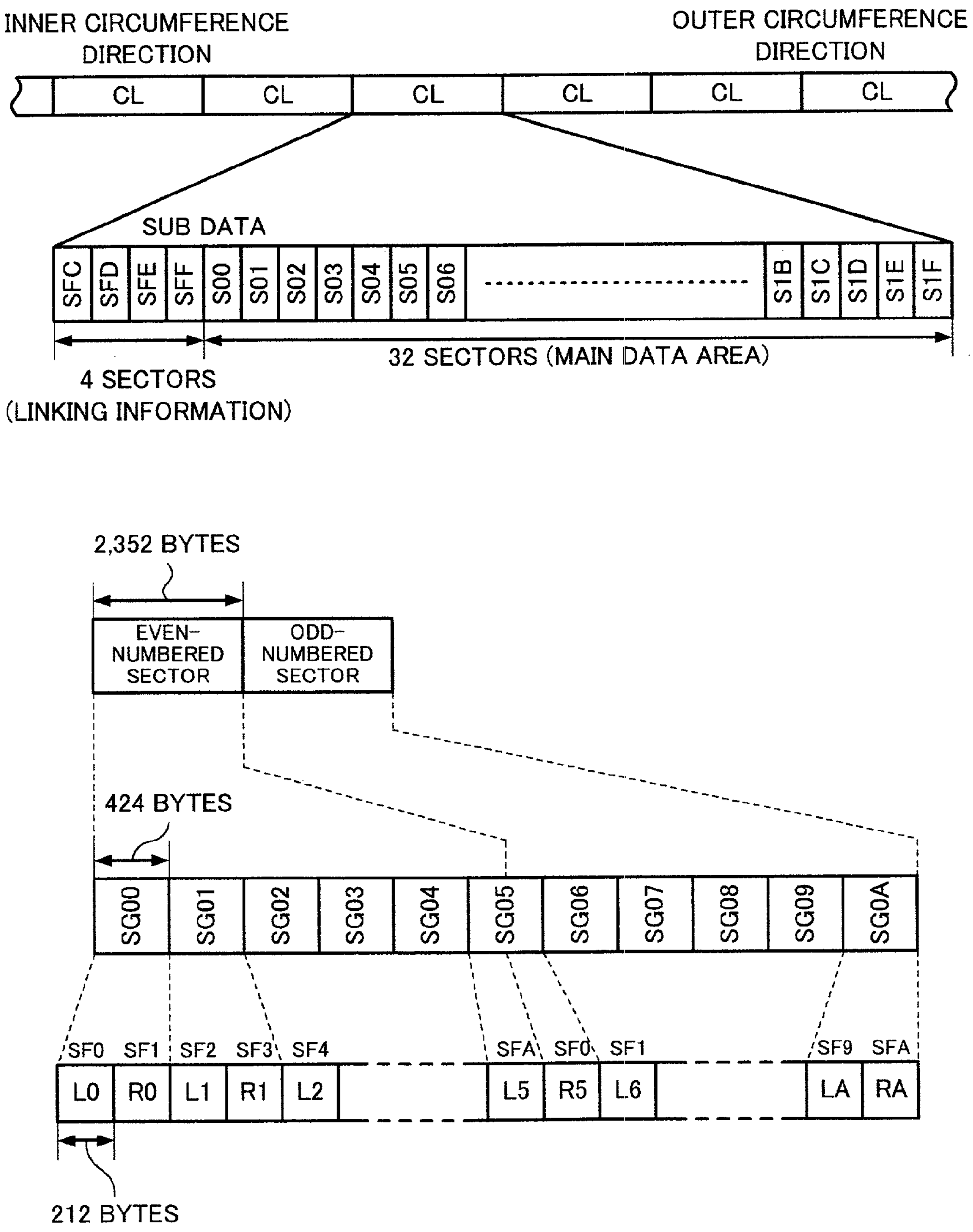
FIG. 13 is a schematic diagram for explaining a sector format of a disc according to the embodiment.

In a recording track of the mini disc system, clusters CL are formed successively as shown in FIG. 13. One cluster is the minimum record data unit. One cluster is equivalent to 2 to 3 circumferential tracks.

One cluster CL is composed of a linking area of four sectors SFC to SFF and a main data area of 32 sectors S00 to SIF.

One sector is a data unit of data composed of 2,352 bytes.

Of the sub data area of four sectors, the sector SFF is used as a sub data sector for recording information as sub data. However, the remaining three sectors SFC to SFE are not used for recording data.

Meanwhile, TOC data, audio data, AUX data, and so forth are recorded to the main data region composed of 32 sectors.

An address is recorded for each sector.

One sector is further divided into units referred to as sound groups. Two sectors are divided into 11 sound groups.

In other words, as shown in FIG. 13, two successive sectors including an even-numbered sector such as the sector S00 and an odd-numbered sector such as the sector S01 include sound groups SG00 to SG0A. One sound group is composed of 424 bytes that are equivalent to an amount of audio data corresponding to the time period of 11.61 msec.

Data is recorded separately for the L channel and the R channel in one sound group SG. For example, the sound group SG00 is composed of L channel data L0 and R channel data R0. The sound group SG01 is composed of L channel data L1 and R channel data R1.

212 bytes that compose a data area for the L channel or the R channel are referred to as sound frame.

Next, with reference to FIG. 14, an address format of the mini disc system will be described.

An address of each sector is represented by a cluster address and a sector address. As shown with an upper portion of FIG. 14, a cluster address is a value of 16 bits (=two bytes), whereas a sector address is a value of eight bits (=1 byte).

Thus, an address of 3 bytes is recorded at the top-position of each sector.

In addition, by adding a sound group address of 4 bits, an address of a sound group in a sector can be represented. For example, when a sound group address is additionally represented for managing the U-TOC or the like, the reproduction position can be set for each sound group.

Figure 14:
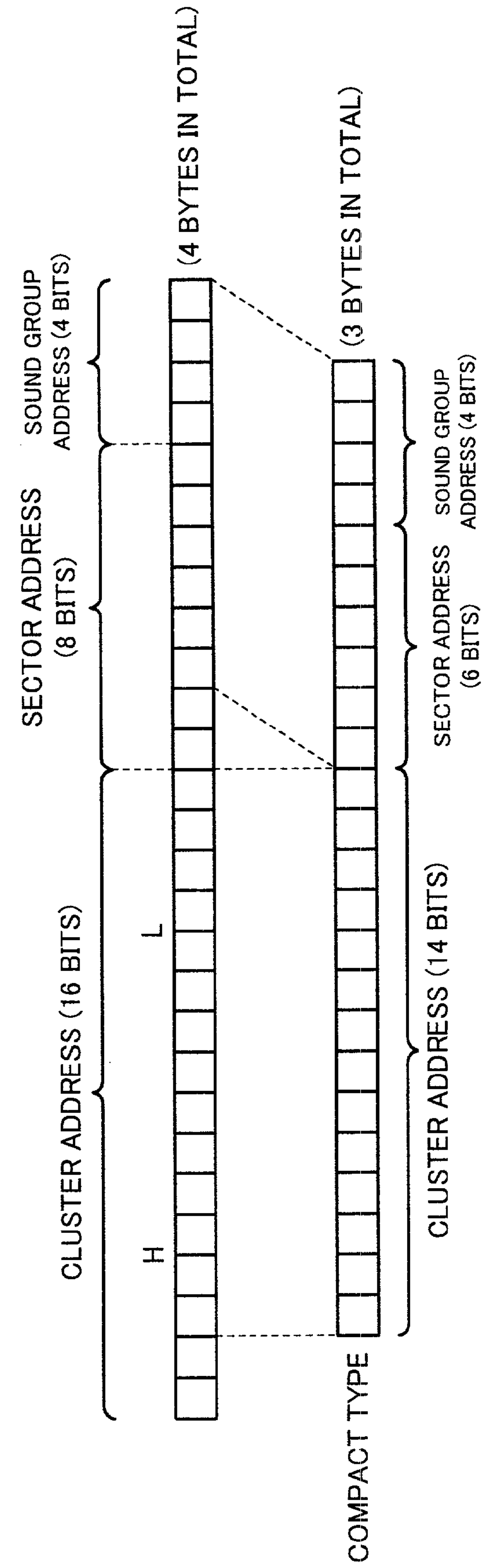
FIG. 14 is a schematic diagram for explaining an address format of the disc according to the embodiment.

On the other hand, for the U-TOC or the AUX-TOC, a cluster address, to allow a sector address, and a sound group address to be represented with three bytes, a compact type address as shown in a lower portion of FIG. 14 is used.

First, a sector can be represented with 6 bits because one cluster is composed of 36 sectors. Accordingly, the two high order bits of a sector address can be omitted. Likewise, since a cluster of up to the outermost circumference of the disc can be represented with 14 bits, the two high order bits of a cluster address can be omitted.

By omitting the two high order bits of each of a sector address and a cluster address, an address that designates a sound group can be represented with 3 bytes.

In the U-TOC and the AUX-TOC that will be described later, an address for managing a reproduction position, a reproduction timing, or the like is represented with a compact type address. The address may be represented in the form of an absolute address or in the form of an offset address. The offset address is for example a relative address that represents the position of each program such as a music program with reference to the top position of the program treated as a position of the address 0. Next, an example of the offset address will be described with reference to FIG. 15.

As will be described with reference to FIG. 16, programs such as music programs are recorded in clusters starting from the cluster 50 on the disc. (The cluster 50 is denoted by cluster 32h in hexadecimal notation. In the following description of the specification, any numerical value followed by "h" represents a value in the hexadecimal notation.)

For example, the address value of the address of the top position of the first program (that is, cluster 32h, sector 00h, sound group 0h) is "0000000000110010000000000000" as shown with an upper portion of FIG. 15(*a*), (that is, 0032h, 00h, 0h). When this address value is represented in the compact type, it is "000000001100100000000000" (that is, 00h, C8h, 00h) as shown with a lower portion of FIG. 15(*a*).

Starting from the top address, the absolute address of a certain point in the first program of the cluster 0032h, sector 04h, sound group 0h is "00h, C8h, 40h" in the compact format as shown in FIG. 15(*b*). On the other hand, with a difference starting from the top address, the offset address of the cluster 0000h, sector 04h, sound group 0h is "00h, 00h, 40h".

On the other hand, starting from the top address shown in FIG. 15(*a*), the absolute address of another certain position in the first program of the cluster 0032h, sector 13h, sound group 9h is "00h, C9h, 39h" in the compact format as shown in FIG. 15(*c*). On the other hand, the offset address is "00h, 01h, 39h".

As with such examples, a position in a program can be designated with an absolute address or an offset address.

1-6-3. Area Structure

Next, the area structure of the disc 90 for use with the MD recorder/player 1 according to the embodiment will be described with reference to FIG. 16.

Figure 16A:
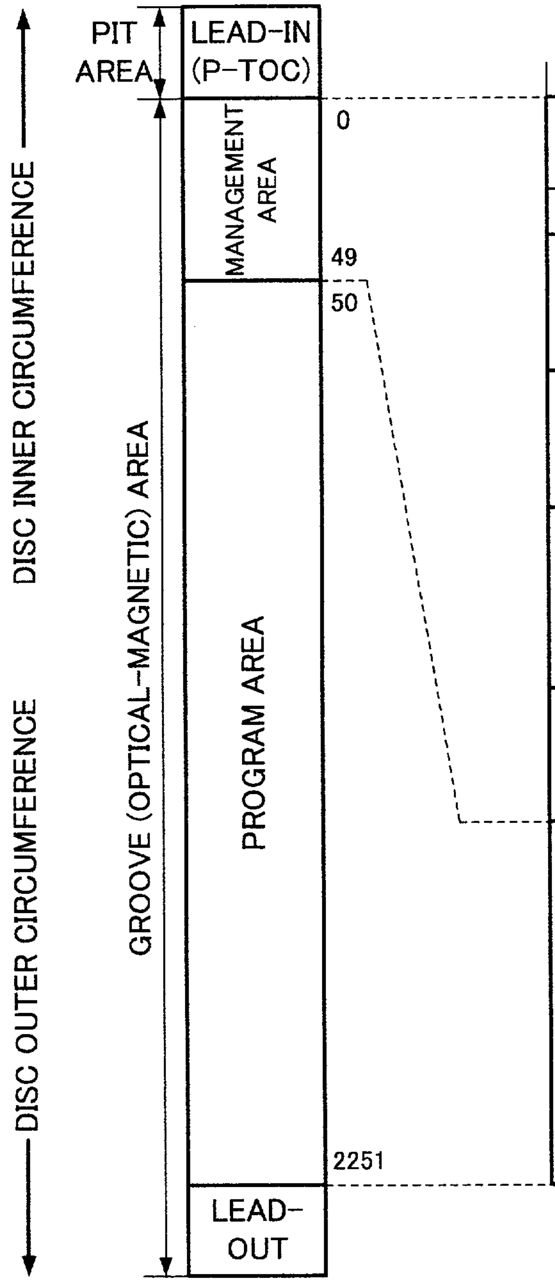
FIG. 16 is a schematic diagram for explaining the area structure of the disc according to the embodiment.
Figure 16B:
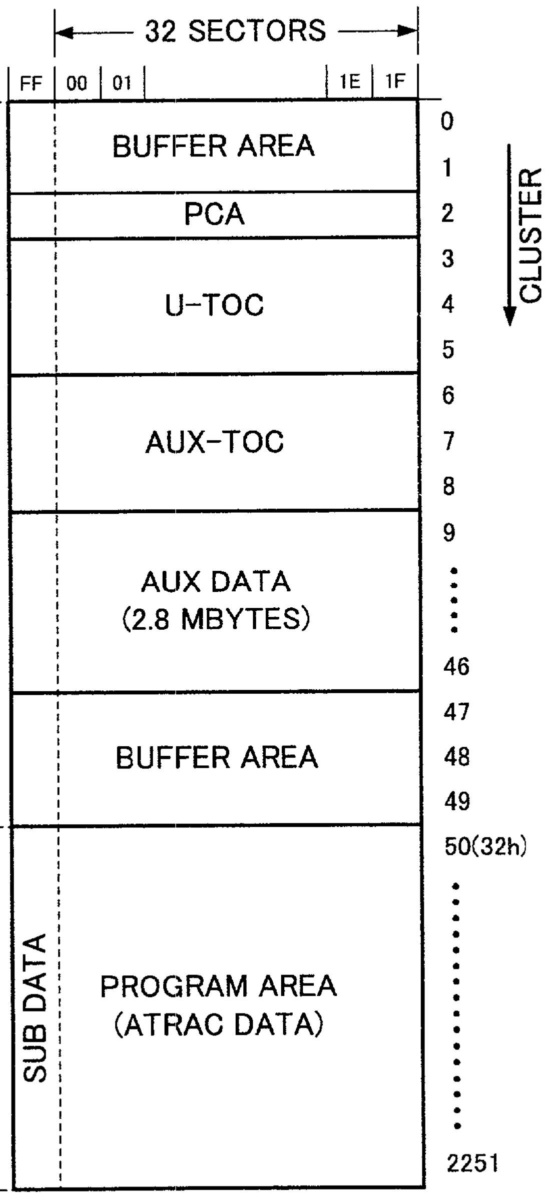

FIG. 16(*a*) shows areas from the innermost circumference side to the outermost circumference side of the disc.

On the innermost circumference side of the disc 90 as a magneto-optical disc, a pit area in which read only data is recorded in embossed pits is formed. In the pit area, the P-TOC is recorded.

The outer circumference area of the pit area is a magneto-optical area that is a recording/reproduction area composed of guide grooves as recording tracks.

A region from the cluster 0 to cluster 49 on the innermost circumference side of the magneto-optical area is used as a management area. A program such as a real music program is recorded in a program area from the cluster 50 to the cluster 2251. The outer circumference area of the program area is a lead-out area.

The management area is shown in detail in FIG. 16(*b*). In FIG. 16(*b*), sectors are shown in the horizontal direction, whereas clusters are shown in the vertical direction.

The clusters 0 and 1 in the management area are a buffer area for the pit region. The cluster 2 is a power calibration area PCA used for adjusting an output power of a laser beam and so forth.

In the clusters 3, 4 and 5, the U-TOC is recorded. Although the contents of the U-TOC will be described later, a data format is defined in each sector in one cluster and predetermined management information is recorded in each sector. The U-TOC data is repeatedly recorded three times in the three clusters 3, 4, and 5.

The clusters 6, 7 and 8 are used to record the AUX-TOC. Although the contents of the AUX-TOC will be described later, a data format is defined in each sector in one cluster and predetermined management information is recorded in each sector. The AUX-TOC data are repeatedly recorded three times in the three clusters 6, 7 and 8.

The region from the cluster 9 to the cluster 46 is used to record AUX data. A data file of AUX data is formed in the unit of one sector. The area of the AUX data contains picture file sectors as a still picture file, text file sectors as a character information file, karaoke text file sectors as a character information file synchronized with a program and so forth that will be described later. A data file as the AUX data, a region in which AUX data files can be recorded in the AUX data area, and so forth are managed with the AUX-TOC.

The recording capacity for data files in the AUX data area is 2.8 Mbytes in the case that an error correction mode 2 is applied.

It is possible to form a second AUX data area for example in a rear half portion of the program area or a region on the outer circumference side than the program area such as for example the lead-out portion so as to increase the recording capacity for data files.

The clusters 47, 48 and 49 are used as a buffer area against the program area.

In the program area starting from the cluster 50 (=32h), audio data of at least one music program or the like is recorded in a compressed format referred to as ATRAC.

Recorded programs and a recordable region are managed with the U-TOC.

In each cluster of the program area, the sector FFh can be used for recording information as sub data as was described above.

In the mini disc system, a reproduction only disc on which programs and so forth are recorded as reproduction only data in the form of pits can be used. In this case, the entire reproduction only disc is formed as a pit area. The programs recorded on the reproduction only disc are managed in a similar manner to the U-TOC that will be described later. In this case, the U-TOC is not formed.

However, when reproduction only data files are recorded as AUX data, the AUX-TOC for managing the files is recorded.

1-6-4. U-TOC 1-6-4-1. U-TOC, Sector 0

As was described above, when a recording/reproducing operation is performed for a program (track) to and from the disc 90, the system controller 11 pre-reads the P-TOC and the U-TOC as management information from the disc 90. When necessary, the system controller 11 references them.

Next, the U-TOC sectors as management information for managing recording/reproducing operations of tracks (music programs and so forth) on the disc 90 will be described.

The P-TOC is formed in the pit area on the innermost circumference side of the disc 90 as was described with reference to FIG. 16. The P-TOC is read only information. With the P-TOC, the positions of the recordable area (recordable user area), the lead-out area, the U-TOC area, and so forth of the disc are managed. For a read only optical disc on which all data is recorded in the form of pits, music programs recorded as a ROM can be managed with the P-TOC. In this case, the U-TOC is not formed.

Next, the U-TOC formed on a recordable magneto-optical disc will be described, omitting the P-TOC.

FIG. 17 shows the format of the sector 0 of the U-TOC.

As sectors of the U-TOC, the sector 0 to sector 32 can be formed. Among these sectors, the sector 1 and the sector 4 can be used as an area in which character information is recorded and the sector 2 is used as an area into which record dates/times are recorded.

First, the sector 0 of the U-TOC that is required for performing recording/reproducing operations for the disc 90 will be described.

The sector 0 of the U-TOC is a data area in which management information for programs such as music programs recorded by the user and free areas into which programs can be newly recorded is recorded.

For example, when a music program is recorded to the disc 90, the system controller 11 searches a free area on the disc 90 with reference to the sector 0 of the U-TOC and records audio data to the free area. On the other hand, when a music program is reproduced, the system controller 11 determines an area from which a music program is reproduced with reference to the sector 0 of the U-TOC, accesses the area, and performs the reproducing operation for the area.

At the top position of the data area (4 bytes×588=2352 bytes) of the sector 0 of the U-TOC, a synchronous pattern composed of one byte data that is all “0s” or all “1s” is recorded.

Then, an address composed of a cluster address (Cluster H) (Cluster L) and a sector address (sector) is recorded for 3 bytes. The sector address is followed by mode information (MODE) of one byte. These bytes form a header. The address of 3 bytes is an address of the sector itself.

The structure of the header part in which a synchronous pattern and an address are recorded applies not only to the sector 0 of the U-TOC but, also to a P-TOC sector, an AUX-TOC sector, an AUX file sector, and a program sector. For each sector that will be described with reference to drawings after FIG. 19, although the description of the header is omitted, an address and a synchronous pattern are recorded to each sector.

As the address of a sector itself, the cluster address is represented with two bytes of a high order address (cluster H) and a low order address (Cluster L) and the sector address (Sector) is represented with 1 byte. In other words, the address is not in the compact type.

Then, at predetermined byte positions, data of a maker code, a model code, a track number (First TNO) of the first track, a track number (Last TNO) of the last track, a sector use state (used sectors), a disc serial number, a disc ID, and so forth are recorded.

In addition, a region for various pointers (P-DFA, P-EMPTY, P-FRA, P-TNO1 to P-TN0255) is recorded as a pointer portion. The pointer portion causes an area of a track (music program or the like) recorded by the user, a free area, and so forth to be correlated with table portions that will be described later.

As the table portion correlated with the pointers (P-DFA to P-TN0255), 255 part tables (01h) to (FFh) are provided. In each part table, a start address that defines a start point of a particular part, an end address that defines an end point of the part, and mode information (track mode) of the part are recorded. In addition, since a part shown in a part table may be linked to another part, link information that represents a part table in which a start address and an end address of the part to be linked are recorded can be recorded.

The term “part” is a track portion of one track in which chronological successive data is physically and continuously recorded.

Addresses represented as start addresses and end addresses designate at least one part that composes a music program (track).

These addresses designate a cluster, a sector, and a sound group in the short format.

In such a recording and reproducing apparatus, even if data of a music program (program/track) is recorded physically discontinuously, that is, in a plurality of parts, when the parts are successively accessed and reproduced, no problem will take place. Therefore, music programs or the like recorded by the user are sometimes recorded in a plurality of parts from a view point of for example the improvement of the efficiency of the use of recordable areas.

To do that, link information is provided. For example, by designating part tables to be linked corresponding to the numbers (01h) to (FFh) assigned to the individual part tables, the part tables can be linked.

In other words, in the management table portion of the sector 0 of the U-TOC, one part table represents one part. For a music program composed of three parts that are linked, the part positions are managed with three part tables linked corresponding to the link information.

Actually, the link information is represented by a value of a byte position in the sector 0 of the U-TOC by a predetermined calculating process. In other words, a part table is designated as 304+(link information)×8 (-th byte).

Each of the part tables (01h) to (FFh) in the table portion of the sector 0 of the U-TOC represents the contents of the part with the pointers (P-DFA, P-EMPTY, P-FRA, and P-TNO1 to PTNO255) in the pointer portion in the following manner.

The pointer P-DFA represents a defective area of the magneto-optical disc 90 with a part table or the top of a plurality of part tables that represents a track portion that is a defective area due to a scratch. In other words, if the magneto-optical disc 90 has a defective part, one of the part tables (01h) to (FFh) is recorded in the pointer P-DFA. The part table recorded in the pointer P-DFA represents the defective part with the start and end addresses. If the magneto-optical disc 90 has another defective part, another (second) part table is designated as the link information of the first part table. The second part table represents the defective part. If the magneto-optical disc 90 has no further defective part, the link information is for example to "(00h)" that represents no further link.

The pointer P-EMPTY represents one non-used part table or the top of a plurality of non-used part tables in the management table portion. Where there is a non-used part table, one of (01h) to (FFh) is recorded as the pointer P-EMPTY.

When there are a plurality of non-used part tables, such part tables are successively designated starting from a part table designated with the pointer P-EMPTY corresponding to the link information. Thus, all the non-used part tables are linked in the management table portion.

The pointer P-FRA represents a data rewritable free area (including an erased area) on the magneto-optical disc 90. In other words, the pointer P-FRA designates one part table or the top of a plurality of part tables that represents a track portion as a free area. In other words, when there is a free area, one of (01h) to (FFh) is recorded in the pointer P-FRA. The part table represents the part as the free area with the start and end addresses. When there are a plurality of such parts (namely, there are a plurality of such part tables), the part tables are successively designated with link information until it becomes "(00h)".

Figure 18:
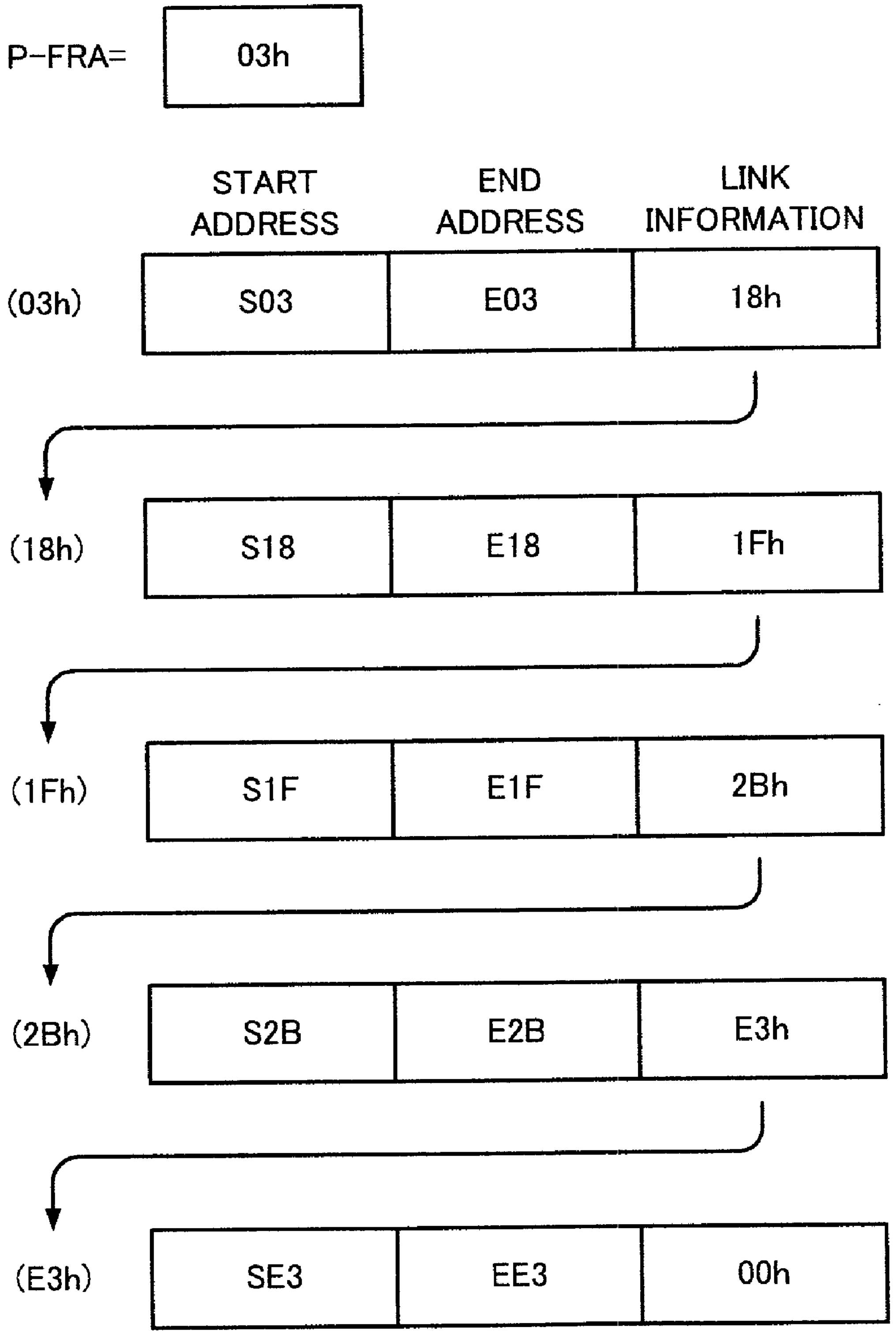
FIG. 18 is a schematic diagram for explaining the link structure of sector 0 of U-TOC according to the embodiment.

FIG. 18 schematically shows a management state of parts that are free areas corresponding to part tables. Referring to FIG. 18, when parts (03h) (18h) (1Fh) (2Bh) (E3h) are free areas, this state is represented with the pointer P-FRA and part tables (03h) (18h) (1Fh) (2Bh) (E3h) that are linked therefrom. The above-mentioned defective areas and non-used part tables are managed in a similar manner.

The pointers P-TNO1 to P-TNO255 represents tracks of music programs or the like recorded on the magneto-optical disc 90 by the user. For example, the pointer P-TNO1 designates a part table that represents a part or the top of a plurality of parts in which data of the first track is recorded.

For example, when a music program of a first track (first program) is recorded with one part on the disc (not divided), the recording area of the first track is designated with start and end addresses in a part table denoted by the pointer P-TNO1.

When a music program of a second track (second program) is recorded discretely in a plurality of parts on the disc, the parts for indicating the recorded positions of the second track are designated in the chronological order. In other words, starting from a part table designated by the pointer P-TNO2, the other part tables are successively designated in the chronological order corresponding to the link information. The parts are linked corresponding to link information until it becomes "(00h)" (Similar form to that of FIG. 18).

Since all parts of data of for example a second music program are successively designated and recorded in this manner, when the second music program is reproduced or data is written to an area of the second music program using the data of the sector 0 of the U-TOC, continuous music information can be obtained from discrete parts by the optical head 3 and the magnetic head 6. In addition, when data is recorded to a record area, it can be effectively used.

In this manner, the area of the rewritable magneto-optical disc 90 is managed with the P-TOC, whereas music programs, free areas, and so forth recorded in the recordable user area managed with the U-TOC.

1-6-4-2. U-TOC, Sector 1

FIG. 19 shows the format of the sector 1 of the U-TOC. The sector 1 of the U-TOC is a data region for recording input character information of a track name designated to a recorded track or a disc name as information of the name or the like of the disc itself designated to the disc.

The sector 1 of the U-TOC has pointers P-TNA1 to P-TNA255 as a pointer portion that correspond to recorded tracks. In addition, the sector 1 of the U-TOC has 255 slots (01h) to (FFh) of eight bytes each designated by the pointers P-TNA1 to P-TNA255 and one slot (00h) of eight bytes. With the sector 1 of the U-TOC, character data is managed in the almost similar manner to that of the sector 0 of the U-TOC.

Character information of a disc title or a track name is placed in the slots (01h) to (FFh) in ASCII code.

For example, in a slot designated by the pointer P-TNA1, characters that are input corresponding to the first track by the user are recorded. In addition, since slots are linked corresponding to link information, the number of characters that are input corresponding to one track can exceed 7 bytes (7 characters).

The slot (00h) of eight bytes is an area dedicated for recording a disc name. The slot (00h) is not designated by the pointer P-TNA(x).

Also with the sector 1 of the U-TOC, the pointer P-EMPTY is used for managing non-used slots.

1-6-4-3. U-TOC, Sector 2

FIG. 20 shows the format of the sector 2 of the U-TOC. The sector 2 of the U-TOC is a data region for recording the record date/time of a music program recorded by the user.

The sector 2 of the U-TOC has pointers P-TRD1 to P-TRD255 as a pointer portion that correspond to recorded tracks and a slot portion designated by the pointers P-TRD1 to P-TRD255. The slot portion has 255 slots (01h) to (FFh) of eight bytes each. The sector 2 of the U-TOC is used for managing date/time data in the almost similar manner to that of the sector 0 of the U-TOC.

In the slots (01h) to (FFh), record dates/times of music programs (tracks) are recorded in 6 bytes each that are values of year, month, day, hour, minute, and second. The remaining two bytes are a maker code and a model code that represent a manufacturer of a recording apparatus that records of the music program and code data that represents the model thereof, respectively.

For example, when a track as a first music program is recorded to the disc, the record date/time, the maker code of the used recording apparatus, and the model code are recorded in a slot designated by the pointer P-TRD1. The record date/time data is automatically recorded by the system controller 11 with reference to an internal clock.

The slot (00h) of eight bytes is an area dedicated for recoding the record date/time of the disc. The slot (00h) is not designated by the pointer P-TRD(x).

In the sector 2 of the U-TOC, the slot pointer P-EMPTY is used for managing slots that are not used. In non-used slots, link information is recorded instead of a model code. The non-used slots are linked and managed with the link information starting with the slot pointer P-EMPTY.

1-6-4-3. U-TOC, Sector 4

FIG. 21 shows the sector 4 of the U-TOC. The sector 4 is a data area for recording input character information of a music program name (track name) designated to a track recorded by the user or a disc name designated to the disc. As is clear from FIGS. 21 and 19, the format of the sector 4 of the U-TOC is almost similar to that of the sector 1 of the U-TOC.

However, the sector 4 allows code data (2 byte codes) corresponding to kanji or European characters to be recorded. In addition to data of the sector 1 of FIG. 22, the sector 4 has attributes of character codes at predetermined byte positions.

As with the sector 1, character information of the sector 4 of the U-TOC is managed with pointers P-TNA1 to P-TNA255 and slots (01h) to (FFh) designated by the pointers P-TNA1 to P-TNA255.

The MD recorder/player 1 according to the embodiment can handle a reproduction only disc on which the U-TOC is not formed. However, when such a reproduction only disk is used, the MD recorder/player 1 can record character information as a disk name and a track name with the P-TOC.

In other words, sectors almost similar to the sector 1 of the U-TOC and the sector 4 of the U-TOC are prepared as P-TOC sectors. The disc maker can pre-record a disc name and track names in the P-TOC sectors.

1-6-5. AUX-TOC 1-6-5-1. AUX-TOC, Sector 0

The disc 90 of the example has regions for recording AUX data files and the AUX-TOC as described with reference to FIG. 16. As AUX data files, character information, image information, and so forth are recorded independent from tracks (programs) such as music programs.

Such AUX data files are managed with the AUX-TOC. The AUX-TOC is recorded three times repeatedly in 3 clusters. Thus, as with the U-TOC, as management data, 32 sectors in one cluster can be used.

In this embodiment, the sectors 0 to 5 of the AUX-TOC are set so as to manage the AUX data files as described below.

Next, the format of the sector 0 of the AUX-TOC will be described with reference to FIG. 22.

The sector 0 of the AUX-TOC is an area allocation table principally for managing a free area (empty area) in the entire AUX data region.

As shown in FIG. 22, the sector 0 of the AUX-TOC has a header (sector address (sector)=00h, mode information (MODE)=02h) and four ASCII characters of 'M', 'D', 'A', and 'D' of four bytes at predetermined byte positions. The characters 'M', 'D', 'A', and, D represent a format ID. Likewise, the other sectors of the AUX-TOC (that will be described later) have the same characters at the same byte positions as the sector 0.

The format ID is followed by a maker code and a model code at predetermined byte positions. The model code is followed by used sector information at predetermined byte positions.

The used sector information represents the state of used sectors in the AUX-TOC.

Eight bits d8 to d1 that compose Used Sectors 0 correspond to sectors 0 to 7, respectively. Likewise, eight bits d8 to d1 of Used Sectors 1 correspond to sectors 8 to 15, respectively. Eight bits d8 to d1 of Used Sectors 2 correspond to sectors 16 to 23, respectively. Eight bits d8 to d1 of Used Sectors 3 correspond to sectors 24 to 31, respectively.

The sector 0 of the AUX-TOC has a pointer portion composed of pointers P-EMPTY and P-BLANK.

A table portion of the sector 0 has 99 part tables of eight bits each. Each of the part tables has a start address, an end address, and link information for managing the AUX data area in the similar manner as the sector 0 of the U-TOC described above. In this example, however, part tables (01h) to (63h) are used as the table portion. The remaining part tables (64h) to (FFh) are not used with all '0s' (zeros) placed therein.

Although the part tables after (64h) may be used as the table portion, for practical use, it is sufficient to use 99 part tables for managing the AUX data area. In this example, the part tables (01h) to (63h) are used as the effective table portion in consideration of the storage capacity of the buffer memory 13.

The pointer P-EMPTY is used for managing non-used part tables in the sector 0 of the AUX-TOC in such a manner that the non-used part tables are linked.

The pointer P-BLANK is used for managing a free area that is non-recorded regions into which AUX data files can be recorded in the AUX data area in such a manner that the part tables are linked in the same manner as the pointer P-FRA of the sector 0 of the U-TOC.

A start address and an end address of each part table are represented in the compact format. They can be designated up to a sound group position. However, in the sector 0 of the AUX-TOC according to the embodiment, an address is designated for each cluster. All '0s' are placed at the data position that represents a sound group unit in the sector, start address and end address.

The start address and the end address of 3 bytes in the table portion or the slot portion in the sectors 1 to 5 of the AUX-TOC that will be described later are represented in the compact format. In addition, since the definition of up to what data unit a start address or an end address is designated depends on the contents of each sector, when necessary, the definition will be described.

When the AUX-TOC is formed on a reproduction only disc, link information of part tables is not used.

1-6-5-2. AUX-TOC, Sector 1

The sectors 1 to 3 of the AUX-TOC are used for managing picture files as still picture information.

The sector 1 of the AUX-TOC shown in FIG. 23 is a management sector as a picture allocation table. The sector 1 of the AUX-TOC is used for managing data files recorded as picture files in the AUX data area.

The sector 1 of the AUX-TOC is used for managing picture files in the manner similar to that of the sector 0 of the U-TOC.

According to the embodiment, the file length of a picture file of one still picture recorded in the AUX data area is not explicitly limited. According to the embodiment, however, up to 100 picture files including a cover picture (cover picture) can be managed as will be described later. Accordingly, the number of substantially recordable picture files is 100.

The cover picture may be for example a picture file that is for example a disc jacket.

In the sector 1 of the AUX-TOC, a header has a sector address (Sector)=01h and mode information (MODE)=02h.

As pointers P-PNO(x) used for managing 99 picture files other than the cover picture, pointers P-PNO1 to P-PNO99 are formed in the sector 1 of the AUX-TOC. At individual byte positions after the pointer P-PNO99 to the table portion, "00h" is placed.

However, in order to deal with the case that more than 100 picture files can be recorded because of an expansion of the AUX data area and a file size change that may be performed in future, it is possible to assign the pointers P-PNO100 to P-PNO255 as the pointers P-PNO(x) to byte positions from the byte position following the pointers P-PNO1 to P-PNO99 to the byte position of the pointer P-PNO255 denoted in blankets in FIG. 23.

In addition, a maker code and a model code are followed by two bytes of pointers First PNO and Last PNO. The pointer First PNO represents the number x of the first pointer P-PNO(x) of the pointers P-PNO1 to P-PNO99. The pointer Last PNO represents the number x of the last pointer P-PNO(x) of the pointers P-PNO1 to P-PNO99. For example, assuming that the pointers P-PNO1 to P-PNO5 of the pointers P-PNO1 to P-PNO99 are used, the pointer First PNO and the pointer Last PNO represents "01h" and "05h", respectively.

The pointer portion also has the pointers P-PFRA and P-EMPTY.

The table portion has 99 part tables (01h) to (63h) of eight bytes each corresponding to the individual pointers. Each of the part tables has a start address, an end address, and a picture mode (S. Pict. mode). In this example, as with the sector 0 of the AUX-TOC, the remaining part tables (64h) to (FFh) are not used with all '0s' placed therein.

The part table (00h) is a part table that is not designated by any pointer. In this example, the part tale (00h) is used dedicatedly for managing the address of a picture file designated as a cover picture. Likewise, the part table (00h) for a cover picture has the picture mode (S. Pict. mode).

The pointers P-PNO1 to P-PNO99 are used for managing regions of respective pictures with respective part tables designated. For example, a part table designated by the pointer P-PNO1 has a start address, an end address, and a picture mode (S. Pict. mode) of a picture file of image data as a first picture.

With the sector 1 of the AUX-TOC, to manage a file, part tables are not linked with link information (Link-P). In other words, when one picture file is recorded, it is not separated into areas that are physically spaced apart.

However, non-used part tables in the sector 1 of the AUX-TOC are managed with link information that is the byte 8 of each part table) starting with the pointer P-EMPTY.

The pointer P-PFRA in the sector 1 of the AUX-TOC is a pointer for managing a free area in the case that one cluster area of the AUX data area has a picture data smaller than one cluster the non-picture area of the one cluster area is a non-record area (recordable area) that is a free area. In other words, a part table designated by the pointer P-PFRA represents an address of a region as a free area.

The picture mode (S. Pict. mode) in each part table of the sector 1 of the AUX-TOC represents mode information including a copy status of a picture file recorded at an address designated by each part table.

The picture mode (S. Pict. mode) is defined as shown in for example FIG. 30(*a*).

The picture mode is composed of eight bits d1 to d8. Two bits of d1 and d2 represent a copy status. The copy status is information that represents whether a copying operation of a particular picture file is permitted or not permitted.

In this example, when the copy status is (0h), it represents that the copying operation is permitted. In this case, the picture file can be copied any number of times.

When the copy status is (1h), it represents that the copying operation of the picture file is permitted only one time.

When the copy status is (2h), it represents that the copying operation of the picture file is permitted only one time through an authenticated data bus. In other words, in this case, the copying operation is prohibited through a non-authenticated bus.

When the copy status is (3h), it represents that the copying operation of the picture file is prohibited.

The remaining six bits d3 to d8 are undefined in this example.

If the copying operation of data of a particular picture file is performed, the copy status assigned to the copied picture file is updated as shown in FIG. 30(*b*) corresponding to the contents of a copy status assigned to the original picture file.

In other words, when the copy status of a particular picture file is "0h", after the picture file is copied, the copy status "0h" is assigned to the copied picture file. In other words, the copying operation of the picture file is permitted any number of times.

On the other hand, when the copy status is "1h" or "2h", after the copy operation is performed, the copy status "3h" is assigned thereto and the further copying operation is prohibited.

1-6-5-3. AUX-TOC, Sector 2

FIG. 24 shows the format of the sector 2 of the AUX-TOC. The sector 2 is a picture information table that is a data region for character information as picture information in the case that information of a picture name, a record date/time, and a URL (Uniform Resource Locator) of Internet (according to the embodiment, such picture information is referred as picture information) is added to each picture file.

Before explaining the sector 2 of the AUX-TOC, the structure of a picture information file recorded in the table portion of the sector 2 of the AUX-TOC will be described with reference to FIG. 31. A picture information file is a file that has information of picture information corresponding to one picture file.

Figure 31:
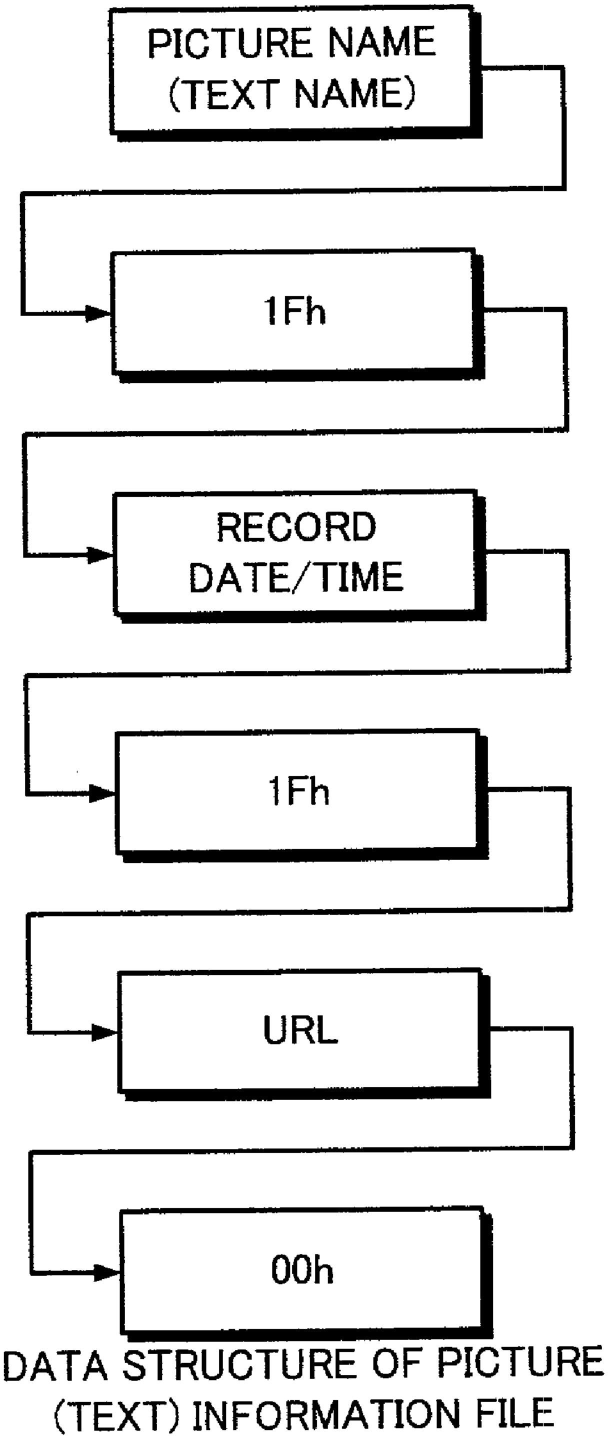
FIG. 31 is a schematic diagram showing the data structure of a picture (text) information file.

As shown in FIG. 31, the picture information file starts with a data unit as a picture name in ASCII code or another character code. The format of the picture name corresponds to the format of character information recorded in a slot of the sector 4 of the U-TOC shown in FIG. 21.

The data unit as a picture name is followed by "1Fh" that represents a delimiter between data units. The delimiter "1Fh" is followed by a data unit for a record date/time. The format of the record date/time corresponds to the format of the record date/time in a slot of the sector 2 of the U-TOC shown in FIG. 20. The data unit for the record date/time is composed of six bytes.

The data unit for the record date/time is followed by the delimiter "1Fh". The delimiter "1Fh" is followed by character information as a URL. The URL may be represented in ASCII code starting from the MSB rather than a character code (chara. code) that will be described later. The file ends with "00h".

When one of the data units of the picture name, record date/time, and the URL is not substantial data, "00H" is placed for the data unit.

When a picture file is downloaded from a particular URL as a home page of Internet, the URL of the home page is added to the picture file.

Returning to FIG. 24, the sector 2 of the AUX-TOC will be further described.

A header of the sector 2 of the AUX-TOC has a sector address (Sector)=02h and mode information (MODE)=02h.

In addition, the sector 2 of the AUX-TOC has pointers P-PIF1 to P-PIF99 (that can be expanded up to P-PIF255) as a pointer portion correspond to individual picture files recorded on the disc. A slot portion has 255 slots (01h) to (FFh) of eight bytes each that can be designated by the pointers P-PIF1 to P-PIF99 and one slot (00h) of eight bytes.

A maker code and a model code are followed by two bytes of pointers First PIF and Last PIF. The pointer First PIF represents the number of the first pointer of the pointers P-PIF1 to P-PIF99. The pointer Last PIF represents the last pointer of the pointers P-PIF1 to P-PIF99.

Slots (00h) to (FFh) has character information as picture information files in ASCII code or another character code. The type of characters in the slots (00) to (FFh) is defined by a character code (denoted by chara. code in FIG. 24) placed at a predetermined byte position in the sector 2 of the AUX-TOC.

The character code is defined in such a manner that for example "00h" designates the ASCII code; "01h" designates the modified ISO. 8859-1 code; "02h" designates the music shifted JIS code; "03h" designates the KS C 5601-1989 code (Korean); and "04h" designates the GB 2312-80 code (Chinese).

The pointers P-PIF1 to P-PIF99 designate part tables having picture information files with file numbers corresponding to the numbers of the individual pointers. For example, a slot designated by the pointer P-PIF1 has characters corresponding to a picture of a first picture file. The slot (00h) of eight bytes is an area dedicated for the beginning of the recording of a picture information file corresponding to a cover picture. The slot (00h) is not designated by the pointer P-PIP(x).

The slots are linked corresponding to link information. Thus, a picture information file corresponding to one picture file may be handled even if the size thereof is greater than 7 bytes.

The pointer P-EMPTY is used for managing non-used slots so that they are linked.

Different sectors of the AUX-TOC may be designated for picture names, record dates/times, and URLs such that they may be managed independently. However, when various types of character information added to picture files are managed collectively as a picture information file as shown in FIGS. 24 and 31, the amount of data (number of TOC sectors) required for management information becomes smaller than the case that different sectors of the AUX-TOC are used for the picture names, record dates/times and URLs. Thus, the record areas of the disc can be effectively used.

1-6-5-4. AUX-TOC, Sector 3

The sector 3 of the AUX-TOC shown in FIG. 25 is a picture playback sequence table.

The picture playback sequence table is management information used for outputting a picture file (namely, displaying an image) of a picture file in synchronization with a program such as a music program that is reproduced.

The sector 3 of the AUX-TOC has a header that is composed of a picture address (Sector)=03h and mode information (MODE)=02h.

In addition, the sector 3 of the AUX-TOC has pointers P-TNP1 to P-TNP99 (that can be expanded up to P-TNP255) as a pointer portion corresponding to recorded picture files. The pointers P-TNP1 to P-TNP99 correspond to track numbers of audio data recorded in the program area. In other words, the pointers P-TNP1 to P-TNP99 correspond to the track 1 to track 99.

The table portion has 99 part tables (01h) to (63h) of eight bytes each designated by the pointers P-TNP1 to P-TNP99 and one part table (00h) of eight bytes. As with other sectors of the AUX-TOC, in this sector, all '0s' are placed in the remaining part tables (64h) to (FFh) that are not used. The pointers First TNP and Last TNP following the maker code and the model code represent the number of the first pointer number of the pointers P-TNP1 to P-TNP99 and the last pointer number of the pointers P-TNP1 to P-TNP99, respectively.

Each of the part tables designated by the pointers P-TNP1 to P-TNP99 has a start address and an end address in the offset address format of which the addresses start from the top position of the track. The sector 3 of the AUX-TOC designates addresses in the unit of a sound group.

The byte 4 of each part table represents a particular picture file as a painter P-PNOj. The pointer P-PNOj has a value corresponding to one of picture files (P-PNO1 to P-PNO99) managed with the sector 1 of the AUX-TOC. In addition, other part tables can be linked corresponding to link information. In other words, it can be defined that a plurality of picture files can be displayed on the same track.

For example, when a first picture file is output at a particular timing during a reproducing operation of a music program as a first track, a start address and an end address of a picture output period are placed in a part table designated by the pointer P-TNP1 corresponding to the first track. Next, assuming the case that a picture of the first picture file is output until one minute and 30 seconds elapses after the first track is reproduced for one minute, an address corresponding to an elapse of one minute after the beginning of the reproducing operation of the first track and another address corresponding to an elapse of one minute and 30 seconds are placed as a start address and an end address in the offset address format, respectively, to a part table designated with the pointer P-TNP1. The pointer P-PNOj is designated to the P-PNO1 for the first picture file.

When it is desired to switchably display a plurality of pictures during the reproducing operation of one track, part tables are linked so as to manage the picture files to be output and the outputting periods thereof.

Although the part table (00h) corresponds to the cover picture, since the cover picture is normally not output in synchronization with a reproducing operation of an audio track, all '0s' (zeros) are placed as the start address and the end address of the part table (00h).

However, when both the start address and the end address of a part table corresponding to a certain track are all '0s', a picture of a designated picture file (denoted by the pointer P-PNOj) is displayed during a period of which the sound of the track is output.

When only the end address is all '0s', picture files designated with the pointer P-PNOj are output until a start address of a picture file to be displayed next takes place in the period of the reproducing operation of the track.

When both the start address and the end address are not all '0s' and they are the same, the picture file is prohibited from being displayed and output.

Also in the sector 5 of the AUX-TOC, non-used part tables are managed corresponding to link information of the pointer P-EMPTY.

1-6-5-5. AUX-TOC, Sector 4

The sectors 4 and 5 of the AUX-TOC are used for managing text files.

The sector 4 of the AUX-TOC shown in FIG. 26 is a management sector as a text allocation table and is used for managing data files recorded as text files in the AUX data area.

With the sector 4 of the AUX-TOC, text files are managed in the similar manner to that with the sector 0 of the U-TOC.

Assuming that all the AUX data area is used for recording of text files, text data for 38 clusters (×32 sectors×2324 bytes) can be recorded. Such text data can be managed as up to 255 files with the sector 4 of the AUX-TOC. However, in this example, it is assumed that up to 100 files including one cover text are managed as will be described later.

The file length of each text file is handled as the number of sectors.

One particular text file can be treated as a text file (cover text) corresponding to a so-called cover picture.

A header of the sector 4 of the AUX-TOC has a sector address (Sector)=04h and mode information (MODE)=02h.

As pointers P-TXNO(x) used for managing text files, the sector 4 of the AUX-TOC has pointers P-TXNO1 to P-TXNO99 (that can be expanded up to P-TXNO255). The pointers P-TXNO1 to P-TXNO99 correspond to the track numbers of the audio tracks. Consequently, with the sector 4 of the AUX-TOC, up to 99 text files corresponding to the audio tracks 1 to 99 can be managed (except for the cover text).

The pointer portion also has pointers P-PFRA and P-EMPTY.

The sector 4 of the AUX-TOC has 99 part tables (01h) to (63h) of eight bytes each as a table portion corresponding to respective pointers. Each of the part tables (01h) to (63h) has a start address, an end address, and a text mode. (The remaining part tables (63h) to (FFh) are not used with all '0' placed therein).

The detail of the text mode will be described later.

A part table (00h) is a part table that is not designated by any pointer. In this example, the part table (00h) is used dedicatedly for managing the address of a text file designated as a cover text and the text mode.

The pointers P-TXNO1 to P-TXNO99 designate respective part tables so as to manage areas for respective text files. For example, a part table designated by the pointer P-TNXO1 has a start address, an end address, and a text mode of the first text file as a file number.

Since a text file is handled in the unit of a sector (namely, as the number of sectors) as was described above, the start address and the end address are represented as the number of sectors. "0h" is placed at the data position that represents an address handled as the number of sound groups.

In addition, with the sector 4 of the AUX-TOC, a file managing operation for linking part tables corresponding to link information is not performed. In other words, one text file is not recorded in portions physically spaced apart.

However, non-used part tables in the sector 4 of the AUX-TOC are managed corresponding to link information (that is the byte 8 of each part table) starting from the pointer P-EMPTY.

The pointer P-PFRA in the sector 4 of the AUX-TOC is a pointer for managing a free area (recordable area) of a one-cluster area of the AUX data area in the case that a text file whose amount is smaller than one cluster is recorded in the one-cluster area. In other words, the address of the free area is placed in a part table designated by the pointer P-PFRA. In the free area managing operation, the byte 8 of each part table may be used as link information. The part tables may be linked so that a plurality of areas spaced apart are managed as a free area.

Next, the definition of the text mode designated in each part table of the sector 4 of the AUX-TOC will be described with reference to FIG. 32.

The text mode is an area at the position of the byte 4 in each part table. The text mode is composed of eight bits d1 to d8 (one byte).

Of the eight bits d1 to d8, the two bits d1 and d2 represent a copy status. The copy status is similar to the copy status (S. Pict. mode) of a picture file described with reference to FIG. 30(*a*). For simplicity, the description of the copy status is omitted.

The two bits d3 and d4 represent the contents of a text file. In this example, when the two bits d3 and d4 are "0h", it represents that the text file is a sung text.

In other words, the text file is a song text of a music program of a audio track. When the bits d3 and d4 are "1h", it represents that the text file is a text artist information (the artist name and so forth) of the artist who plays the music program as the audio track.

When the bits d3 and d4 are "2h", it represents that the text file is a liner note (that is a guide attached to an album or the like). When the bits d3 and d4 are "3h", it represents that the text file is another information.

The one bit d5 represents whether or not the text file has a time stamp. When the bit d5 is "0", it represents that the text file does not have a time stamp. When the bit d5 is "1", it represents that the text file has a time stamp. The time stamp will be described later with reference to FIG. 33.

The three bits d6, d7, and d8 represent a character code. The character code is defined in such a manner that for example "0h" designates the ASCII code; "1h" designates the modified ISO 8859-1 code; "2h" designates the music shifted JIS code; "3h" designates the KS C 5601-1989 code (Korean); and "4h" designates the GB 2312-80 code (Chinese). The character code is undefined (reserved) for "5h" and "6h". The character code "7h" designates a plain text. By defining the text file as a plain text file, it is possible to expand the character code.

1-6-5-6. AUX-TOC, Sector 5

FIG. 27 shows a format of the sector 5 of the AUX-TOC. The sector 5 of the AUX-TOC is a text information table that is used as a data area for text information as character information of text name, a record date/time, and a URL of Internet (according to the embodiment, such information is referred to as text information) added to each text.

The structure of a text information file recorded in a table portion of the sector 5 of the AUX-TOC is similar to that of a picture information file described with reference to FIG. 31. In other words, a text information file has a similar structure to a picture information file except that the data unit of a picture name in FIG. 31 is substituted with a data unit of a text name.

In the format of the sector 5 of the AUX-TOC shown in FIG. 27, a header thereof has a sector address (Sector)=05h and mode information (MODE)=02h.

In addition, the sector 5 of the AUX-TOC has pointers P-TXIF1 to P-TXIF99 (that can be expanded up to P-TXIF255) as a pointer portion corresponding to text files. The slot portion also has 255 slots (01h) to (FFh) of eight bits each that can be designated by the pointers P-TXIF1 to P-TXIF99 and one slot (00h) of eight bytes.

A maker code and a model code are followed by pointers First TXIF and Last TXIF that represent the first pointer number and the last pointer number of the pointers P-TXIF1 to P-TXIF99, respectively.

Slots (00h) to (FFh) as a table portion have character information as text information files in ASCII code or another character code. The type of characters to be placed is defined by a character code (chara. code) at a predetermined byte position in the sector 2 of the AUX-TOC.

In this example, as with the sector 2 of the AUX-TOC, the character code is defined in such a manner that for example "00h" designates the ASCII code; "01h" designates the modified ISO 8859-1 code; "02h" designates the music shifted JIS code; "03h" designates the KS C 5601-1989 code (Korean); and "04h" designates the GB 2312-80 code (Chinese).

The pointers P-TXIF1 to P-TXIF99 designate particular part tables for text information files of file numbers corresponding to the individual pointer numbers. For example, a slot designated by the pointer P-TXIF1 has characters corresponding to a picture of a first text file. Eight bytes of a slot (00h) are used as an area dedicated for the beginning of a cover text information file corresponding to a cover text. The slot (00h) is not designated with the pointer P-TXIF(x).

These slots can be linked corresponding to link information so that a text information file corresponding to one text file can be treated even if the text information file is greater than 7 bytes.

In addition, the pointer P-EMPTY is used for managing non-used slots corresponding to link information.

In this example, different AUX-TOC sectors may be designated for text names, record dates/times, and URLs so that they may be managed individually. However, when various types of character information added to picture files are managed collectively as text information files with the sector 5 of the AUX-TOC, the amount of data (number of TOC sectors) required for management information is reduced similarly as with an information file.

1-6-6. Data File 1-6-6-1. Picture File Sector

Next, two types of data files that are a picture file and a text file as AUX data files managed with the above-described sectors of the AUX-TOC will be described.

As a picture file, the file length of one still picture is not limited.

The image size of a still picture is 640×480 dots. A picture file is based on the JPEG format baseline. Since picture files are managed with the AUX-TOC, a bit stream of a file extends from the SOI (Start of Image) marker to the EOI (End of Image) marker corresponding to the JPEG standard.

In addition, since the sector format is the mode 2 and the third layer ECC is not used, the effective number of bytes as an image data capacity of one sector is 2324 bytes. As an example, assuming that a picture file according to the JPEG standard has a size of one cluster (=32 sectors), the actual data size ranges from 72045 (=2324×31+1) bytes to 74368 (=2324×32) bytes.

The format of sectors that compose such picture files is for example as shown in FIG. 28.

A header of 16 bytes that has a synchronous pattern, a cluster address (Cluster H and Cluster L), a sector address (Sector), and mode information (02h) is disposed at the top of a sector of a picture file. The remaining eight bytes are undefined (reserved).

Then, as represented as data DP0 to DP2323, a data area for image data of 2324 bytes is disposed.

In each of the last four bytes, "00h" is placed. Alternatively, error detection parities may be placed in the last four bytes.

1-6-6-2. Text File Sector

As a text file, text data of ASCII, Modified ISO 8859-1, Music Shifted JIS or the like defined in the text mode of the sector 4 of the AUX-TOC can be recorded.

The format of a sector that composes a text file is for example as shown in FIG. 29. Referring to FIG. 29, as with a picture file, a header (16 bytes) and an undefined (reserved) area (eight bytes) are disposed from the top of the sector. The undefined area is followed by a data area for data as a text file of 2324 bytes represented as data DT0 to DT2323.

In each of the last four bytes, "00h" is placed. Alternatively, error detection parities may be placed in the last four bytes.

Figure 33:
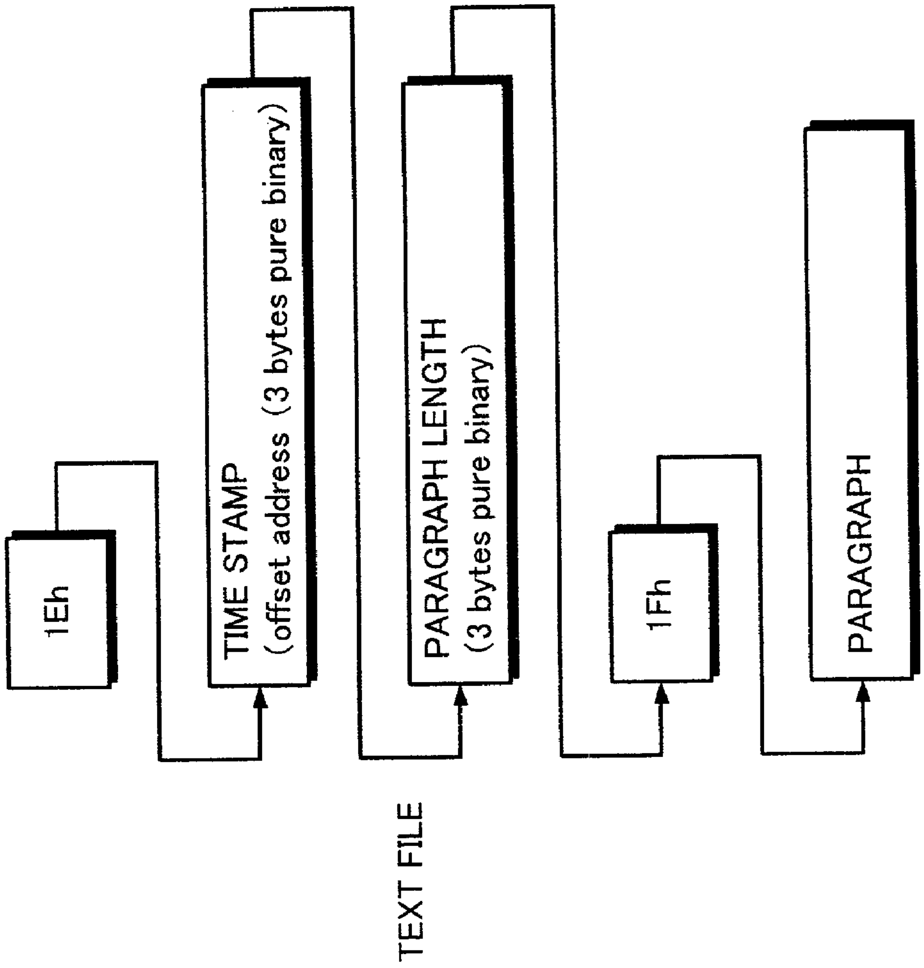
FIG. 33 is a schematic diagram showing the data structure of a text file (having a time stamp)

The data structure of a text file recorded in the sector of the text file is shown in FIG. 33. However, the text file shown in FIG. 33 has a data structure corresponding to that case that the text file has a time stamp (d5='1') as the text mode of the sector 4 of the AUX-TOC.

As shown in FIG. 33, the sector of the text file has a delimiter "1Eh" that represents a delimiter of each text file. The delimiter "1Eh" is followed by a data unit (three bytes, pure binary) that represents a time stamp.

The time stamp defines a displaying or outputting timing of a text file synchronized with the reproduction of an audio track corresponding thereto. The time stamp is represented by an offset address of the audio track.

The data unit that represents the time stamp is followed by a paragraph length data unit (three bytes, pure binary) that represents the data length of the data unit of a paragraph. The paragraph length data unit is followed by data of "1Fh" and a data unit of a paragraph (substantial character information).

1-7. Personal Computer

Next, the internal structure of the personal computer 113 in the AV system according to the embodiment will be described with reference to FIG. 34.

Figure 34:
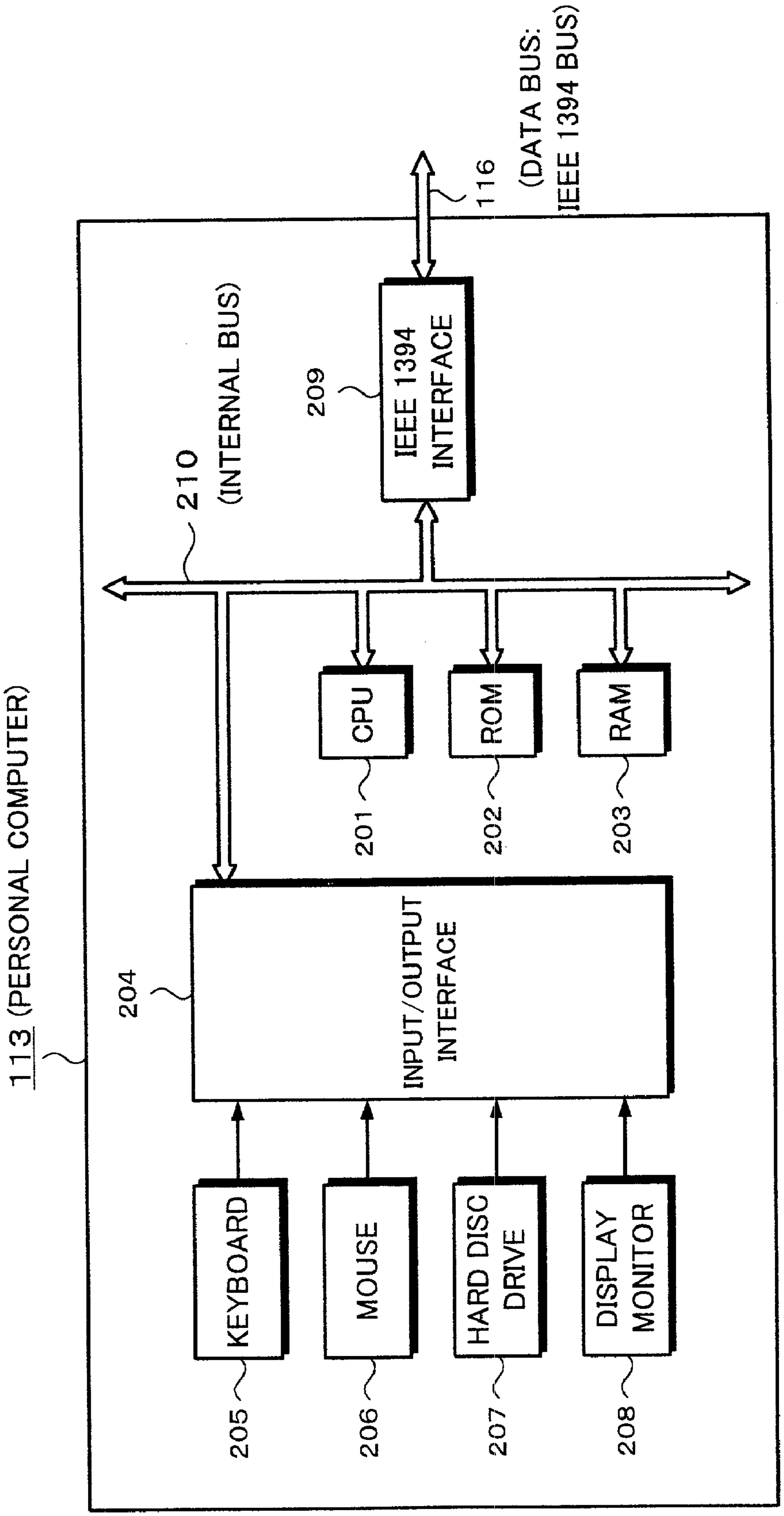
FIG. 34 is a block diagram showing an example of the structure of a personal computer.

The personal computer 113 shown in FIG. 34 has an IEEE 1394 interface 209 as an interface for exchanging data with the outside. The IEEE 1394 interface 209 is connected to the IEEE 1394 bus 116 as an external data bus so as to communicate with an external apparatus.

The IEEE 1394 interface 209 demodulates a packet received through the IEEE 1394 bus 116, extracts data from the demodulated packet, converts the extracted data into a data format corresponding to an internal data communication, and outputs the resultant data to a CPU 201 through an internal bus 210.

In addition, the IEEE 1394 interface 209 receives data that is output under the control of the CPU 201, performs a modulation process corresponding to the IEEE 1394 format such as a packetizing process for the received data, and transmits the resultant data through the IEEE 1394 bus 116 to the outside.

The CPU 201 executes various processes corresponding to a program stored in for example a ROM 202. According to the embodiment, in order to allow various data to be transmitted and received corresponding to the IEEE 1394 standard, a program for controlling the IEEE 1394 interface 209 is stored in the ROM 202. In other words, the personal computer 113 has a set (of hardware and software) that allows data to be transmitted and received corresponding to the IEEE 1394.

In addition, data, programs, and so forth necessary for the CPU 201 to execute various processes are stored in a RAM 203.

A keyboard 205 and a mouse 206 are connected to an input/output interface 204. Operation signals are supplied from the keyboard 205 and the mouse 206 to the CPU 201. A hard disk drive 207 having a hard disk as a storage medium is connected to the input/output interface 204. The CPU 201 can record or read data, a program, or the like to and from the hard disk of the hard disk drive 207 through the input/output interface 204. A display monitor 208 that displays an image is connected to the input/output interface 204.

The internal bus 210 is composed of for example a PCI (Peripheral Component Interconnect) bus, a local bus, or a like bus. The internal bus 210 interconnects various internal functional circuit portions of the personal computer 113.

The IEEE 1394 interface function of each of the IRD 112 and the MD recorder/player 1 that have been described above is substantially similar to that of the personal computer 113.

In other words, for the IRD 112 shown in FIG. 11, a program that allows the CPU 80 to control the IEEE 1394 interface 60 is stored in a ROM (not shown in FIG. 11) of the IRD 112. For the MD recorder/player 1, a program that allows the system controller 11 to control the IEEE 1394 interface 25 is stored in the program ROM 28.

It should be noted that the structure of the system interconnected through the IEEE 1394 bus line according to the embodiment is not limited to the above-described example.

2. Data Communication Through IEEE 1394 Standard According to Embodiment

2-1. Outline

Next, a data communication corresponding to the IEEE 1394 standard according to the embodiment of the present invention will be described.

The IEEE 1394 standard is a serial data communication standard.

Data transmission systems according to the IEEE 1394 standard are categorized as an isochronous communication system of which a communication is performed periodically and an asynchronous communication system of which a communication is performed asynchronously, not periodically. Generally, the isochronous communication system is used for transmitting and receiving data, while the asynchronous communication system is used for transmitting and receiving various control commands. A transmitting operation and a receiving operation of two types of communications systems can be performed using a single cable.

As was described above, the AV system according to the embodiment can transmit or receive (as user data) ATRAC data (audio data) and AUX data (picture files (JPEG still picture data)) and text files) associated with the ATRAC data between different apparatuses through the IEEE 1394 bus.

In this example, the ATRAC data (audio data) is time series audio data that is output corresponding to the reproduction time base. The ATRAC data should be output on real time basis. In addition, the data amount of the ATRAC data is larger than that of the AUX data. On the other hand, the data amount of the AUX data is not larger than that of the ATRAC data. Although the AUX data is sometimes reproduced in synchronization with the reproduction of audio data, the real time characteristic of the AUX data is not stricter than that of the ATRAC data.

Therefore, as an outline of the transmission form of the IEEE 1394 interface according to the embodiment, the ATRAC data (namely, audio data) is transmitted and received corresponding to the isochronous communication system, whereas the AUX data is transmitted and received corresponding to the asynchronous communication system. According to the embodiment, it is possible to transmit ATRAC data and AUX data in different events through the IEEE 1394 interface. Alternatively, ATRAC data and AUX data can be apparently simultaneously transmitted by transmitting them at isochronous cycles on time division basis using the IEEE 1394 interface as will be described later.

Next, the embodiment will be described on the assumption of the transmission form according to the IEEE 1394 standard that has been described above.

2-2. Stack Model

Figure 35:
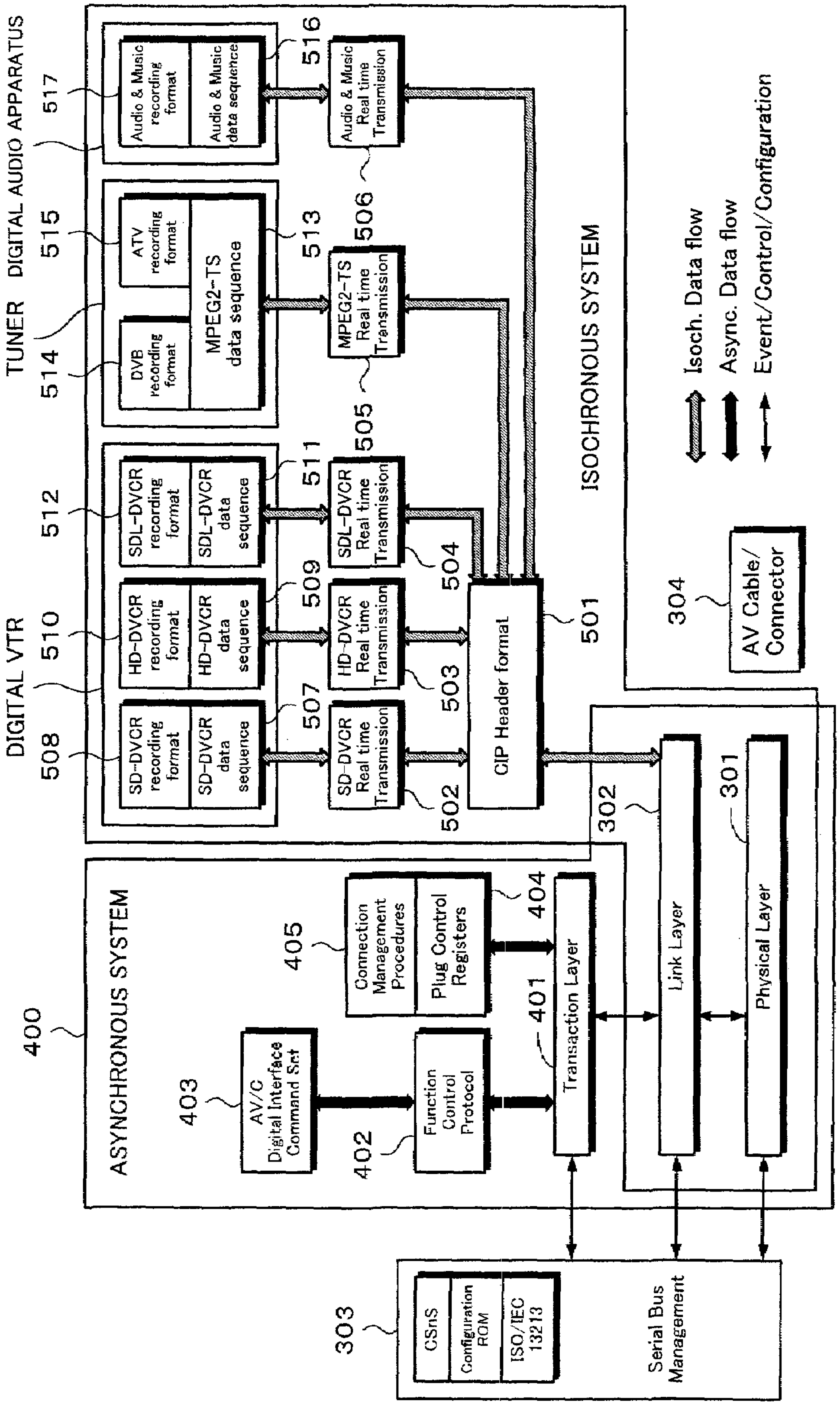
FIG. 35 is a schematic diagram showing a stack model of the IEEE 1394 according to the embodiment.

FIG. 35 shows a stack model of the IEEE 1394 according to the embodiment.

The IEEE 1394 format is largely categorized as an asynchronous system (400) and an isochronous system (500).

As layers common to the asynchronous system (400) and the isochronous system (500), a physical layer (301) is disposed as the lowest layer. A link layer (302) is disposed above the physical layer (301). The physical layer (301) is a layer for controlling the transmission of a signal as hardware. The link layer (302) is a layer having a function for converting the IEEE 1394 bus into for example an internal bus corresponding to each apparatus.

The physical layer (301), the link layer (302) and a transaction layer (401) that will be described next are linked to a serial bus management (303) through event/control/configuration lines.

An AV cable/connector (304) is a physical connector and a cable for transmitting AV data.

The transaction layer (401) is disposed as an upper layer of the link layer (302) in the asynchronous system (400). The transaction layer (401) is a layer that defines a data transmission protocol of the IEEE 1394. As basic asynchronous transactions, a write transaction, a read transaction, and a lock transaction are defined as will be described later.

An FCP (Function Control Protocol) (402) is defined as an upper layer of the transaction layer (401). The FCP (402) uses control commands defined as an AV/C command (AV/C digital interface command set) (403) so that commands for various AV apparatus can be controlled.

For an upper layer of the transaction layer (401), plug control registers (404) that designate plugs (as the relation of logical connections of apparatus according to the IEEE 1394) using connection management procedures (505) are defined. The plugs will be described later.

A CIP header format (501) is defined as an upper layer of the link layer (302) of the isochronous system (500). Transmission protocols such as an SD-DVCR realtime transmission (502), an HD-DVCR realtime transmission (503), an SDL-DVCR realtime transmission (504), an MPEG2-TS realtime transmission (505), and an audio and music realtime transmission (506) are defined in such a manner that they are managed by the CIP header format (501).

The SD-DVCR realtime transmission (502), the HD-DVCR realtime transmission (503), and the SDL-DVCR realtime transmission (504) are data transmission protocols for a digital VTR (Video Tape Recorder).

Data handled by the SD-DVCR realtime transmission (502) is a data sequence (SD-DVCR data sequence (507)) obtained corresponding to the definition of a SD-DVCR recording format (508).

Data handled by the HD-DVCR realtime transmission (503) is a data sequence (SD-DVCR data sequence (509)) obtained corresponding to the definition of a HD-DVCR recording format (510).

Data handled by the SDL-DVCR realtime transmission (504) is a data sequence (SD-DVCR data sequence (511)) obtained corresponding to the definition of an SDL-DVCR recording format 512.

The MPEG2-TS realtime transmission (505) is a transmission protocol corresponding to a tuner for a digital satellite broadcast. Data handled by the MPEG2-TS realtime transmission (505) is a data sequence (MPEG2-TS data sequence (513)) obtained corresponding to the definition of a DVB recording format (514) or an ATV recording format (515).

The audio and music realtime transmission (506) is a transmission protocol for general digital audio apparatuses including for example an MD system according to the embodiment. Data handled by the audio and music realtime transmission (506) is a data sequence (audio and music data sequence) obtained corresponding to the definition of an audio and music recording format (517).

2-3. Signal Transmission Form

Figure 36:
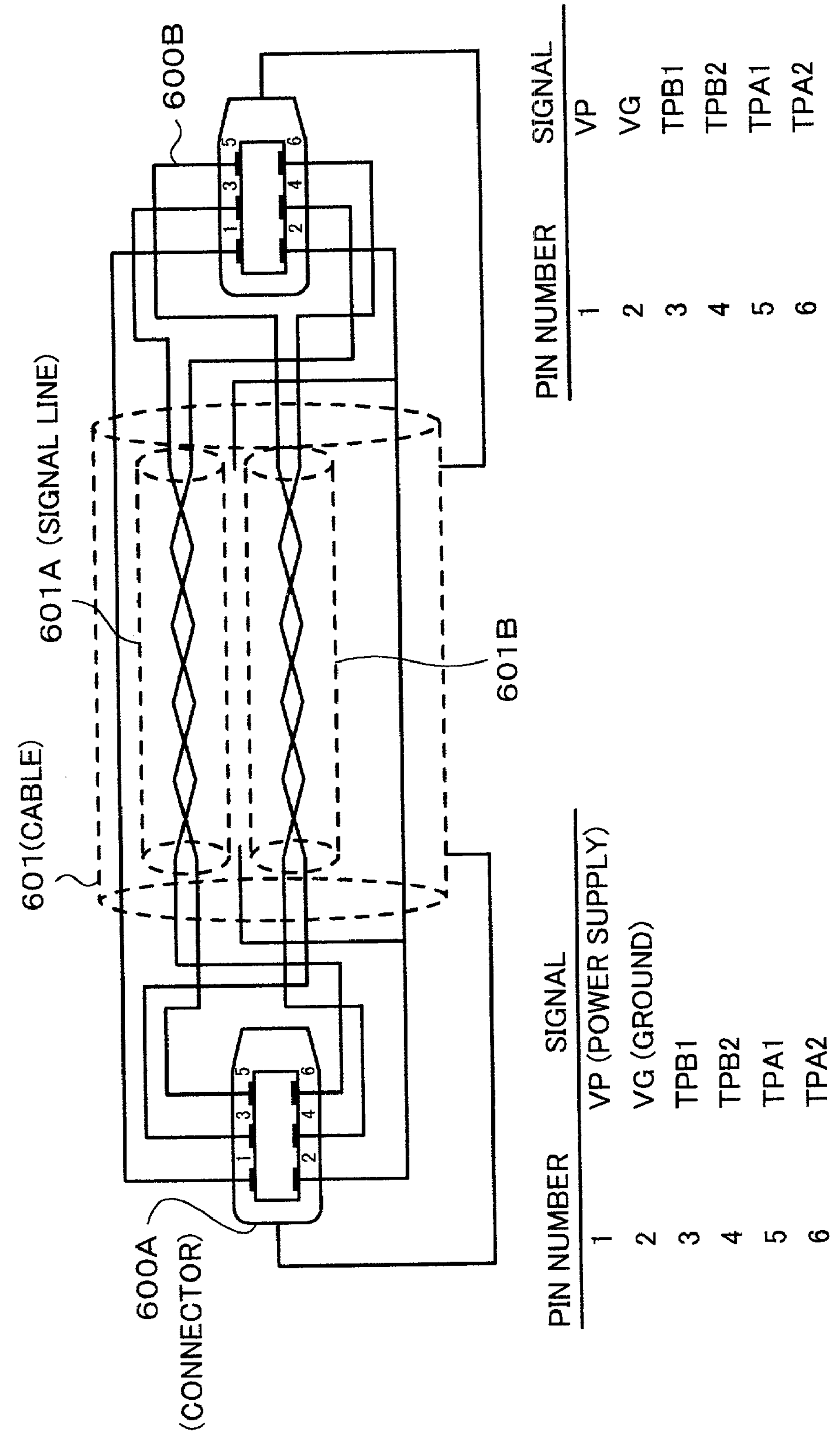
FIG. 36 is a schematic diagram for explaining the cable structure of the IEEE 1394.

FIG. 36 shows an example of the structure of a cable used actually as an IEEE 1394 bus.

Referring to FIG. 36, a pair of connectors 600A and 600B are connected to each other through a cable 601. In this example, six pins having pin numbers 1 to 6 are used as pin terminals of the connectors 600A and 600B.

The pin terminals disposed on the connectors 600A and 600B are allocated in such a manner that the pin number 1 is for the power supply (VP); the pin number 2 is for the ground (VG); the pin number 3 is for TPB1; the pin number 4 is for TPB2; the pin number 5 is for TPA1; and the pin number 5 is for TPA2.

The pins of the connectors 600A and 600B are connected as follows:

Pin number 1 (VP)—pin number 1 (VP)
Pin number 2 (VG)—pin number 2 (VG)
Pin number 3 (TPB1)—pin number 5 (TPA1)
Pin number 4 (TPB2)—pin number 6 (TPA2)
Pin number 5 (TPA1)—pin number 3 (TPB1)
Pin number 6 (TPA2)—pin number 3 (TPB2)

Among these pin connections, the following two pairs of twisted lines form a signal line 601A for differentially transmitting a signal between the connectors 600A and 600B.

Pin number 3 (TPB1)—pin number 5 (TPA1)
Pin number 4 (TPB2)—pin number 6 (TPA2)

The following two pairs of twisted lines form a signal line 601B for differentially transmitting a signal between the connectors 600A and 600B.

Pin number 5 (TPA1)—pin number 3 (TPB1)
Pin number 6 (TPA2)—pin number 3 (TPB2)

Figures 37A, 37B, 37C:
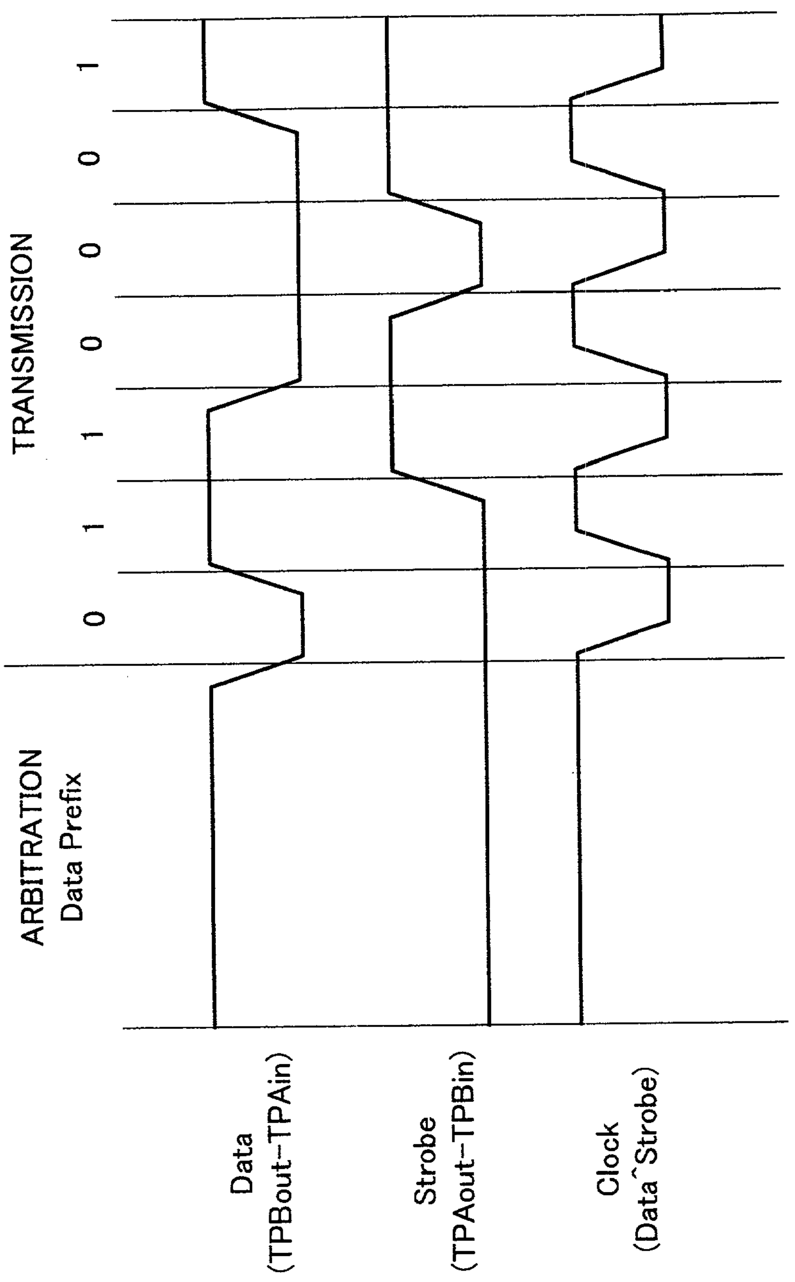
FIG. 37 is a schematic diagram for explaining a form of signal transmission of the IEEE 1394.

A data signal (Data) shown in FIG. 37(*a*) and a strobe signal (Strobe) shown in FIG. 37(*b*) are transmitted through the two signal lines 601A and 601B, respectively.

The data signal shown in FIG. 37(*a*) is output from the pins TPB1 and TPB2 and input to the pins TPA1 and TPA2 using one of the signal lines 601A and 601B.

The strobe signal shown in FIG. 37(*b*) is obtained by performing a predetermined logical operation for a data signal and a transmission clock signal synchronized with the data signal. The frequency of the strobe signal is lower than that of an actual transmission clock signal. The strobe signal is output from the pins TPA1 and TPA2 to the pins TPB1 and TPB2 using one of the signal lines 601A and 601B that is not used for transmitting the data signal.

For example, assuming that the data signal and the strobe signal shown in FIGS. 37(*a*) and 37(*b*) are input to a particular apparatus corresponding to the IEEE 1394 standard, the apparatus performs a predetermined logical operation for the data signal and the strobe signal that has been input, generates a transmission clock signal (Clock) as shown in FIG. 37(*c*), and uses the transmission clock signal for a required input data signal process.

In the IEEE 1394 format, since a data transmission is performed by such a hardware structure, it is not necessary to transmit a high frequency clock signal between apparatuses through a cable. Thus, the reliability of the signal transmission is improved.

In the above-described example, the structure of six pins was explained. However, the IEEE 1394 format permits another structure using four pins for the signal lines 601A and 601B as two twisted lines, eliminating the power supply (VP) and the ground (VG). For example, the MD recorder/player 1 according to the embodiment uses a four-pin type cable so as to provide the user with a more simple system.

2-4. Bus Connection Between Apparatuses

Figure 38:
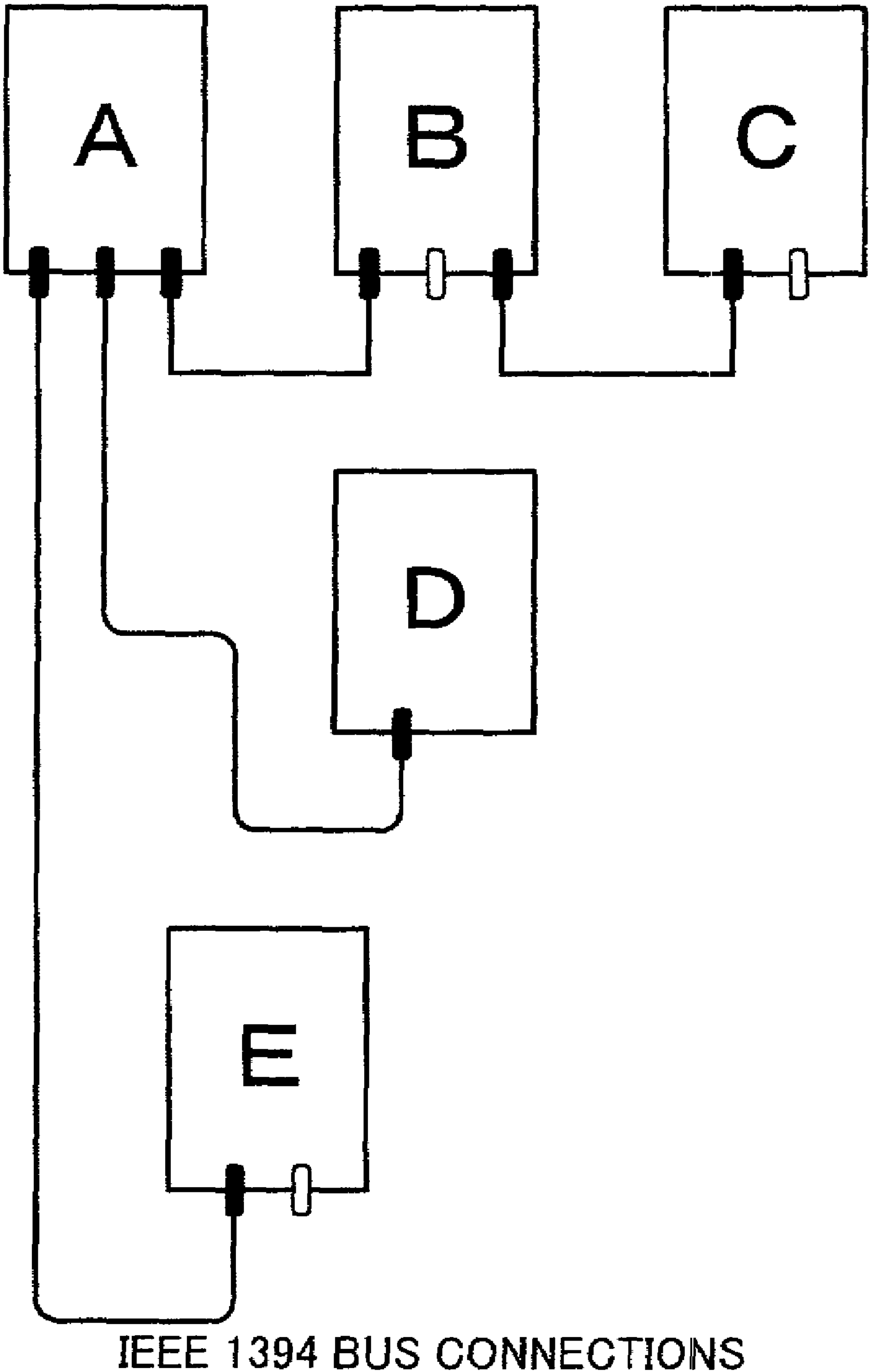
FIG. 38 is a schematic diagram for explaining bus connection provisions of the IEEE 1394.

FIG. 38 shows an example of connections among several apparatuses through the IEEE 1394 bus. FIG. 38 shows the structure of a system of which five apparatuses (nodes) A, B, C, D, and E are connected through the IEEE 1394 bus (namely, cables).

With the IEEE 1394 interface, so-called "daisy chain connections" of which apparatuses A, B, and C are connected in series through the IEEE 1394 bus can be performed. In addition, with the IEEE 1394 interface, so-called "branch connections" of which a particular apparatus and a plurality of apparatuses are connected in parallel can be performed (for example, as shown in FIG. 38, an apparatus A and apparatuses B, D, and E are connected).

With the IEEE 1394 interface, in a combination of branch connections and daisy chain connections, up to 63 apparatuses (nodes) can be connected. As daisy chain connections, up to 16 apparatuses (16 pops) can be connected. The IEEE 1394 interface does not require a terminator unlike with the SCSI system.

In addition, with the IEEE 1394 interface, apparatuses connected in daisy chain connections and/or branch connections of a system can communicate with other apparatuses connected thereto. In the system shown in FIG. 38, any two of the apparatuses A, B, C, D and E can communicate with each other.

In a system of which a plurality of apparatuses are interconnected through the IEEE 1394 bus (this system is hereinafter referred to as IEEE 1394 system), a process for uniquely assigning node IDs to the individual apparatuses of the system is actually performed. This process is schematically shown in FIG. 39.

Figures 39A, 39B, 39C:
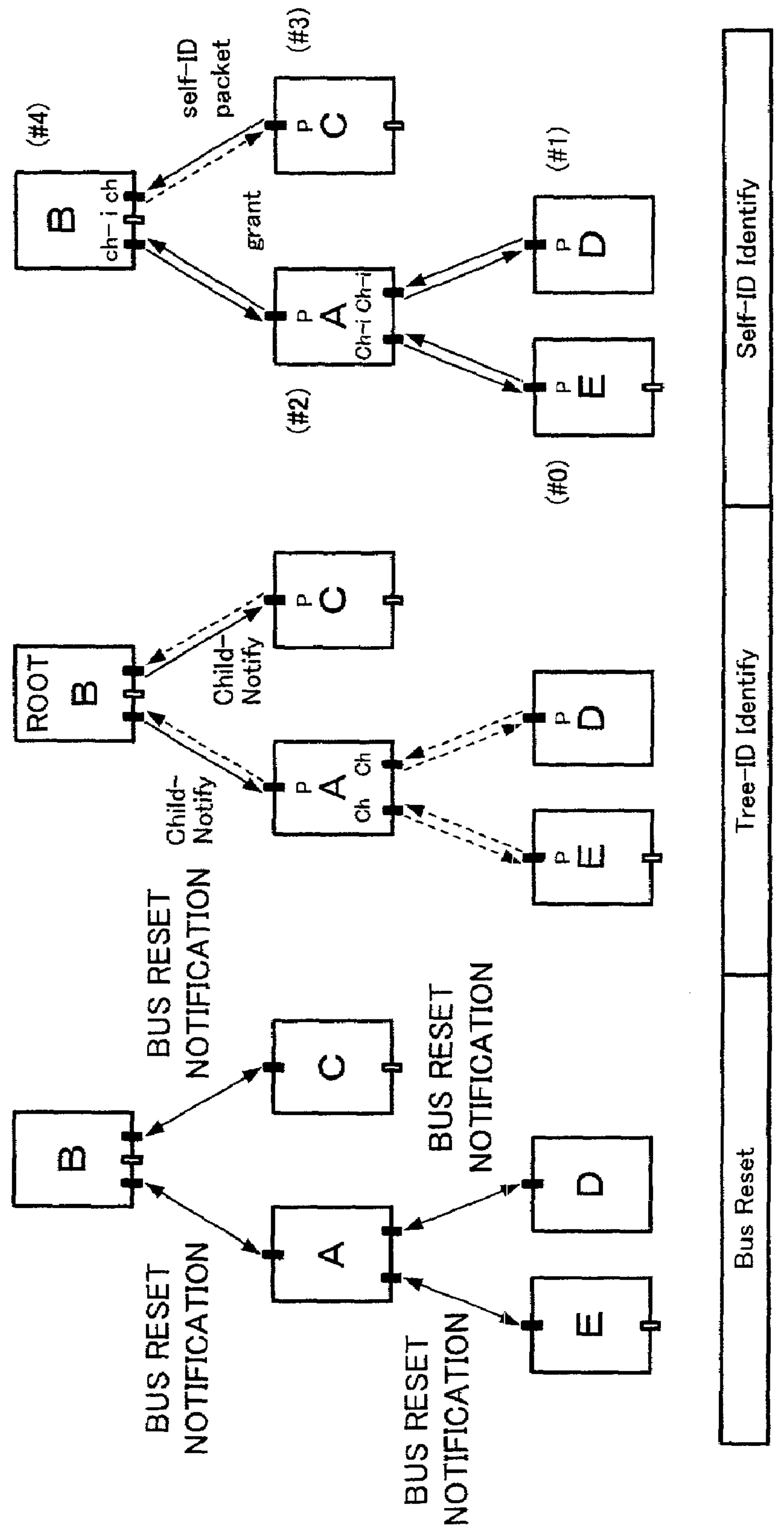
FIG. 39 is a schematic diagram for explaining a concept of a node ID setting procedure of an IEEE 1394 system.

In an IEEE 1394 system connected as shown in FIG. 39(*a*), when the connection or disconnection of a cable, the power on/off operation of a particular apparatus of the system, a spontaneous generation process in a PHY (physical layer protocol) or the like takes place, the bus of the IEEE 1394 system is reset. In this case, a process for notifying all the apparatus A, B, C, D, and E of the system that the bus has been reset through the IEEE 1394 bus is executed.

As a result of the bus reset notification, a communication (child notify) is made and thereby the relation of a parent and children is defined among adjacent apparatuses. In other words, a tree structure is formed among the apparatuses in the IEEE 1394 system. Corresponding to the tree structure, a root apparatus is defined. The root apparatus is an apparatus of which all terminals are defined as children (Ch). In the system shown in FIG. 39(*b*), the apparatus B is defined as a root apparatus. In other words, when a terminal of the apparatus A is connected to the root apparatus B, the terminal is defined as a parent (P).

After the tree structure and the root of the IEEE 1394 system have been defined as described above, each apparatus outputs a self-ID packet as a declaration of a Node-ID of the apparatus itself as shown in FIG. 39(*c*). Then, the root apparatus successively approves (grants) the node-IDs and allocates the addresses (node-ID) of the individual apparatuses of the IEEE 1394 system.

2-5. Packets

Figure 40:
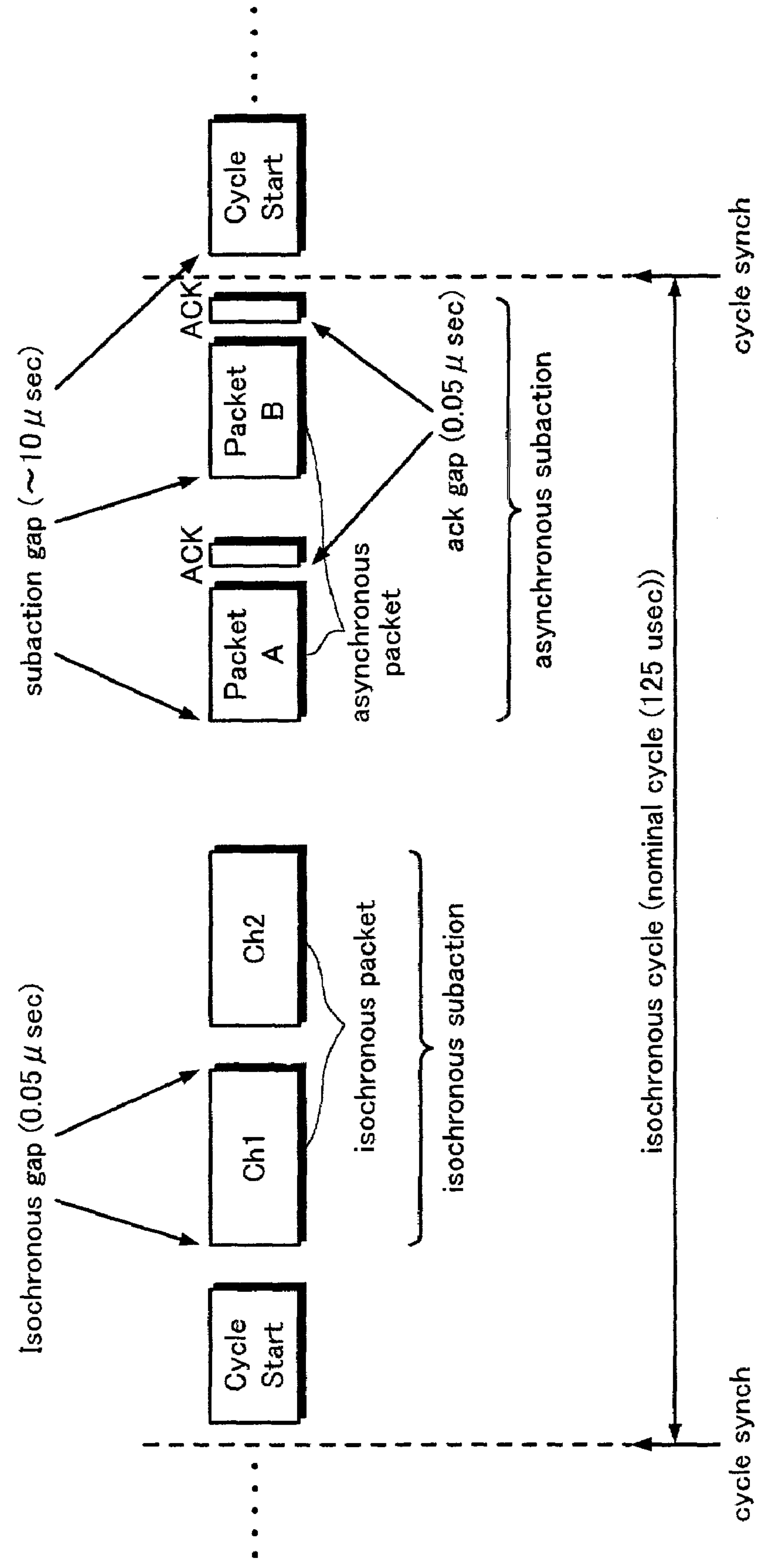
FIG. 40 is a schematic diagram for explaining an outline of a packet transmission of the IEEE 1394.

In the IEEE 1394 format, to transmit data, an isochronous cycle (nominal cycle) is repeated as shown in FIG. 40. In this example, the time period of one isochronous cycle is 125 μsec that is equivalent to a frequency band of 100 MHz. It should be noted that the IEEE 1394 standard permits any other value of the isochronous cycle other than 125 μsec. Data to be transmitted is packetized corresponding to each isochronous cycle.

As shown in FIG. 40, a cycle start packet that represents the beginning of one isochronous cycle is placed at the top thereof.

Although not described in detail, the generation timing of the cycle start packet is designated by a particular apparatus assigned as a cycle master of the IEEE 1394 system.

The cycle start packet is preferentially followed by isochronous packets. The isochronous packets are packetized for each channel, arranged on time-division basis, and transmitted (isochronous subactions) as shown in FIG. 40. In the isochronous subactions, a stop period (for example, 0.05 μsec) referred to as isochronous gap is placed as a delimiter of each packet.

In such a manner, with the IEEE 1394 system, isochronous data can be transmitted and received on multiple channels through a single transmission line.

Assuming that the MD recorder/player according to the embodiment transmits available ATRAC data (compressed audio data) corresponding to the isochronous system, when the ATRAC data is transmitted at a conventional transmission rate of 1.4 Mbps, a time series continuity (real time characteristic) is assured if ATRAC data of at least substantially 20 and several Mbytes is transmitted as isochronous packets for each period of one isochronous cycle of 125 μsec.

For example, when a particular apparatus transmits ATRAC data, although not described in detail, the apparatus requests an IRM (Isochronous Resource Manager) of the IEEE 1394 system for a size of an isochronous packet with which the ATRAC data can be securely transmitted on real time basis. The IRM monitors the current data transmission state and permits or does not permit the requested apparatus corresponding to the monitored result. When the IRM has permitted the apparatus for the requested size, the apparatus can packetize the ATRAC data as isochronous packets and transmit them using a designated channel. This is referred to as band reservation of the IEEE 1394 interface.

Asynchronous subactions as asynchronous packets are transmitted in the remaining band of which the isochronous subactions are used in the isochronous cycle.

FIG. 40 shows an example of which two asynchronous packets that are a packet A and a packet B are transmitted. The asynchronous packets are followed by a stop period of an ack gap (0.05 μsec) and a signal referred to as ACE (Acknowledge). The ACE is a signal that is generated by hardware and output from the reception side (target) to the transmission side (controller) during an asynchronous transaction as will be described later. The ACE notifies the transmission side that the reception side has received some asynchronous data.

Before and after a pair of an asynchronous packet and an ACE as a data transmission unit, a stop period referred to as subaction gap of approximately 10 μsec is placed.

When ATRAC data is transmitted as isochronous packets and an AUX data file associated therewith as asynchronous packets, the ATRAC data and the AUX data file can be transmitted apparently simultaneously.

2-6. Transaction Rule

FIG. 41(*a*) is a process transition diagram showing a basic communication rule (transaction rule) for an asynchronous communication. The transaction rule is defined in the FCP.

As shown in FIG. 41(*a*), first, at step S11, a requester (transmission side) transmits a request to a responder (reception side). When the responder receives the request (at step S12), the responder sends back an acknowledge to the requester (at step S13). When the transmission side receives the acknowledge, the transmission side recognizes that the reception side has received the request (at step S14).

Thereafter, the responder transmits a response against the request received at step S12 to the requester (at step S15). The requester receives the response (at step S16) and transmits an acknowledge as a response against the response to the responder (at step S17). The responder receives the acknowledge and recognizes that the transmission side has received the response.

Request transactions shown in FIG. 41(*a*) are largely categorized as three types of a write request, a read request, and a lock request shown as a left portion of FIG. 41(*b*).

The write request is a command causing the responder to write data. The read request is a command causing the responder to read data. The lock request is a command causing the responder to perform a swapping operation, a comparing operation, a masking operation, or the like (these operations are not described herein).

The write request is defined as three types corresponding to the data size of a command (operand) placed in an asynchronous packet (AV/C command packet) that will be described later. The write request (data quadlet) is used to transmit a command corresponding to only the header size of an asynchronous packet. The write request (data block: data length=4 bytes) and the write request (data block: data length≠4 bytes) are used to transmit a command with a data block added to the header of an asynchronous packet. Thus, they are different from each other in terms of whether or not the data size of an operand placed in the data block is equal to or greater than four bytes.

Likewise, the read request is defined as three types corresponding to the data size of an operand placed in an asynchronous packet, that is, the read request (data quadlet), the read request (data block: data length=4 bytes) and the read request (data block: data length≠4 bytes).

The response transaction is shown as a right portion of FIG. 41(*b*).

Corresponding to the three types of write requests described above, a write response and a no response are defined.

Corresponding to the read request (data quadlet), a read response (data quadlet) is defined. Corresponding to the read request (data block: data length=4 bytes) or the read request (data block: data length≠4 bytes), a read response (data block) is defined.

Corresponding to the lock request, a lock response is defined.

2-7. Addressing

Figure 42:
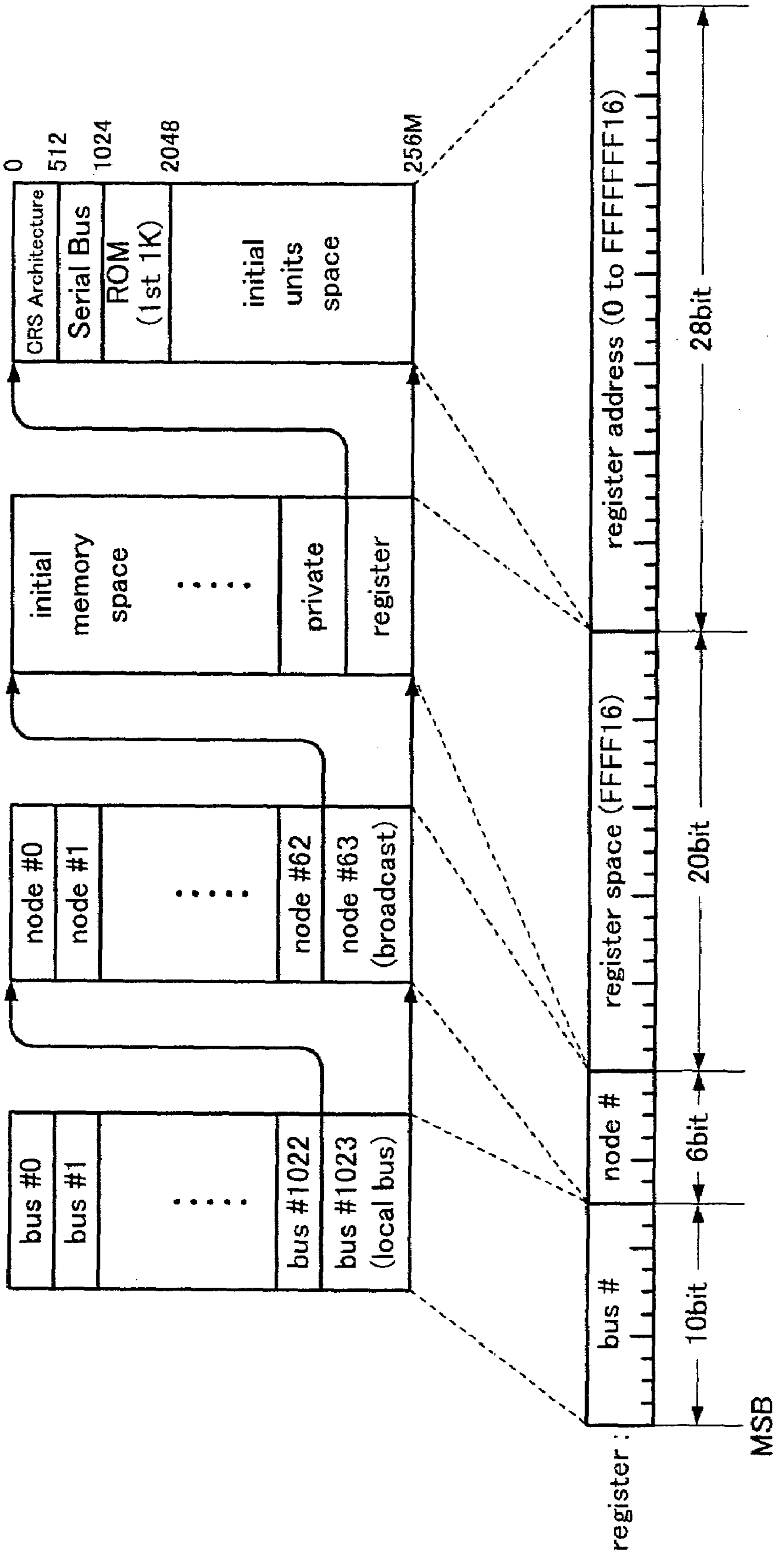
FIG. 42 is a schematic diagram for explaining the addressing structure of an IEEE 1394 bus.

FIG. 42 shows the addressing structure of the IEEE 1394 bus.

As shown in FIG. 42(*a*), according to the IEEE 1394 format, 64 bits are used for a bus address register (address space).

An area of high order 10 bits of the bus address register represents a bus ID for identifying the IEEE 1394 bus. This area allows a total of 1023 bus IDs that are bus #0 to bus #1022 to be assigned as shown in FIG. 42(*b*). The bus ID bus #1023 is defined as a local bus.

In FIG. 42(*a*), an area of six bits following the bus address represents node IDs of apparatuses connected to each IEEE 1394 bus identified by the bus ID. As shown in FIG. 42(*c*), the node IDs can identify 63 different node IDs from node #0 to node #62.

The area of a total of 16 bits that represents the bus ID and the node ID is equivalent to a destination ID of the header of an AV/C Command packet that will be described later. The bus ID and node ID identify each apparatus connected to each bus in the IEEE 1394 system.

In FIG. 42(*a*), an area of 26 bits following the node ID is a register space. An area of 28 bits following the register space is a register address.

The value of the register space is [F FF FFh] that represents the register shown in FIG. 42(*d*). The register address designates the address of the register shown in FIG. 42(*e*).

Briefly speaking, when serial bus-dependent registers starting from the address 512 [0 00 02 00h] of the register shown in FIG. 42(*e*) are referenced, information of the cycle time of the isochronous cycle and a free channel can be obtained.

In addition, when the contents of the configuration ROM starting from the address 1024 [0 00 04 00h] are referenced, the node unique ID and so forth corresponding to the type of the node can be identified.

2-8. CIP

FIG. 43 shows the structure of a CIP (Common isochronous packet). In other words, FIG. 43 shows the data structure of an isochronous packet shown in FIG. 40.

As described above, as one type of record and reproduction data handled by the MD recorder/player according to the embodiment, ATRAC data (audio data) is transmitted and received by an isochronous communication corresponding to the IEEE 1394 standard. In other words, an amount of data that satisfies the real time characteristic of the data communication is placed in isochronous packets and successively transmitted at each isochronous cycle.

The first 32 bits (one quadlet) of the CIP are used as the header of an IEEE 1394 packet.

The header of the IEEE 1394 packet starts with an area data_length of 16 bits. The area data_length is followed by an area tag of two bits. The area tag is followed by an area channel of six bits. The area channel is followed by an area tcode of four bits. The area tcode is followed by an area sy of four bits.

The header of the IEEE 1394 packet is followed by an area header_CRC of one quadlet.

The area header_CRC is followed by an area of two quadlets used for a CIP header.

The first two bytes of the first quadlet of the CIP header are '0' and '0'. The two bytes '0' and '0' are followed by an area SID (transmission node number) of six bits. The area SID is followed by an area DBS (data block size) of eight bits. The area DBS represents the size of a data block (namely, a packetized data unit). The area DBS is followed by an areas FN (of two bits) and an area QPC (of three bits). The area FN represents the number of packets into which data is divided. The area QPC represents the number of added quadlets that are divided.

An area SPH (of one bit) represents a flag of the header of a source packet. An area DBC represents the value of a counter for counting the number of packets that were lost.

The first two bytes of the second quadlet of the CIP header are '0' and '0'. The two bytes '0' and '0' are followed by an area FMT (of six bits) and an area FDF (of 24 bits). The area FMT represents a signal format (transmission format). The value of the area FMT can identify the data type (data format) of data placed in the CIP. In reality, the value of the area FMT can identify MPEG stream data, audio stream data, digital video camera (DV) stream data, and other data. The data formats that can be indicated with the area FMT correspond to transmission protocols such as the SD-DVCR realtime transmission (502), the HD-DVCR realtime transmission (503), the SDL-DVCR realtime transmission (504), the MPEG2-TS realtime transmission (505), and the audio and music realtime transmission (506) managed with the CIP header format 401 shown in FIG. 35.

The area FDF is a format dependent field that represents sub categories of the data format classified with the FMT. The area FDF can identify audio data as for example linear audio data or MIDI data.

For example, with respect to ATRAC data according to the embodiment, the area FMT represents that it is audio stream data and the area FDF represents that the audio stream data is ATRAC data.

When the area FMT represents MPEG data, the area FDF represents synchronous control information referred to as TSF (Time Shift Flag). When the FMT represents the DVCR (digital video camera), the area FDF is defined as shown with a lower portion of FIG. 43. In this example, the first area 50/60 (of one bit) represents the number of fields per second. The second area STYPE (of five bits) represents that the video format is SD or HD. The third area SYT represents a time stamp used for synchronizing frames.

The CIP header is followed by n data blocks represented by the area FMT and the area FDF. Where the area FMT and the area FDF represent ATRAC data, ATRAC data is placed in the area of the data blocks.

The data blocks are followed by the last area data_CRC.

2-9. Connection Management

In the IEEE 1394 format, the relation of apparatuses connected through the IEEE 1394 bus is defined by a logical connection concept referred to as "plug".

Figure 44:
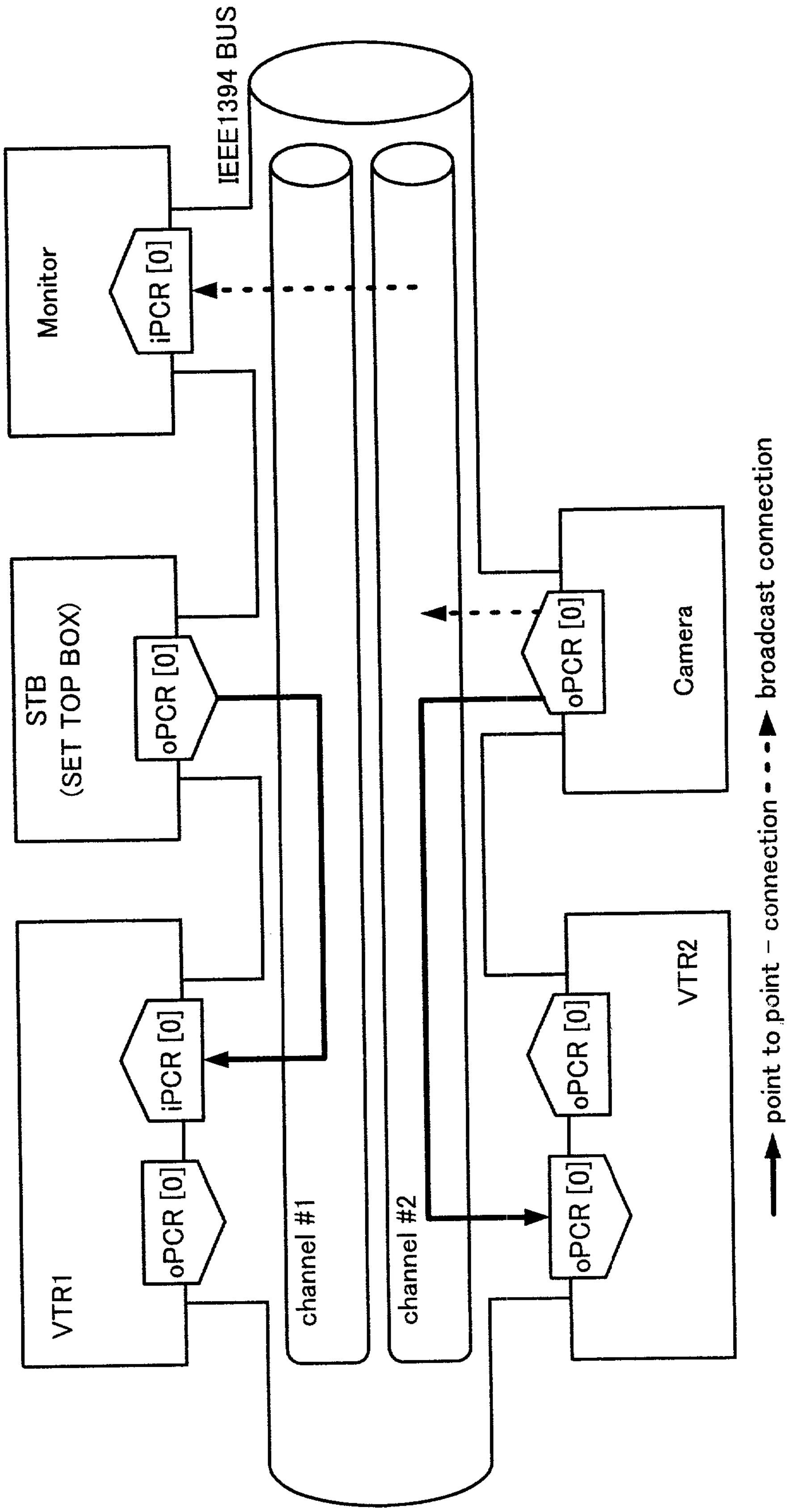
FIG. 44 is a schematic diagram for explaining the relation of connections defined with plugs.

FIG. 44 shows an example of the relation of connections defined by plugs. Referring to FIG. 44, as the structure of a system, a VTR 1, a VTR 2, a set top box (STB: digital satellite broadcast tuner), a monitor apparatus (Monitor), and a digital still camera (Camera) are connected through an IEEE 1394 bus.

In the IEEE 1394 format, there are two types of structures of connections of plugs that are point-to-point connection and broadcast connection.

The point-to-point connection is a structure of connections of which the relation between a transmitter and a receiver is given and data is transmitted therebetween using a particular channel.

In contrast, the broadcast connection is a structure of connections of which a transmitter transmits data without designating a receiver and a channel for use. The receiver side receives data without identifying a transmitter. When necessary, the receiver side performs a particular process corresponding to contents of the received data.

In the example shown in FIG. 44, as an example of the point-to-point connection, two states are shown. As the first state, the STB transmits data and the VTR 1 receives the data through a channel #1. As the second state, the digital still camera transmits data and the VTR 2 receives the data through a channel #2.

In the example shown in FIG. 44, also another state is shown as a third state. As the third state, the digital still camera transmits data corresponding to the broadcast connection. In this example, the monitor apparatus receives data transmitted corresponding to the broadcast connection and performs a predetermined response process.

Such a connection structure (plug structure) is accomplished with a PCR (Plug Control Register) disposed in an address space of each apparatus.

Figure 45A:
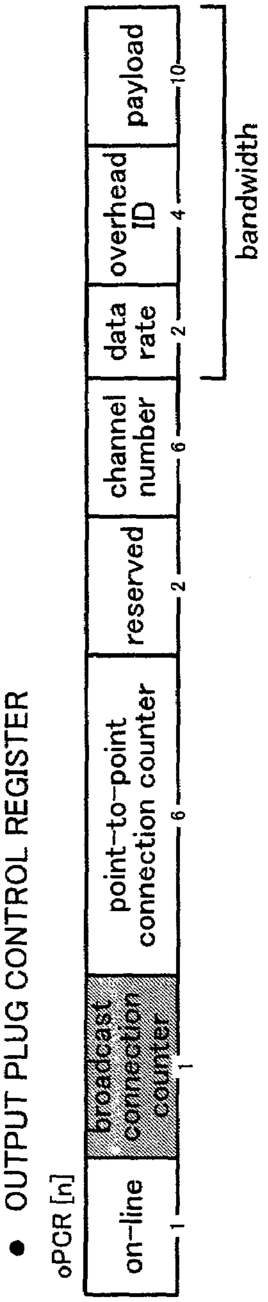
FIG. 45 is a schematic diagram for explaining the structure of a plug control register.
Figure 45B:
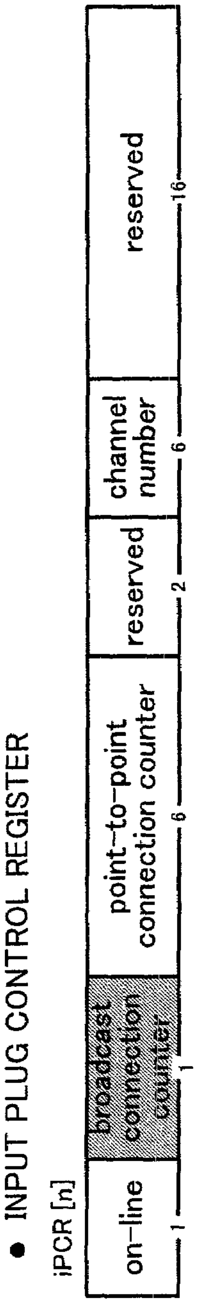

FIG. 45(*a*) shows the structure of an oPCR[n] (output plug control register). FIG. 45(*b*) shows the structure of an iPCR[n] (input plug control register). The sizes of the plug control registers oPCR[n] and iPCR[n] are both 32 bits.

In the oPCR shown in FIG. 45(*a*), when the value of an area on-line of one bit (the high order bit 1) is '1', it represents that data is transmitted corresponding to the broadcast connection. On the other hand, when the value of the area on-line is '0', it represents that data is transmitted corresponding to the point-to-point connection using a channel represented by an area channel number of six bits (starting from the high order bit 11). In the iPCR shown in FIG. 45(*b*), when the value of an area on-line of one bit (the high order bit 1) is '1', it represents that data is received corresponding to the broadcast connection. When the value of the area on-line is '0', it represents that data is received corresponding to the point-to-point connection using a channel represented by an area channel number of six bits (starting from the high order bit 11).

2-10. Command and Response Corresponding to FCP

In the IEEE 1394 format according to the embodiment, AUX data (JPEG picture file and text file) that is recording/reproduction data for the MD recorder/player is transmitted and received using an asynchronous communication.

According to the embodiment, the transmission of AUX data using a asynchronous communication is defined in the FCP (402) shown in FIG. 35. Next, a transaction defined in the FCP will be described.

As the FCP, the write transaction (refer to FIG. 41) defined for an asynchronous communication is used. Thus, when AUX data according to the embodiment is transmitted, the write transaction of the asynchronous communication is used corresponding to the FCP.

An apparatus that supports the FCP has a command/response register. Such an apparatus writes a message to the command/response register so as to accomplish a transaction in such a manner as will be described with reference to FIG. 46.

Figure 46:
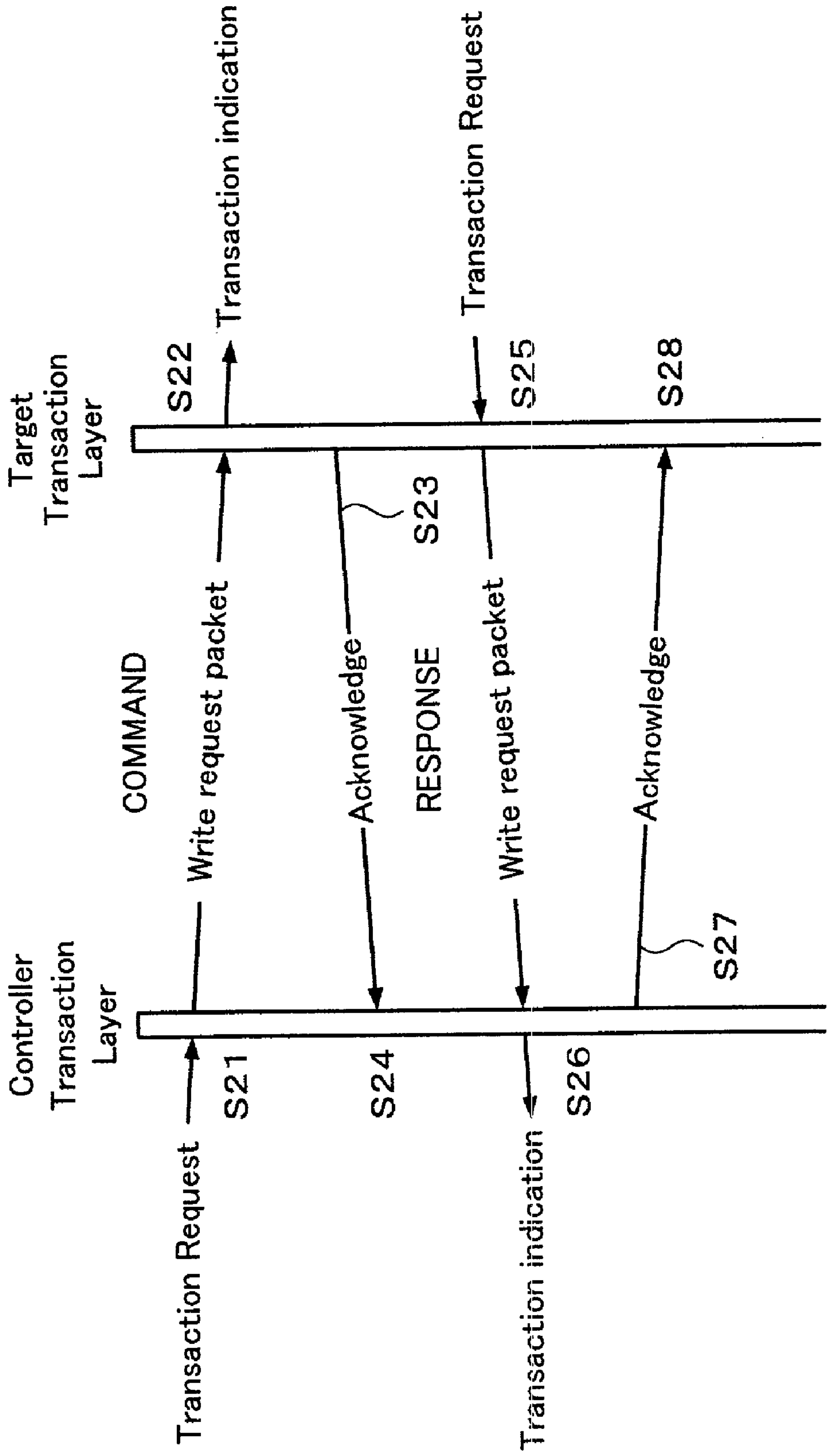
FIG. 46 is a process transition diagram showing write transaction defined in an asynchronous communication.

In a process transition diagram shown in FIG. 46, as a process for transmitting a command, the controller executes a process for generating a transaction request and transmitting a write request packet to a target at step S21. The target receives a write request packet and writes data to the command/response register at step S22. At this point, the target further transmits an acknowledge to the controller. The controller receives the acknowledge (at steps S23 and S24). A sequence of processes that have been performed till now is a process for transmitting a command.

Thereafter, as a process for responding to the command, the target transmits a write request packet (at step S25). The controller receives the write request packet and writes it to the command/response register (at step S26). In addition, the controller transmits an acknowledge corresponding to the reception of the write request packet to the target (at step S27). The target receives the acknowledge and thus recognizes that the controller has received the write request packet (at step S28).

In other words, the command transmitting process performed by the controller against the target and the response transmitting process performed by the target against the controller responding to the command transmitting process are basic data transmissions (transactions) corresponding to the FCP.

2-11. AV/C Command Packets

As was described with reference to FIG. 35, corresponding to the FCP, various AV apparatuses can be asynchronously communicated using AV/C commands.

As described above with reference to FIG. 41, three types of transactions of write, read, and lock are defined as asynchronous communications. In reality, write request/response packets, read request/response packets, and lock request/response packets corresponding to individual transactions are used. Corresponding to the FCP, the write transaction that was described above is used.

Figure 47:
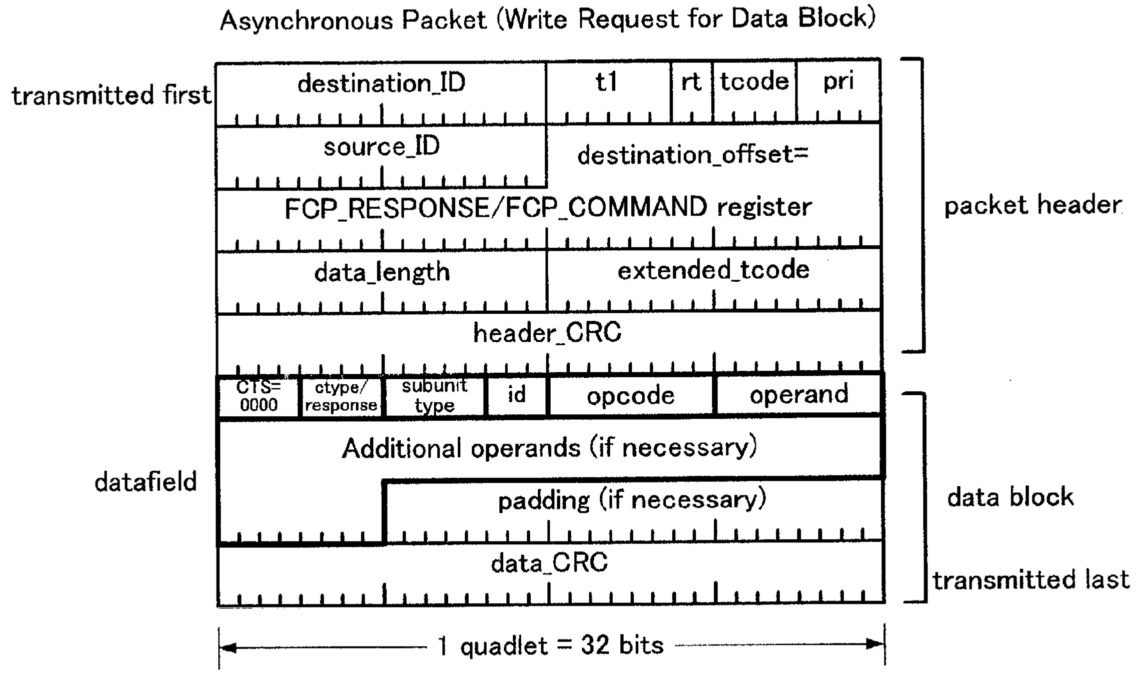
FIG. 47 is a schematic diagram showing the structure of an asynchronous packet (AV/C command packet)

FIG. 47 shows the format of the write request packet (asynchronous packet (write request for Data Block)). According to the embodiment, the write request packet is used as an AV/C command packet.

The high order five quadlets (first to fifth quadlets) of the write request packet are used for a packet header.

An area of the high order 16 bits of the first quadlet of the packet header is destination_ID. The area destination_ID represents the node ID of the transmission destination of the data. The area destination_ID is followed by an area t1 (transact label) of 6 bits. The area t1 represents a packet number. The area t1 is followed by an area rt (retry code) of two bits. The area rt represents whether the packet is an originally transmitted packet or a re-transmitted packet. The area rt is followed by an area tcode (transaction code) for four bits. The area tcode represents an instruction code. The area tcode is followed by an area pri (priority) for four bits. The area pri represents a priority level of the packet.

An area of high order 16 bits of the second quadlet is source_ID. The area source_ID represents the Node_ID of the transmission source of data.

An area of a total of 48 bits of the low order 16 bits of the second quadlet and the entire third quadlet is destination_offset. The area destination_offset represents the addresses of the command register (FCP_COMMAND register) and the response register (FCP_RESPONSE register).

The area destination_ID and the area destination_offset are equivalent to the address space of 64 bits defined in the IEEE 1394 format.

An area of the high order 16 bits of the fourth quadlet is data_length. The area data_length represents the data size of an area datafield (that is surrounded by a solid line in FIG. 47). The area datafield will be described later.

The area data_length is followed by an area extended_tcode of the low order 16 bits. The area extended_tcode is used when the tcode is expanded.

An area of 32 bits of the fifth quadlet is header_CRC. The area header_CRC represents a CRC calculation value for checking the sum of the packet header.

A data block is disposed starting from the sixth quadlet following the packet header. An area datafield is formed at the top of the data block.

A CTS (Command and Transaction Set) is placed in the high order four bytes of the sixth quadlet as a top area of the datafield. The CTS represents the ID of the command set of the write request packet. For example, when the value of the CTS is set to [0000] as shown in FIG. 47, the contents of the datafield are an AV/C command. In short, the CTS represents that the write request packet is an AV/C command packet. Thus, according to the embodiment, since an AV/C command is used in the FCP, [0000] is placed in the CTS.

The area CTS is followed by an area ctype (command type; functional classification of the command) or an area response of four bits. The area response represents the result of a process (response) corresponding to the command.

FIG. 48 shows the contents of the definition of the above-described areas ctype and response.

As the values of the area ctype (command), [0000] to [0111] can be used. The value [0000] is defined as a control command; the value [0001] as a status command; the value [0010] as an inquiry command; the value [0011] as a notify command; and the values [0100] to [0111] are currently undefined (reserved).

The control command is a command that causes an external apparatus to control a function of the local apparatus. The status command is a command that causes an external apparatus to ask the local apparatus for the status thereof. The inquiry command is a command that causes an external apparatus to inquire the local apparatus whether it supports a control command. The notify command is a command that causes an external apparatus to ask for the local apparatus to notify the external apparatus of a change of the status of the local apparatus.

As the values of the area response, [1000] to [1111] can be used. The value [1000] is defined as a response "not implemented"; the value [1001] as a response "accepted"; the value [1010] as a response "rejected"; the value [1011] as a response "in transition"; the value [1100] as a response "implemented/stable"; the value [1101] as a response "changed"; the value [1110] as a response "reserved"; and the value [1111] as a response "interim".

Such responses are used corresponding to the type of a command. For example, as a response to the command control, one of the four responses "not implemented", "accepted", "rejected", and "interim" is selectively used corresponding to a situation of the responder side and so forth.

Referring back to FIG. 47, the area ctype/response is followed by an area subunit-type of five bits. The area subunit-type represents the destination of the command or the subunit of the transmission source of the response. According to the IEEE 1394 format, an apparatus itself is referred to as unit, and the type of a functional element disposed in the unit (apparatus) is referred to as subunit. For example, a conventional VTR as a unit has two subunits that are a tuner and a video cassette recorder/player. The tuner receives a ground radio wave and a direct broadcast.

The subunit-type is defined as shown in FIG. 49 (*a*). Referring to FIG. 49(*a*), [00000] is defined as a monitor; [00001] to [00010] are reserved; [00011] is defined as a disc recorder/player; [00100] as a VCR; [00101] as a tuner; [00111] as a camera; [01000] to [11110] are reserved; and [11111] is defined as a unit that does not have a subunit.

Referring back again to FIG. 47, the area subunit-type is followed by an area id (Node_ID) of three bits. The area id (Node_ID) identifies one of a plurality of subunits that are of the same type.

The area id (Node_ID) is followed by an area opcode of eight bits, The area opcode is followed by an area operand of eight bits.

The opcode is an operation code. The operand has information (parameter) required for the opcode. The opcode is defined for each subunit and has a table of a list of opcodes unique to the individual subunit. When a subunit is a VCR, various commands including a command play (reproduction) and a command record (record) are defined for the opcode as shown in FIG. 49(*b*). Operands are defined for each opcode.

The area datafield shown in FIG. 47 essentially requires 32 bits of the sixth quadlet. However, when necessary, operands can be added following the sixth quadlet (as additional operands).

The area datafield is followed by an area data_CRC. When necessary, a padding can be placed before the area data_CRC.

2-12. Plugs

Next, plugs according to the IEEE 1394 format will be described in brief. As was described with reference to FIG. 45, plugs represent the relation of logical connections of apparatuses according to the IEEE 1394 format.

Figure 50:
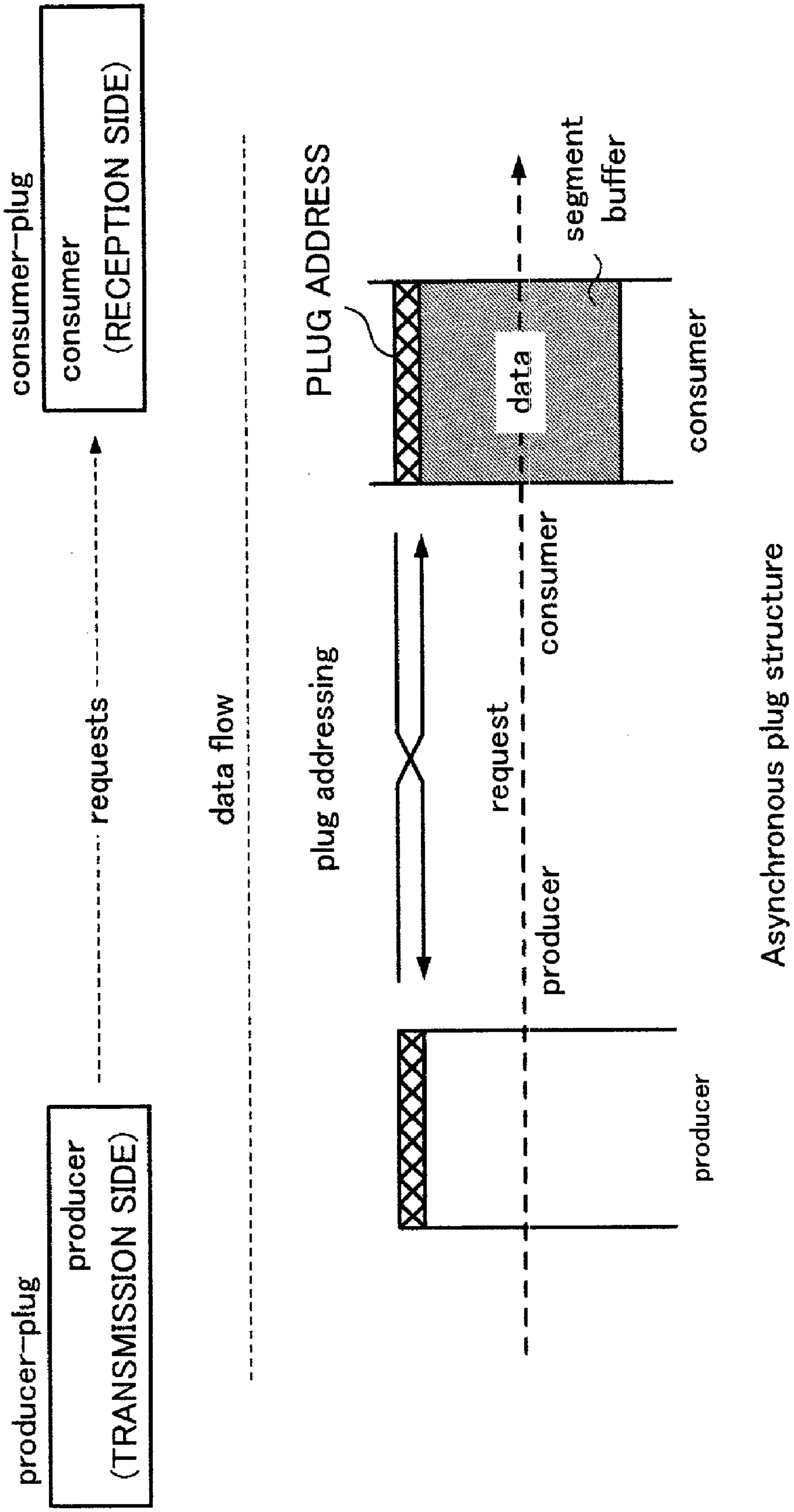
FIG. 50 is a schematic diagram for explaining the plug structure in an asynchronous communication.

As shown in FIG. 50, data (a request) such as command or the like that is valid in an asynchronous communication is transmitted from a producer to a consumer. The producer and the consumer represent apparatuses that function as a transmitter and a receiver, respectively, on the IEEE 1394 interface. The consumer has a segment buffer to which data is written by the producer (the segment buffer is denoted by hatched lines in FIG. 50).

In the IEEE 1394 system, information (connection management information) for defining particular apparatuses as the producer and the consumer is stored at a predetermined position in a plug address denoted by meshed lines. The segment buffer is disposed following the plug address.

The address range (data amount) of the segment buffer of the consumer to which data can be written is defined by a limit count register that is managed by the consumer side as will be described later.

Figure 51:
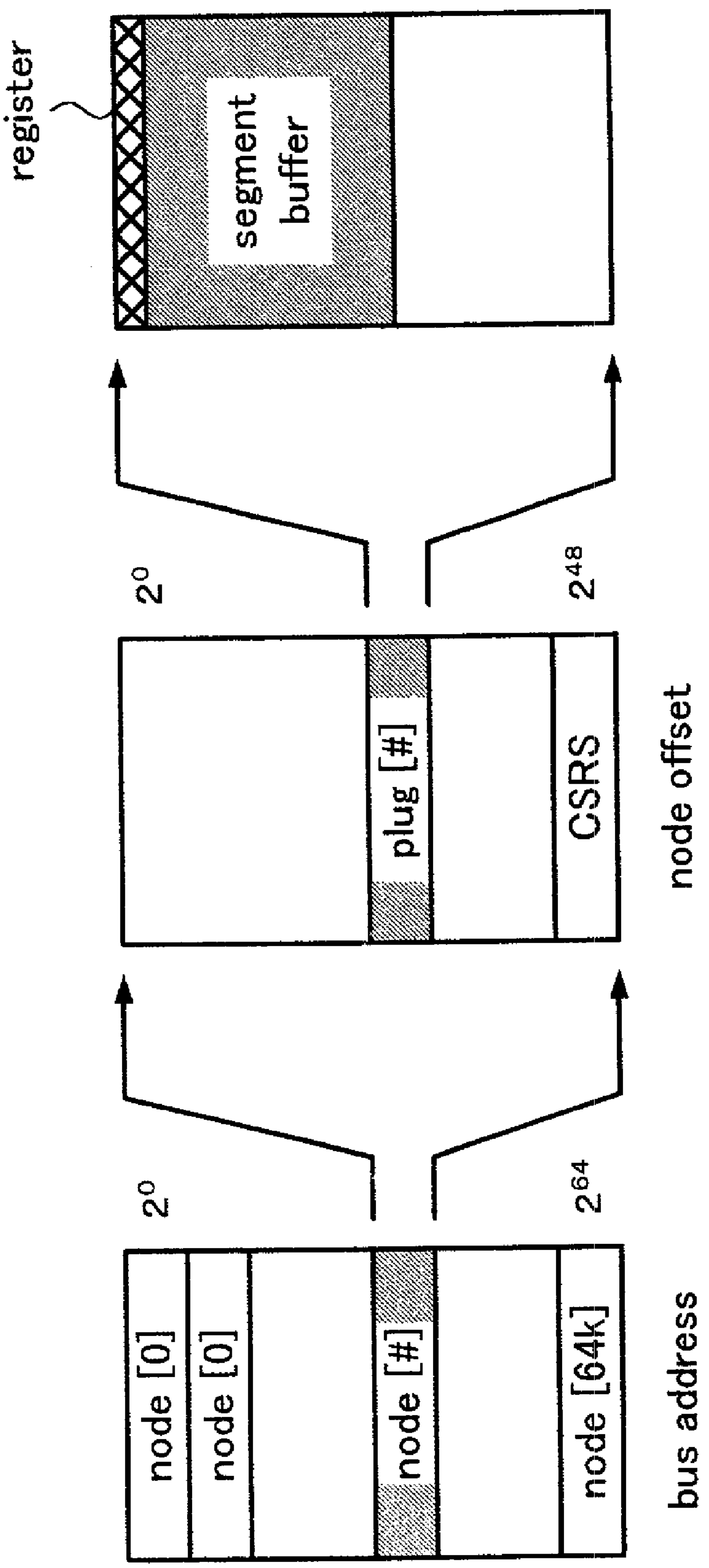
FIG. 51 is a schematic diagram for explaining the plug address structure in an asynchronous communication.

FIG. 51 shows the structure of the address space of plugs in an asynchronous communication.

The address space of 64 bits of plugs is divided into $2^{16}$ (64 K) nodes as shown in FIG. 51(*a*). Plugs are assigned in the address space of each node as shown in FIG. 51(*b*). Each plug is composed of a register denoted by a meshed area and a segment buffer denoted by a hatched line area as shown in FIG. 51(*c*). Information (for example, a transmission data size and a receivable data size) necessary for managing data exchanged between the transmission side (producer) and the reception side (consumer) is stored to the register as will be described next. The segment buffer is an area for data transmitted from the producer to the consumer are written. According to the IEEE 1394 format, it is defined that the size of the segment buffer is at least for example 64 bytes.

Figures 52A, 52B, 52C:
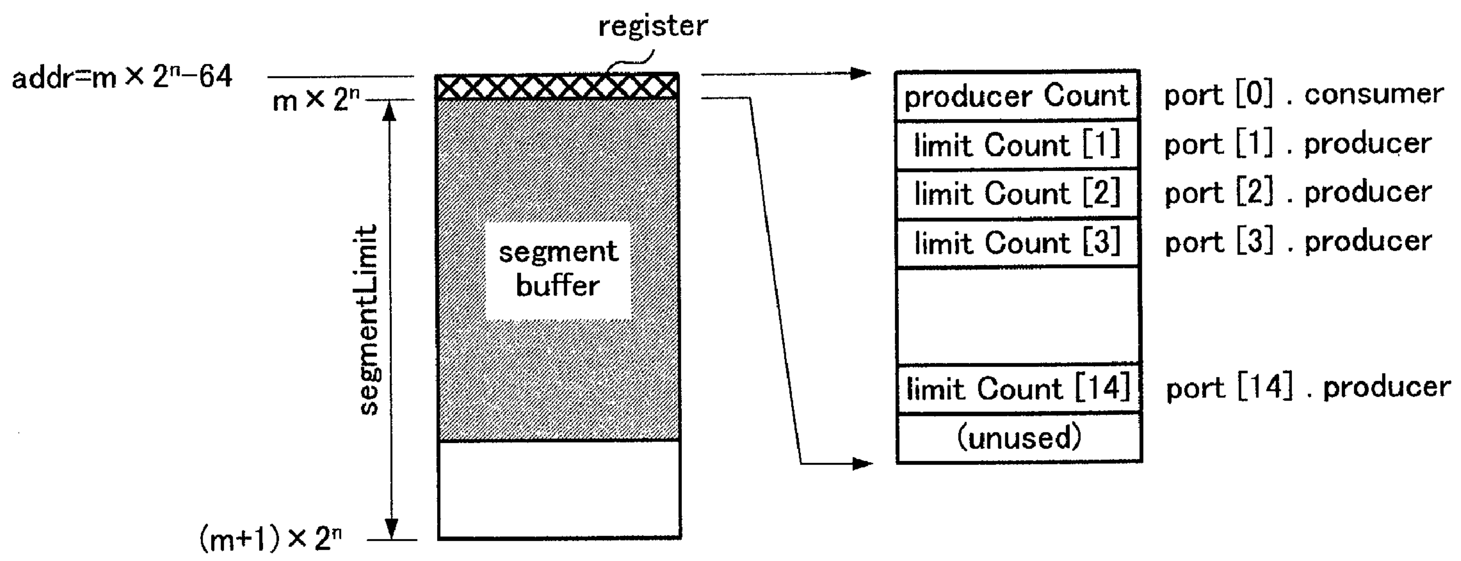
FIG. 52 is a schematic diagram for explaining the plug address structure in an asynchronous communication.

FIG. 52(*a*) shows plug addresses. In other words, FIG. 52(*a*) shows the same contents as those of FIG. 51(*c*).

As shown in FIG. 52(*a*), a register is disposed at the top of the plug addresses. The register is followed by a segment buffer.

FIG. 52(*b*) shows the internal structure of the register. Referring to FIG. 52(*b*), a producer count register of for example 32 bits is disposed at the top of the register. The producer count register is followed by limit count registers [1] to [14] of 32 bits each. In other words, the area register is composed of one producer count register and 14 limit count registers. The limit counter register [14] is followed by an unused area.

The plug structure shown in FIG. 52(*a*) and FIG. 52(*b*) is designated with an offset address (address offset) as shown in FIG. 52(*c*).

In other words, offset address 0 represents a consumer port (producer count register) and offset addresses 4, 8, 12, . . . , and 56 represent producer ports [1] to [14], respectively. Offset address 60 is defined as a reserved address that represents an unused area. Offset address 64 represents a segment buffer.

Figure 53:
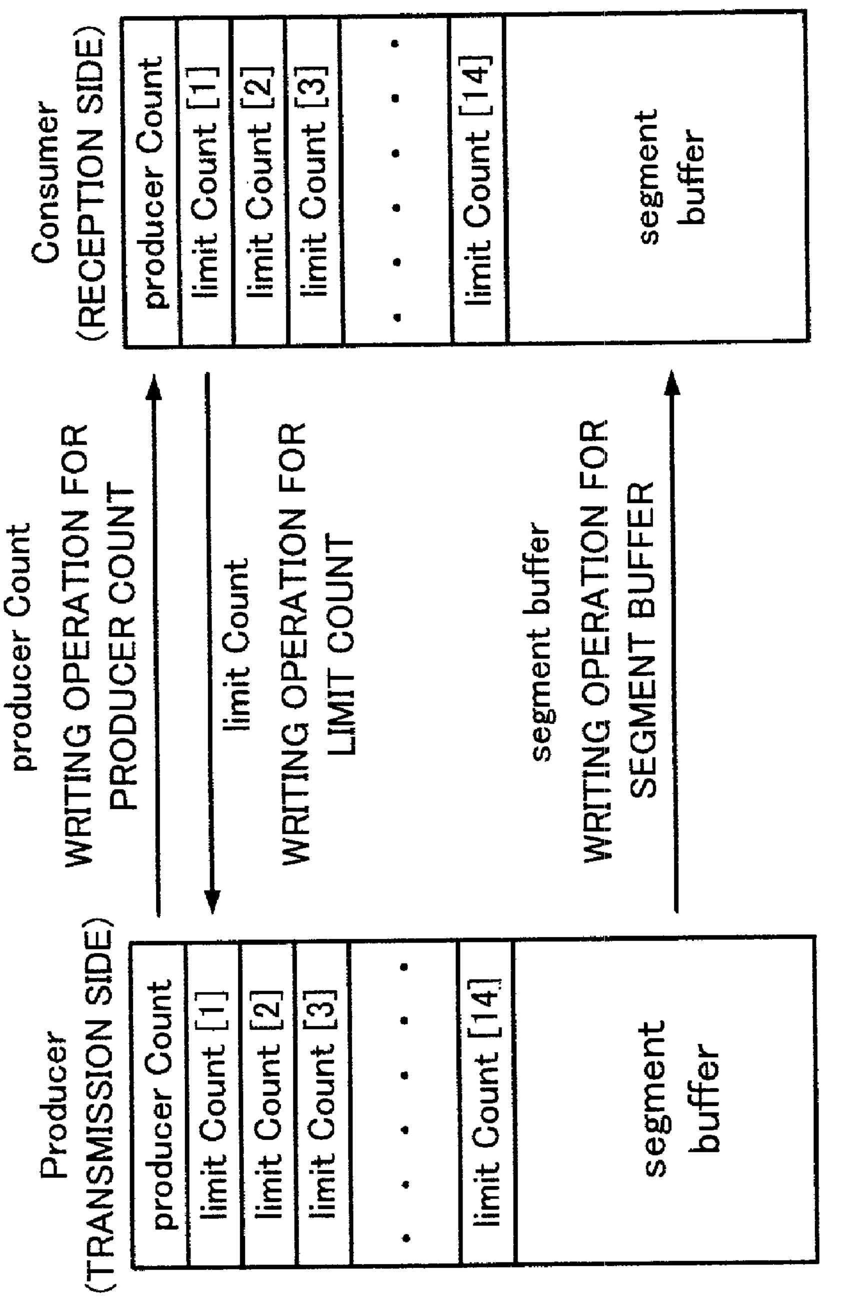
FIG. 53 is a schematic diagram for explaining processes performed between plugs in an asynchronous communication.

FIG. 53 shows the plug structures of both the producer side and the consumer side.

In the plug structure for an asynchronous communication, data is written to a producer count register, a limit count register, and a segment buffer corresponding to a transmitting/receiving procedure that will be described later. Such writing processes are processes as write transactions that were described above.

The contents of the producer count register are written by the producer for the consumer.

The producer writes information of data transmission of the producer side to the producer count register at an address of the producer itself and then writes the contents of the producer count register to the producer count register of the consumer.

The producer count register uses information of the size of data at a time written by the writing process as the size of data to be written to the segment buffer of the consumer by the producer. In other words, the producer performs a process for notifying the consumer of the size of data to be written to the segment buffer of the consumer by writing data to the producer count register.

In contrast, the contents of the limit count register are written by the consumer for the producer.

The consumer side writes the capacity (size) of the segment buffer thereof to one of the limit count registers [1] to [14] thereof designated corresponding to that of the producer and writes the contents of the limit count register [n] to the limit count register [n].

The producer side decides the amount of data to be written at a time by the writing operation corresponding to the contents written to the limit count register [n] as described above and writes data to for example the segment buffer of the producer itself. The contents written to the segment buffer are written for the consumer. The writing operation for the segment buffer is equivalent to a data transmission as a asynchronous communication.

2-13. Transmitting Procedure Corresponding to Asynchronous Connection

Next, basic transmitting/receiving procedures corresponding to an asynchronous connection will be described with reference to a process transition diagram shown in FIG. 54 on the assumption of the structure between plugs (producer and consumer) described with reference to FIG. 53.

Figure 54:
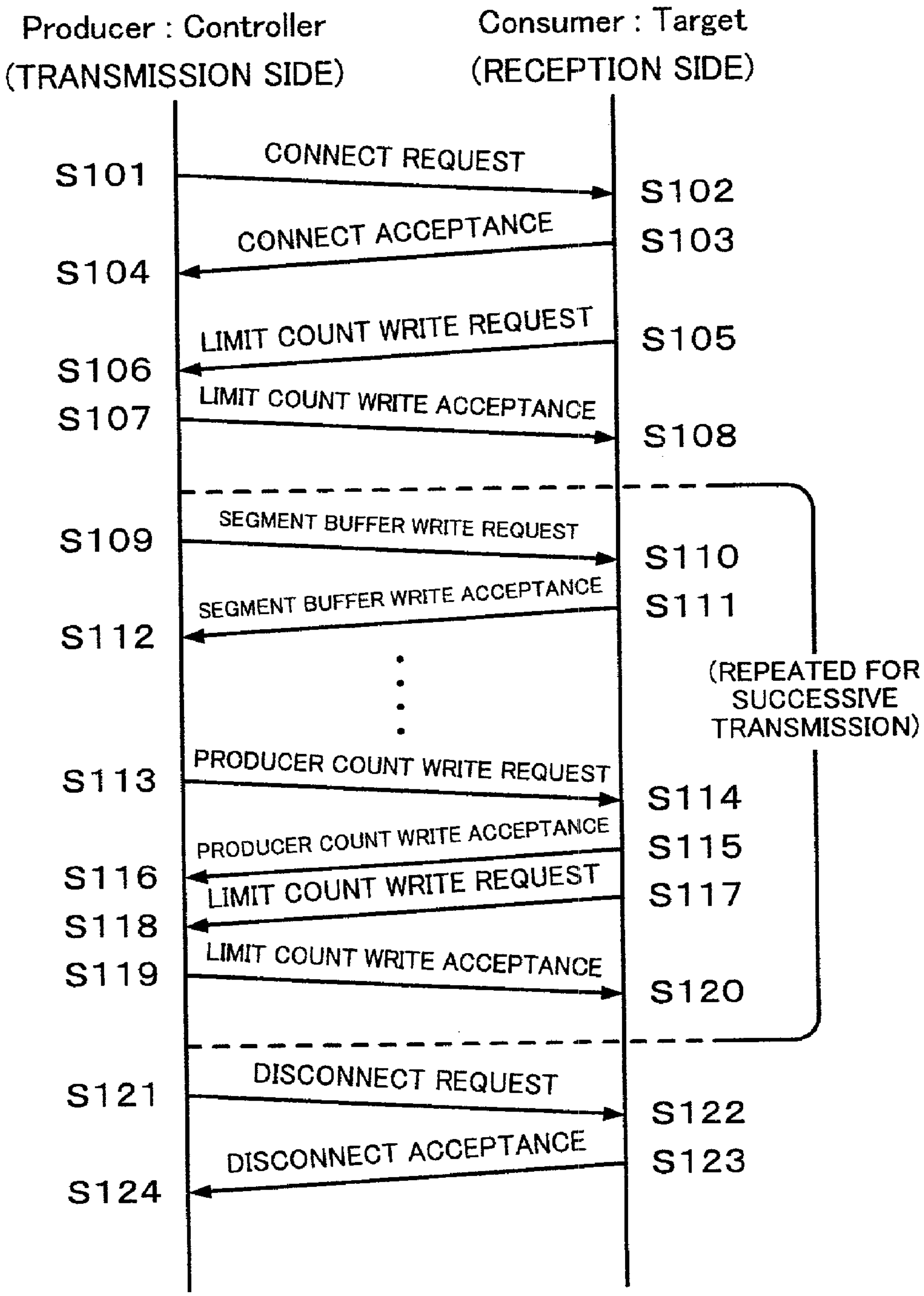
FIG. 54 is a schematic diagram for explaining a transmitting procedure as an asynchronous connection.

The transmitting/receiving processes shown in FIG. 54 are performed using AV/C commands (write request packets) in an environment defined corresponding to the FCP as an asynchronous communication. AUX data handled according to the embodiment is transmitted and received in the IEEE 1394 system using the transmitting/receiving procedures. However, the processes shown in FIG. 53 are communication operations corresponding to the asynchronous connection. Communication processes corresponding to the recording and reproducing operations of AUX data will be described later.

In a real asynchronous connection, when a command is transmitted, an acknowledge is transmitted and received corresponding to the transmitted command as described with reference to FIG. 46. However, for simplicity, in FIG. 54, the transmitting/receiving processes for the acknowledge are omitted.

In the IEEE 1394 interface, as well as the relation of plugs (apparatuses), there is a relation defined as a controller and a target. In the IEEE 1394 system, apparatuses having the relation of a producer and a consumer do not always comply with apparatuses having the relation of a controller and a target. In other words, the IEEE 1394 system may have an apparatus having a function defined as a producer as well as a function defined as a controller. Next, an example of the case of which the relation of a producer and a consumer complies with the relation of a controller and a target will be described.

In the transmitting procedure shown in FIG. 54, a connect request is transmitted from the producer to the consumer at step S101. The connect request is a command that causes the producer to be connected to the consumer and the address of the register of the producer to be transmitted to the consumer.

The connect request is received by the consumer at step S102. Thus, the consumer side recognizes the address of the register of the producer. Then, at step S103, the consumer transmits a connect acceptance as a response to the producer. Then, at step S104, the producer receives the connect acceptance. Consequently, a connection is established between the producer and the consumer for transmitting and receiving data that follows.

After the connection is established as described above, the consumer transmits a write request for the limit count register (hereinafter referred to simply as "limit count") to the producer at step S105. The producer receives the write request at step S106 and transmits a limit count write acceptance to the consumer at step S107. Then, at step S108, the consumer receives the limit count write acceptance. In the sequence of processes of the limit count write request/write acceptance, the data writhe size (segment buffer capacity) of the segment buffer is decided.

Then, at step S109, the producer transmits a segment buffer write request to the consumer. Then, at step S110, the consumer receives the segment buffer write request. Corresponding to the segment buffer write request, the consumer transmits a segment buffer write acceptance to the producer at step S111. The producer receives the segment buffer write acceptance at step S112.

In a sequence from step S109 to step S112, the data writing process for writing data from the segment buffer of the producer to the segment buffer of the consumer is completed.

The data written in the sequence from step S109 to step S112 is placed in an asynchronous packet described above with reference to FIG. 40. Thus, if the size of the data transmitted with one asynchronous packet is smaller than the data size designated by the limit count described above and required data cannot be transmitted with one asynchronous packet, the sequence from step S109 to step S112 is repeated in the range of which the segment buffer becomes full.

Then, after the writing process for writing data to the segment buffer in the sequence from step S109 to step S112 is completed, the producer transmits a producer count register (hereinafter referred to simply as producer count) write request to the consumer at step S113. The consumer receives the producer count write request and writes it to the producer count register thereof at step S114. Then, the consumer transmits a producer count write acceptance to the producer at step S115. The producer receives the producer count write acceptance at step S116.

In the sequence from step S113 to step S116, the consumer is notified of the data size of data transmitted from the producer to the segment buffer of the consumer.

Then, at step S117, a sequence of processes for writing the limit count corresponding to the producer count writing process in the sequence from step S113 to S116 is executed. In other words, in a sequence of step S117 to S120, a limit count write request is transmitted from the consumer to the producer and then a limit count write acceptance is transmitted from the producer to the consumer corresponding to the limit count write request.

The sequence from step S109 to step S120 is a procedure of the data transmitting process corresponding to the asynchronous connection. When the size of data to be transmitted is larger than the capacity of the segment buffer and data cannot be completely transmitted with one session of the sequence from step S109 to step S120, the sequence can be repeatedly performed until the data is completely transmitted.

After the data has been completely transmitted, the producer transmits a disconnect request to the consumer at step S121. The consumer receives the disconnect request at step S122. Then, the consumer transmits a disconnect acceptance at step S123. Then, at step S124, the producer receives the disconnect acceptance. Thus, the data transmitting/receiving procedures corresponding to the asynchronous connection are completed.

2-14. Background to the Present Invention

Next, the background of the present invention will be described in detail based on the above description.

As is clear from the above description, according to the embodiment, a particular apparatus (controller) can control various operations for another apparatus (target) through a communication using AV/C commands of the IEEE 1394 interface. In other words, according to the embodiment, a remote control can be performed on the IEEE 1394 bus.

However, as described above, when a particular controller remotely controls a target, if another controller remotely controls the same target or if a main body key, a remote controller, or the like (a local key) of the target is operated, there may be differences in processes and their results between the controller and the target.

As a real example of such a situation, assuming that in the AV system shown in FIG. 1, the personal computer 113 is defined as a controller and the MD recorder/player 1 is defined as target, the case that the personal computer 113 remotely controls an editing process of the MD recorder/player 1 will be described with reference to a process transition diagram shown in FIG. 55.

In addition, it is assumed that the personal computer 113 has application software for remotely controlling an editing process of the MD recorder/player 1 (hereinafter the application software is referred to simply as "operation panel"). Also, it is assumed that before the process shown in FIG. 55 gets started, the personal computer 113 has activated the operation panel.

Moreover, in the following description with reference to FIG. 55, the personal computer 113 is referred to as controller and the MD recorder/player 1 is referred to as target.

Figure 55:
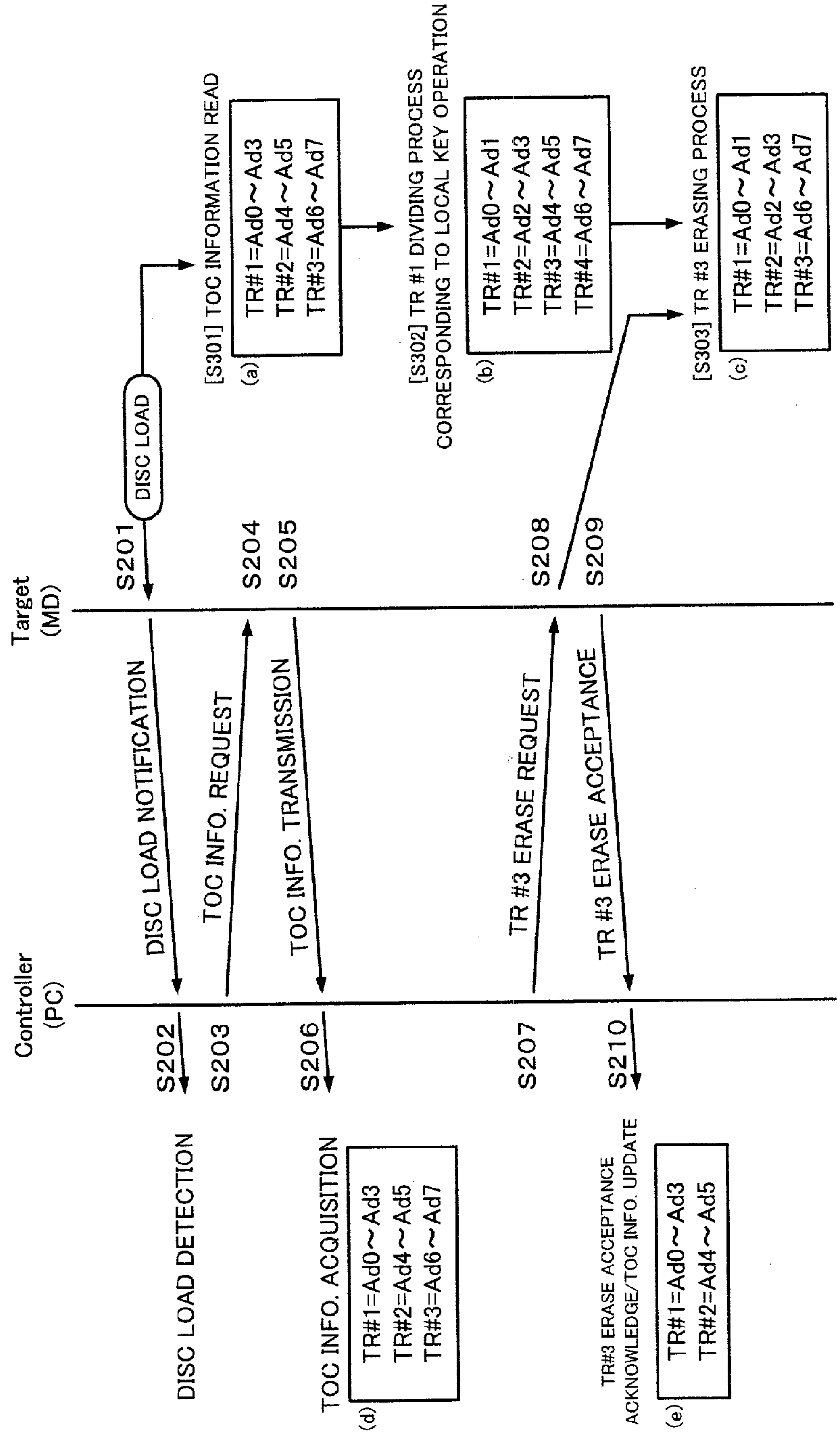
FIG. 55 is a process transition diagram showing a real example in the case that there are differences in process states between a personal computer (controller) and an MD recorder/player (target)

In addition, transmitting/receiving processes for commands and responses between the controller and the target shown in FIG. 55 is performed using AV/C commands. Each command or each response is defined as an opcode that represents that the MD recorder/player 1 (disc recorder/player [00011]) is subunit_type as described above for example with reference to FIG. 49.

Furthermore, in the following description, the term of local key or local command will be sometimes used. In the specification, the local key represents for example any of various operation keys of the main body of an apparatus as the target or a remote controller attached to the apparatus as the target. On the other hand, the local command represents a command generated in the apparatus as the target corresponding to an operation of a local key. For example, in the case of the MD recorder/player 1, a local key represents any of various keys of the operation portion 23 or the remote controller 32. A local command represents a command accepted by the system controller 11 corresponding to an operation performed for the operation portion 23 or the remote controller 32.

Referring to FIG. 55, when a disc is loaded to the MD recorder/player 1 as a target, the target transmits a disk load notification for notifying that the target has loaded a disc to the controller at step S201. The controller receives the disc load notification at step S202 and thereby knows that a disc has been loaded to the target.

Next, after loading the disc, the MD recorder/player 1 reads TOC information (U-TOC and AUX-TOC) from the disc and stores it to for example the buffer memory 13 at step S301.

In this example, it is assumed that as the contents of the sector 0 of the U-TOC of the TOC information read from the disc, a program area is managed as shown in FIG. 55(*a*). In other words, three tracks TR #1 to TR #3 are recorded in the program area. The track TR #1 is recorded at addresses Ado to Ad3; the track TR #2 is recorded at addresses Ad4 to Ad5; and the track TR #3 is recorded at addresses Ad6 to Ad7.

After the controller has known that a disc had been loaded to the MD recorder/player 1 as the target at step S202, the controller sends a TOC information request for requesting for the TOC information (U-TOC and AUX-TOC) to the target at step S203.

At step S204, the target receives the TOC information request. Next, at step S205, the target transmits the TOC information currently stored in the buffer memory 13 to the controller. The controller receives the TOC information and stores it to for example the RAM 203 at step S206. Consequently, the target has successfully obtained the TOC information.

The contents of the TOC information obtained at this point are the same as the TOC information that has been read when the disc had been loaded to the MD recorder/player 1. Thus, the same contents as those of FIG. 55(*a*) are obtained as the contents of the sector 0 of the U-TOC as shown in FIG. 55(*a*). In short, in this stage, the contents of the TOC information of the controller are matched with those of the target.

The TOC information is transmitted and received at steps S205 and S206 in a writing process for the segment buffer corresponding to the asynchronous connection described with reference to FIGS. 53 and 54.

Next, it is assumed that, in a particular stage, an editing process for dividing the track TR #1 is performed corresponding to an operation of a local key of the MD recorder/player 1 defined as a target at step S302.

As a result of the editing process, the contents of the sector 0 of the U-TOC are updated in the MD recorder/player 1 as shown in for example FIG. 55(*b*). In other words, the program area is managed in such a manner that the track TR #1 (=addresses Ado to Ad1), the track TR #2 (=addresses Ad2 to Ad3), the track TR #3 (=addresses Ad4 to Ad5), and the track TR #4 (=addresses Ad6 to Ad7) are recorded.

The target does not notify the controller that the contents of the sector 0 of the U-TOC is updated as shown in FIG. 55(*b*).

It is assumed that the controller performs an operation for erasing for example the track TR #3 for the operation panel. In this example, at step S207, the controller transmits a track TR #3 erase request for requesting for erasing of the track TR #3 to the target.

Then, the target receives the track TR #3 erase request at step S208. At this point, the MD recorder/player 1 as a target rewrites the local TOC information and thereby erases the track TR #3 at step S303. Consequently, the contents of the sector 0 of the U-TOC stored in the MD recorder/player 1 represent the track TR #1 (=addresses Ado to Ad1), the track TR #2 (=addresses Ad2 to Ad3), and the track TR #3 (=Ad6 to Ad7) as shown in FIG. 55(*c*).

As described above, the MD recorder/player 1 as the target executes the erasure process for the track TR #3 at step S303. In addition, the target transmits a track TR #3 erase acceptance to the controller at step S209.

When the controller receives the TR #3 erase acceptance at step S210, the controller assumes that the editing process operated by the controller itself has been performed by the target (MD recorder/player 1) side and updates the contents of the local TOC information.

In this example, the updating process for erasing the track #3 is executed for the contents of the sector 0 of the U-TOC shown in FIG. 55(*a*), the sector 0 of the U-TOC is used to manage the program area for the track TR #1 (=addresses Ad0 to Ad3) and the track TR #2 (=addresses Ad4 to Ad5) as shown in FIG. 55(*e*).

When such a process is executed, as is clear from the comparison between the contents of the sector 0 of the U-TOC shown in FIG. 55(*c*) and those shown in FIG. 55(*e*), the U-TOC information managed by the controller (personal computer 113) does not match that managed by the target (MD recorder/player 1).

In this stage, it is difficult for the personal computer 113 side to accurately obtain the TOC information of the MD recorder/player 1 side and perform an editing operation. Thereafter, when the TOC information held in the personal computer 113 is transmitted and then the TOC information of the MD recorder/player 1 side is rewritten, the recorded condition of the track of the disc may not match the contents of the TOC information. Thereafter, the recording operation and the reproducing operation cannot be properly performed.

Figure 56:
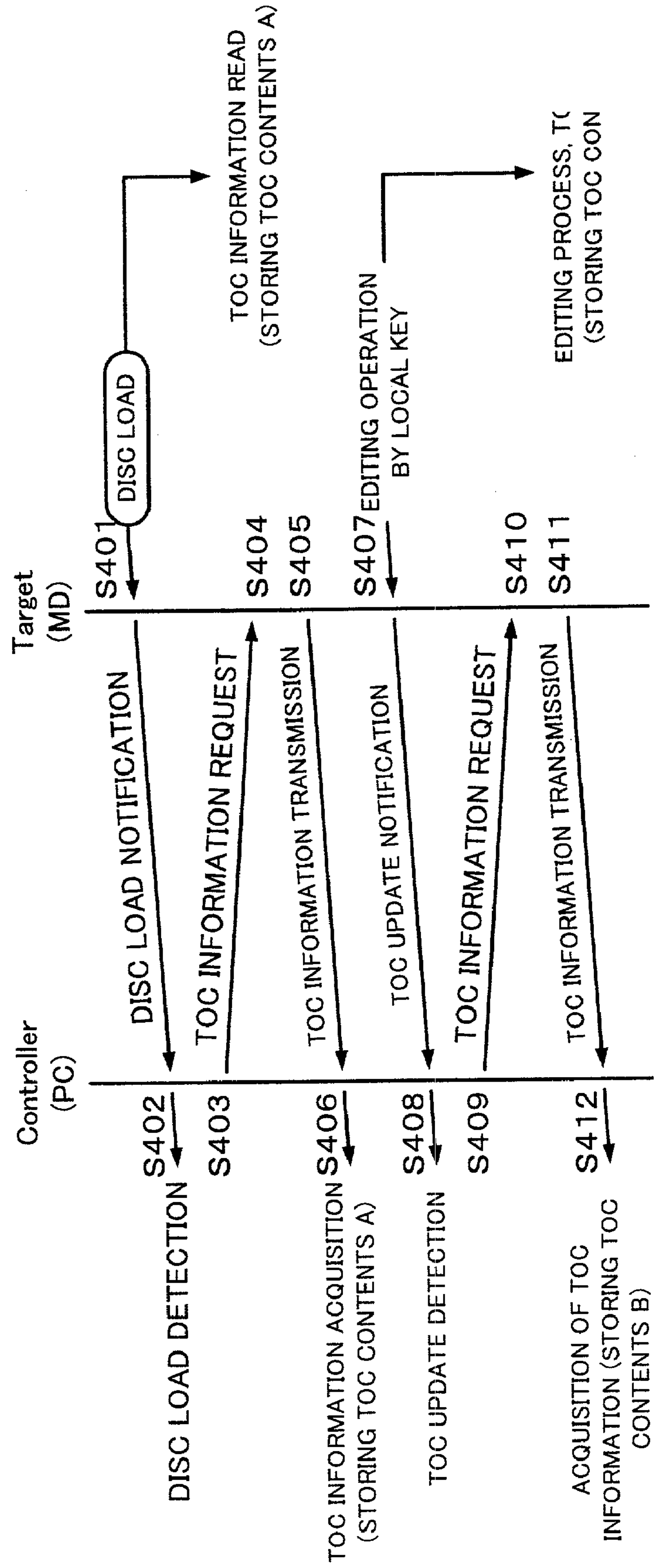
FIG. 56 is a process transition diagram showing an example of the process step structure for preventing differences in process states between the personal computer (controller) and the MD recorder/player (target) from taking place.

Thus, to prevent the TOC information on the controller side from being different from that on the target side, a structure of which a communication is performed between the controller and the target as shown in FIG. 56 may be used.

Referring to a process transition diagram shown in FIG. 56, when a disc is loaded to the MD recorder/player 1 as a target, the MD recorder/player 1 transmits a disc load notification to the controller (personal computer 113) at step S401 as with the case shown in FIG. 55. The controller receives the disc load notification at step S402 Thus, the controller knows that a disc has been loaded to the target. At this point, the MD recorder/player 1 side performs a process for reading TOC information from the disc and storing the TOC information to the buffer memory 13. In this example, for convenience, it is assumed that the TOC information stored in the buffer memory 13 has TOC contents A.

After the controller knows that a disc has been loaded to the target at step S402, the controller transmits a TOC information request for requesting the TOC information to the target at step S403.

The target receives the TOC information request at step S404. Thereafter, the target transmits the TOC information stored in the buffer memory 13 to the controller at step S405. The controller receives and stores the TOC information to the RAM 203 at step S406. Thus, the controller obtains the TOC information. At this point, the TOC information obtained by the controller has the TOC contents A.

In a later stage, it is assumed that an operation control for performing an editing process for changing the TOC contents is executed corresponding to an operation of a local key of the MD recorder/player 1 as a target.

In this case, the MD recorder/player 1 rewrites a required portion of the contents of the TOC information as an editing process corresponding to the operation of the local key. Thus, the TOC information stored in the buffer memory 13 changes from the TOC contents A to TOC contents B.

When the TOC contents are updated (edited) corresponding to the operation of the local key as described above, the MD recorder/player 1 as a target generates a TOC update notification at step S407 and transmits it to the controller. The controller receives the TOC update notification at step S408. Thus, the controller side can know that the TOC information has been updated on the target side.

After the controller side knows that the TOC information has been updated on the target side as described above, the controller side transmits the TOC information request to the target once again at step S409.

The target receives the TOC information request at step S410 and transmits the TOC information currently stored in the buffer memory 13 to the controller. At this point, the TOC information to be transmitted may be all the TOC information or may be part of the information including an updated TOC sector.

The controller receives the TOC information at step S412. Thus, the controller newly obtains the TOC information. However, the TOC information held by the controller is the TOC contents B. In other words, the TOC contents held in controller match those held in the target.

When a situation of which a process state or the like on the target side is different from that on the controller side takes place due to a local key operation on the target side, the target side first notifies the controller of this situation. Then, the controller side obtains a processed result that takes place on the target side corresponding to the notification. Consequently, a process state on the control side matches that on the target side.

However, when the process shown in FIG. 56 is performed, the number of process steps increase. In addition, in a situation that while a particular editing process is being performed on for example the operation panel of the controller, the same editing process is performed using a local key, a situation of which TOC information on the controller side does not match that on the target side frequently takes place. Thus, when they are matched corresponding to the process shown in FIG. 56, the process itself becomes very heavy. To prevent such a problem, it is necessary to add a process step for prohibiting an inputting operation for an editing process on both the controller side and the target side during updating of the TOC information. Thus, the controlling process becomes complicated. In other words, the structure of the programs of data interfaces of both the controller and the target becomes complicated and thereby it is difficult to design such programs.

In addition, when it is considered that an editing process for the MD recorder/player 1 as a target is performed by a plurality of controllers, the process descried with reference to FIG. 56 becomes further complicated.

For example, the MD recorder/player 1 is an audio apparatus. Thus, a situation of which an editing operation is remotely performed while audio data is being reproduced may take place not exceptionally. When the situation of which a process state on the controller side does not match that on the target side is solved by a complicated process as shown in FIG. 56, while audio data is being transmitted and received corresponding to an isochronous communication, the process shown in FIG. 56 is performed corresponding to an asynchronous communication. Thus, the processes performed on both the controller and the target become heavy. Particularly, in a communication situation of which most the bus band is occupied with isochronous packets and thereby it is difficult to assure asynchronous packets, it may be difficult to execute such a complicated and heavy process at an appropriate timing.

Therefore, to prevent such a trouble of which process states do not match in remotely controlling an AV apparatus such as the MD recorder/player 1, it is preferable and practical to employ a communication process as simple as possible.

2-15. Remote Control According to Embodiment

Therefore, according to the embodiment, a situation of which process states do not match in remotely controlling an apparatus can be solved using a simple process state that follows.

Figure 57:
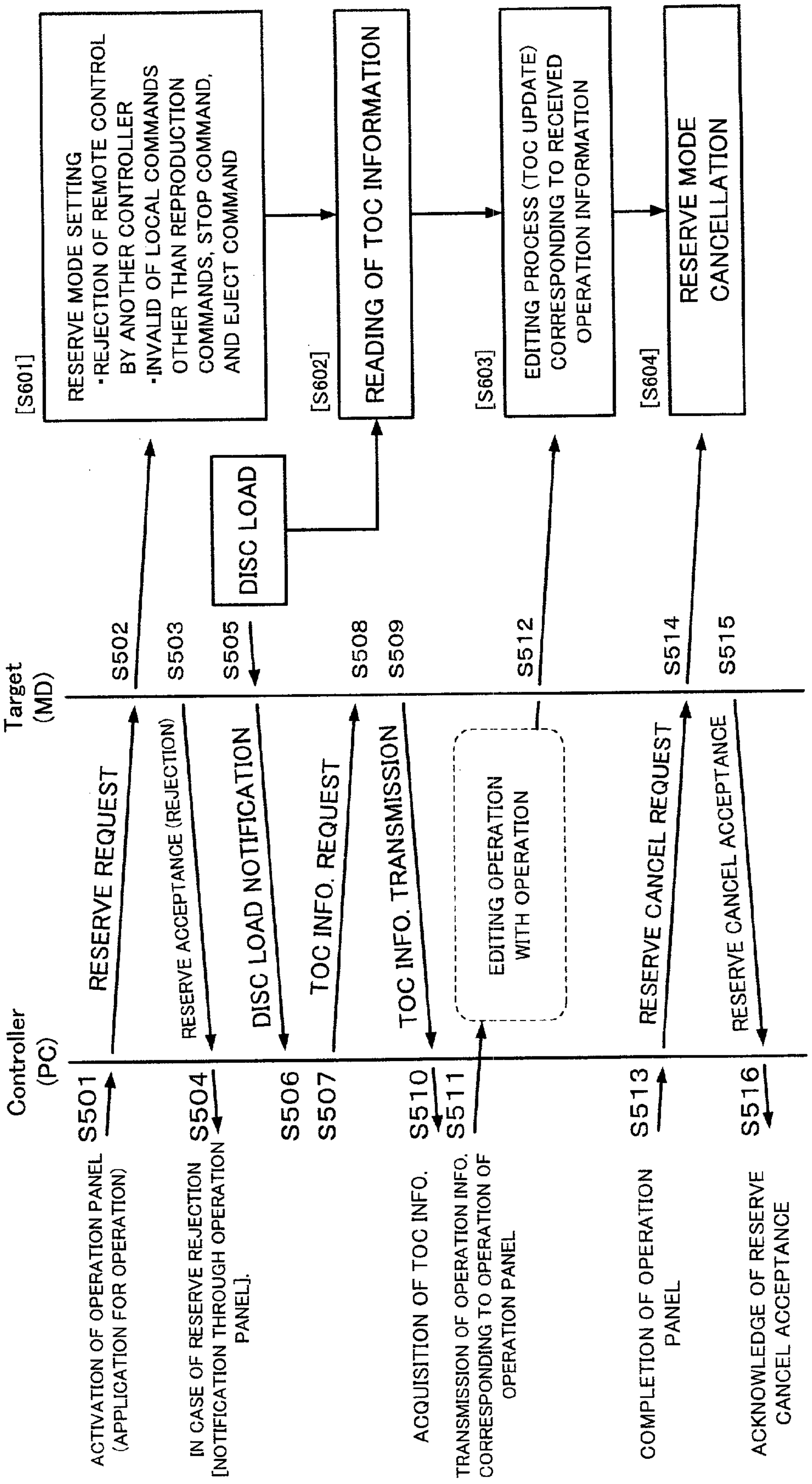
FIG. 57 is a process transition diagram showing an example of a process for accomplishing an exclusive control process in the state that a remote controlling operation is performed according to the embodiment.

A process transition diagram of FIG. 57 shows a communication process for a remote control according to the embodiment. As with the examples shown in FIGS. 55 and 56, in the process shown in FIG. 57, it is assumed that the personal computer 113 is defined as a controller and the MD recorder/player 1 is defined as target and that the personal computer 113 performs remote control operations for an editing process and an recording/reproducing process for the MD recorder/player 1.

Also, commands transmitted and received between the controller and the target shown in FIG. 57 are AV/C commands. Each command is defined as for example an opcode of which the MD recorder/player 1 is a subunit as described with reference to FIG. 49.

In the process shown in FIG. 57, the personal computer 113 defined as a controller activates the "operation panel" that is an application program at step S501. The operation panel has a function that allows the user to operate and control the MD recorder/player 1 (a remote control through the IEEE 1394 bus) with for example the keyboard 205 or the mouse 206 of the personal computer 113 as with the local key of the MD recorder/player 1. The application program as the operation panel is stored on the hard disk of the hard disk drive 207 of the personal computer 113. When the operation panel is executed, it is read from the hard disk by the hard disk drive 207 and stored in the RAM 203 in such a manner that the operation panel operates.

When the operation panel is activated at step S501, a command for a reserve request is transmitted from the controller to the target as shown in FIG. 57.

The reserve request command is transmitted as a write request packet using an AV/C command that was described with reference to FIG. 46.

For example, ctype of the reserve request command of the AV/C command is CONTROL [0000] (refer to FIG. 48). The reserve request command is defined as one of opcodes of which the MD recorder/player 1 (disc recorder/player [00011]) is subunit_type. Thus, the reserve request command is basically a command that requests the target for a reservation of a remote control by the controller.

The MD recorder/player 1 defined as a target receives the reserve request at step S502. Thereafter, the MD recorder/player 1 transmits as a response one of a reserve acceptance (accepted) or a reserve rejection (rejected) at step S503.

The reserve acceptance is transmitted when no remote control is currently reserved by any controller and the reservation by the controller (buffer memory 13) that has transmitted the reserve request can be permitted.

On the other hand, the reserve rejection is transmitted when a remote control has been already reserved by a particular controller other than the personal computer 113 and the reservation by any controller (including the personal computer 113) other than the particular controller is prohibited.

In a situation that a reservation can be permitted, the MD recorder/player 1 designates a reserve mode at step S601.

The reserve mode can be designated in the following two types. In the first type, a remote control by other than the controller (personal computer 113) that has transmitted the reserve request should be rejected (prohibited). In the second type, all local commands other than reproduction commands (including a reproduction command, a fast forward command, a rewind command, and a track head search command in the forward/rewinding directions), a stop command, and an eject command (for unloading a disc) are invalidated.

When the reserve mode has been designated in such a manner, until the reserve mode is canceled as will be described later, even if a command for a remote control is transmitted from other than the personal computer 113 to the MD recorder/player, the command is rejected. In other words, the remote control by any other controller is prohibited, but the remote control by the personal computer 113 is validated.

When other than reproduction commands, stop command, and eject command are invalidated, local commands for rewriting TOC information and local commands for various editing processes are invalidated. Thus, even if the user performs a local key operation for a recording process or an editing process, this operation is canceled. Consequently, with a local key operation, a process for updating the TOC information is not performed on the MD recorder/player 1.

In other words, when the reserve mode is designated, an operation control that causes a process state on the controller side not to match that on the target side is permitted only for a controller that has performed a reserve request, but cannot be performed by the other controllers or the local key operations.

At step S504, the controller receives as a response a reserve acceptance or a reserve rejection transmitted at step S503.

When the controller receives the reserve acceptance at step S504, it knows that the target has accepted the reserve request and executes a process corresponding to the operation panel.

On the other hand, when the controller receives the reserve rejection, the controller notifies the user that the MD recorder/player 1 is currently reserved by another controller with the operation panel. Such a notification to the user may possibly be performed for example by a predetermined display form on an operation screen as the operation panel. Alternatively, it is also possible to perform the notification by outputting voice corresponding to a predetermined form. Of course, both of display and voice can be used.

Next, a process of which a reserve acceptance is performed by the MD recorder/player 1 will be described.

After the controller receives the reserve acceptance at step S504 for example if a disc is loaded to the MD recorder/player 1 defined as a target, a disc load notification is transmitted from the target at step S505. In addition, the MD recorder/player 1 defined as a target further executes a process of storing TOC information that is read from the loaded disc to the buffer memory 13 at step S602.

Then, after the controller receives the disc load notification at step S506, the controller transmits a TOC information request at step S507. The target receives the TOC information request at step S508 and transmits the TOC information stored in the buffer memory 13 at step S509. Then, the controller receives the TOC information at step S510. Consequently, the controller side obtains the TOC information and stores it to for example the RAM 203.

Thereafter, at steps S511 and S512, the controller side transmits various commands corresponding to editing operations performed for the operation panel by the user to the target. The editing operations represent various operations for editing which are allowed by the system including inputting of characters of a track name, a disc name, and so forth, track movement, track division, track connection, and track erasure. In addition, a predetermined editing process for an AUX data file can be performed.

The target receives the various commands transmitted thereto and handles them as operation information and executes for example an editing process (that is, an updating process of the TOC information) corresponding to the operation information at step S603. When the TOC information is updated at step S603, the updated TOC information is successively transmitted to the target so that the TOC contents stored in the MD recorder/player 1 matches that stored in and the personal computer 113 at steps S511 and S512.

According to the embodiment, while the process at steps S511 and S512 is being performed, even if for example a command for a remote control is transmitted from another controller to the target or a local command for an editing process or a recording operation is obtained, since such a command or local command is canceled, such a process as described above with reference to FIG. 55 is not performed.

In addition, according to the embodiment, such local commands as reproduction commands, a stop command, and an eject command are valid, this is intended to allow the user to perform operations that do not involve an update of TOC information (in other words, a mismatch of TOC information does not take place) with the operation portion 23 and the remote controller 32 so as to improve the operability of the apparatus.

Next, it is assumed that for example the user completes an editing operation with the operation panel and performs an operation for completing the operation panel that has been activated. Thus, the personal computer 113 completes the application program for the operation panel and transmits a reserve cancel request to the target at step S513.

The target receives the reserve cancel request at step S514. At step S604, the target executes a process for canceling the reserve mode, which has been set at step S601. Thus, the target can accept a remote control from another controller and validate all local key commands.

Then, the target cancels the reserve mode as described above and transmits a reserve cancel acceptance at step S515. The controller receives the reserve cancel acceptance at step S516 and thereby acknowledges that the reserve cancellation has been accepted.

When the IRD 112 that is defined as a controller performs the similar remote control for the MD recorder/player 1, the similar process to that shown in FIG. 57 may be performed.

According to such a process, while a reserve mode is set, since an editing process is performed by only a remote control of a controller that has transmitted a reserve request, a mismatch can be prevented from taking place in such a manner as shown in FIG. 55. In addition, since a mismatch is prevented by invalidating a remote control by another controller and any local key operation that may cause a mismatch to take place, such a complicated process as shown in FIG. 56 is not required, but a very simple communication process design.

In such a process structure, when the operation panel is not completed, the reserve mode that has been set corresponding to the personal computer continues in the MD recorder/player 1.

For example, in an actual use state, even after the user performs an operation for the operation panel to complete the object editing operation, the operation panel may still in an active state. Thereafter, even if the user forgets that the operation panel remains in an active state and tries to perform a remote control of the MD recorder/player 1 with another controller or tries to perform a recording operation or an editing control using a local key, such operations are invalidated. Even if such a situation takes place, the user may possibly consider that some trouble has taken place. Accordingly, in such a situation, it is preferable to allow the MD recorder/player 1 (target) to automatically cancel the reserve mode by some method.

Therefore, according to the embodiment, if a reserve mode remains when a bus reset described with reference to FIG. 39 takes place, the reserve mode is canceled.

To do that, as an IEEE 1394 interface function of the system controller 11, when a bus reset is detected, it is detected whether or not a reserve mode is currently set. When the reserve mode is set, a controlling process for canceling the reserve mode is performed.

2-16. Remote Control According to Embodiment (in Download State)

In the case of the AV system 103 shown in FIG. 1, it is possible for example to cause audio data (ATRAC data) and/or AUX data received by the IRD 112 or audio data and/or AUX data recorded on the hard disk of the personal computer 113 to be recorded by the MD recorder/player 1 through the IEEE 1394 bus. In other words, audio data (ATRAC data) and/or AUX data can be downloaded.

Next, the case that for example data transmitted from the IRD 112 or the personal computer 113 is received and downloaded by the MD recorder/player 1 is considered. Also, in this case, if a remote control of the MD recorder/player 1 by other than the controller that is a source of the download data is also permitted, an inconvenient situation of which a recording operation is stopped inadvertently by a remote control from another controller or the contents of the TOC are rewritten by an editing process is likely to take place. A similar problem will also take place when local commands are set valid upon downloading.

Thus, according to the embodiment, an exclusive control for a remote control described above with reference to FIG. 57 is applied to a downloading operation by the MD recorder/player 1 as will be described in the following.

Figure 58:
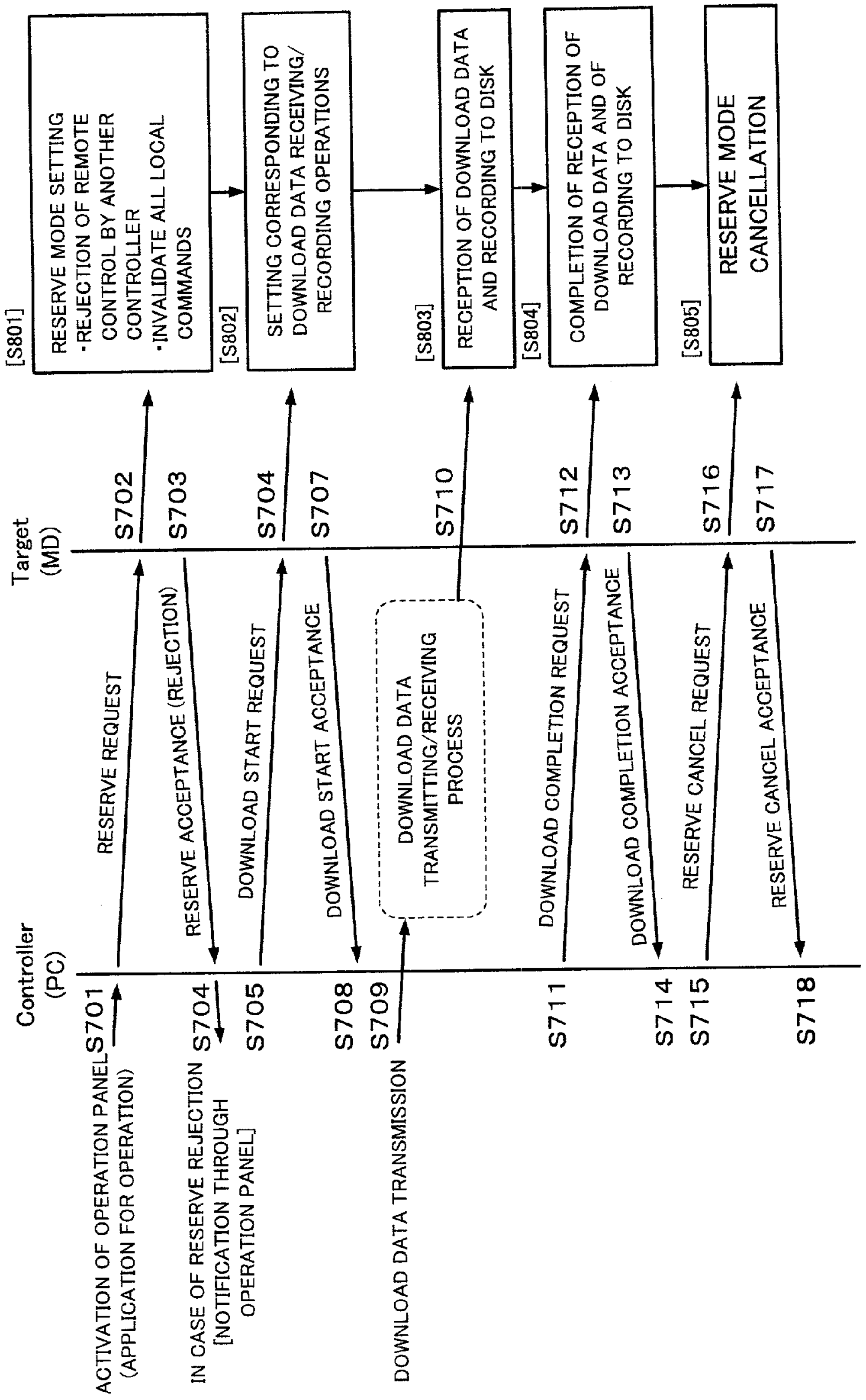
FIG. 58 is a process transition diagram showing an example of a process for accomplishing an exclusive control process in the state that data is downloaded according to the embodiment.

FIG. 58 shows an example of a process of a downloading operation. In the process shown in FIG. 58, the personal computer 113 is defined as a controller. In the downloading process, the MD recorder/player 1 downloads data stored in the personal computer 113. However, when data received by the IRD 112 is downloaded to the MD recorder/player 1, the IRD 112 is defined as a controller that executes the process similar to that shown in FIG. 58.

In the process shown in FIG. 58, since steps S701 to S704 are similar to steps S501 to S507 shown in FIG. 57, their description is omitted.

However, a reserve mode setting process corresponding to the reception or acceptance of a reserve request at step S801 is different from that at step S601 shown in FIG. 57. In other words, as a reserve mode, although a remote control by another controller other than the personal computer 113 is rejected as with the case of FIG. 57, all local commands are invalidated and canceled. The reason why all local commands are invalidated is in that it is intended to prevent such an inconvenient situation of which for example the recording operation of download data is stopped or interrupted due to an operation such as for example a stopping operation or a pause operation is performed with a local key while the download data is being recorded.

After the reserve request and the reserve acceptance have been transmitted and received, only a remote control by the personal computer 113 is permitted for the MD recorder/player 1 defined as a target.

After the reserve acceptance has been received, the controller transmits a download start request at step S705. The MD recorder/player 1 defined as a target receives the transmission/reception download start request corresponding to the reserve acceptance at step S706 and executes a process corresponding to the download data receiving/recording operation at step S802. In other words, the MD recorder/player 1 controls a predetermined functional circuit portion so that download data is properly received and recorded to the disc. In addition, the target transmits a download start acceptance to the controller at step S707.

The controller receives the download start acceptance at step S708 and thereby acknowledges that the target can receive download data.

After the process at step S708 is completed, transmitting and receiving processes of download data through the IEEE 1394 bus are executed at steps S709 and S710. At this point, the controller writes data that is read from for example the hard disk to the segment buffer of the target side so as to transmit/receive the data. In addition, the target side executes a controlling process for recording the data written in the segment buffer of the target (that is, the received download data) to the disc at step S803.

While download data is being recorded, since the reserve mode has been set at step S801, even if a command for a remote control is transmitted from another controller or an operation is performed with a local key, the MD recorder/player 1 does not respond to such a command and continues recording of download data.

After data to be downloaded has been transmitted, the controller transmits a download completion request at step S711. The target receives the download completion request at step S712 and transmits a download completion acceptance to the controller at step S713. At this point, the MD recorder/player 1 defined as a target executes a controlling process for completing the receiving operation of download data and the recording operation for the disc at step S804. At this point, the contents of the TOC information is updated corresponding to the recorded result.

Then, the controller receives the download completion acceptance at step S714 and transmits a reserve cancel request at step S715.

The target receives the reserve cancel request at step S716. Next, at step S805, the target executes a process for canceling the reserve mode, which has been set at step S601. Then, the target transmits a reserve cancel acceptance at step S717. The controller receives the reserve cancel acceptance at step S718 and thereby acknowledges that the target has accepted the reserve cancellation.

As the case that both the exclusive controlling process in the downloading operation shown in FIG. 58 and the exclusive controlling process in a remote controlling operation for an editing operation shown in FIG. 57 can be executed, as long as for example an AV/C command for the reserve request includes identification information that represents that the reserve request corresponds to editing operation (operation panel) or downloading operation, there is no problem. However, if the AV/C command does not contain such identification information, at step S601 or step S801, the reserve mode cannot be properly set.

Therefore, in such a situation, at step S601 or S801, the reserve mode is set corresponding to the editing operation (operation panel) (namely, local commands such as reproduction commands, stop command, and an eject command are validated). Thereafter, when a download request is received, all the local commands are invalidated.

Figure 59:
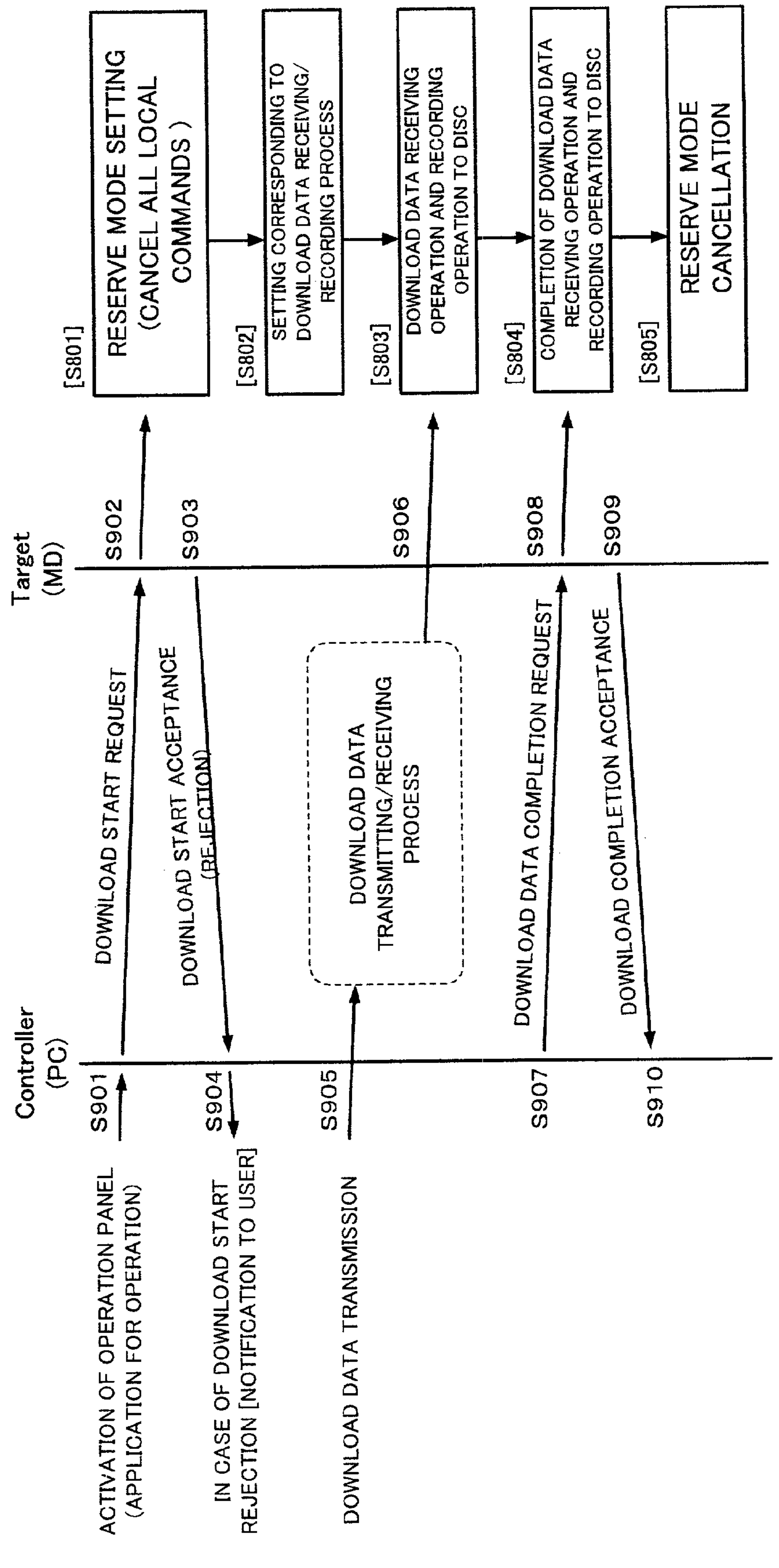
FIG. 59 is a process transition diagram showing another example of the process for accomplishing the exclusive control process in the state that data is downloaded according to the embodiment.

FIG. 59 is a process transition diagram showing another example of an exclusive controlling process for a downloading operation. In FIG. 59, since steps S801 to S805 executed by the MD recorder/player 1 are similar to those shown in FIG. 57, similar step numerals are assigned and their description is omitted.

In the process shown in FIG. 59, a reserve request and a reserve acceptance shown in FIG. 58 are not transmitted and received.

Corresponding to a download start request transmitted or received at steps S901 and S902, the MD recorder/player 1 defined as a target sets the reserve mode at step S801 and then performs a process for receiving/recording download data at step S802. In addition, the MD recorder/player 1 also transmits a download start acceptance to the controller at step S903.

At this time, however, when the MD recorder/player 1 has been reserved by another controller, the MD recorder/player 1 transmits a download start rejection command at step S903 but does not set the reserve mode at step S801.

In addition, when the controller side receives a download start acceptance at step S904, the controller can acknowledge that the target has accepted the download start request. On the other hand, when the controller side receives a download start rejection, a download data transmitting/receiving process is not performed. However, as shown in FIG. 59, the user is notified by a display, a voice, or the like that the target has rejected the download start request.

Thereafter, a download data transmitting/receiving process at steps S905 and S906 is executed. Since steps S905 and S906 shown in FIG. 59 are similar to steps S709 to S710 shown in FIG. 58, their description is omitted. In addition, in parallel with the download data transmitting/receiving process at steps S905 and S906, the MD recorder/player 1 performs the controlling process for receiving download data and recording it to the disk at step S802 as with the process shown in FIG. 58.

After data to be downloaded has been transmitted, the controller transmits a download completion request at step S907. Then, the target receives the download completion request at step S908 and transmits a download completion acceptance to the controller at step S909.

In this case, corresponding to the reception of the download completion request at step S908, the MD recorder/player 1 defined as a target executes a controlling process for completing the receiving operation of the download data and the recording operation of it to the disc at step S804 and then cancels the reserve mode step S805.

The controller receives the download completion acceptance at step S910 and acknowledges that the MD recorder/player 1 has properly completed the downloading operation. Then, the controller completes the sequence of processes for downloading data. Thus, in this case, a transmitting/receiving process for a reserve cancel request and a reserve cancel acceptance at steps S715 to S718 shown in FIG. 58 is not performed As is clear from the above-described processes, in the process shown in FIG. 59, the transmitting/receiving process for the download start request and start acceptance includes the transmitting/receiving process for the reserve request and reserve acceptance shown in FIG. 58. The target sets the reserve mode corresponding to the reception of the download start request.

Likewise, the transmitting/receiving process for the download completion request and completion acceptance shown in FIG. 59 includes the transmitting/receiving process for the reserve cancel request and reserve cancel acceptance shown in FIG. 58. The target cancels the reserve mode corresponding to the reception of the reserve cancel request.

Consequently, in FIG. 59, the transmitting/receiving process for the reserve request/reserve acceptance and the transmitting/receiving process for the download completion request and completion acceptance are omitted. Thus, the exclusive controlling process can be further simplified.

The cancellation of the reserve mode due to an occurrence of a bus reset can be applied to the exclusive controlling process in the downloading operation. For example, even if the reserve mode is not canceled due to a particular trouble after data has been downloaded, if a bus reset takes place, the reserve mode can be automatically canceled. Thus, the convenience of the system is improved.

According to the above-described embodiment, the exclusive controlling process of which for example a personal computer or an IRD performs a remote control for an MD recorder/player or transmits download data was described. However, since one of the objects of the present invention is to prevent a mismatch from taking place a controller and a target, as an apparatus that composes the system according to the present invention, various apparatuses can be considered other than the above-described personal computer, IRD, and MD recorder/player.

In addition, the present invention can be applied to a digital interface other than the IEEE 1394 standard.

As described above, according to the present invention, when a remote control of an apparatus (target) such as a disc recording and reproducing apparatus is performed by another apparatus (controller) through a bus of for example a digital interface, the controller transmits a reserve request command for requesting the target for the reservation of the remote control to the target. Corresponding to the reserve request command, the target sets a reserve mode. In the reserve mode, a remote control by another controller is prohibited and a local key operation that may cause a mismatch to take place between the target and the controller is disabled. In addition, the reserve mode is canceled on the target side corresponding to a reserve cancel request command transmitted from the controller side.

With such a structure, even if for example a remote control by another controller, a local key operation, or the like is performed inadvertently, no mismatch of process states takes place between the controller and the target in the state that the controller performs a remote control (for example, an editing operation) for the target. Thus, the convenience of the data interface system is improved.

In addition, according to the present invention, to prevent a mismatch of process states between a controller and a target, other than a remote control by a controller that has transmitted a reserve request command as described above is rejected. It is not necessary to perform a communicating process between the controller and the target for matching the process states thereof, but a simple process.

Consequently, both the controller and the target can be simply structured.

In addition, according to the present invention, when a reserve mode is set, local keys of the disc recording and reproducing apparatus (target) are enabled for record/reproduction stop operations, record medium ejecting operation, and reproduction operations. Consequently, since the user can operate for example local keys that do not cause a mismatch to take place between the controller and the target, the operability of the system is improved.

In addition, when an operation panel (operation information transmitting means) with which the controller operates the recording and reproducing apparatus defined as a target is activated, a reserve request command is transmitted from the controller. In contrast, when the operation panel is deactivated, a reserve cancel request command is transmitted from the controller. Thus, when the operation panel is activated or deactivated on the controller side, the reserve mode can be set or canceled for the target.

In addition, when a bus reset takes place in the information processing system, the reserve mode is canceled for the target. Thus, even in a situation of which although a particular controller does not need to reserve a target, the reserve mode of the target is not canceled, when a bus reset takes place, the target can automatically cancel the reserve mode.

Furthermore, when a remote control of a recording and reproducing apparatus defined as a target is reserved by a particular controller or when a process (such as an editing process using a local key) that may cause a mismatch to take place between the target and the controller, even if a reserve request command or a command corresponding to a reserve request is transmitted, a rejection response against such a command is sent back. Consequently, while the reserve mode that is kept, the controller that has transmitted the reserve request command is notified of a reserve rejection.

Then, when the rejection response is sent back, the controller informs the user of it with a display, a voice, or the like. Consequently, the user can know that the target has been reserved by another controller. Thus, the user can take countermeasures for canceling the reserve state of the target or causing another controller to perform a remote control.

Thus, the operability is further improved.

In this manner, according to the present invention, while an exclusive controlling process is performed with a simple structure, the convenience and operability of the system are improved.

In addition, according to the present invention, a reserve mode for a target is set corresponding to the above-described reserve request command. In other words, an exclusive control against a remote control by another controller and a local key operation is applied to a downloading operation.

In other words, when download data is supplied from an apparatus as a controller to a target as a data recording apparatus, the data recording apparatus sets a reserve mode corresponding to a request received from the controller.

Consequently, a trouble of which a downloading operation is interrupted inadvertently by a remote control of another controller or a local key operation can be prevented. In addition, effects corresponding to the above-described structures are similarly accomplished.

In addition, in the case that an exclusive control is performed in a downloading operation, when the target sets a reserve mode corresponding to a download start request received from the controller, a transmitting/receiving process for a reserve request command can be omitted. Likewise, when the target cancels the reserve mode corresponding to a download completion request received from the controller, a transmitting/receiving process for a reserve cancel request command can be omitted. In other words, according to the present invention, the exclusive controlling process can be accomplished as a further simple process.

In addition, by using an IEEE 1394 bus as a data bus, a communication can be performed at a comparatively high rate. In addition, it is possible to easily structure a system including an AV apparatus such as a disc recording and reproducing apparatus.

The invention claimed is:

1. An information processing system, having a plurality of information processing apparatuses connected via a data bus corresponding to a predetermined communication format, for performing remote control of data and various commands transmitted and received between the information processing apparatuses, comprising:

a first information processing apparatus; and a second information processing apparatus comprising:

data recording and reproducing means for reproducing data from a predetermined record medium, recording data thereto, or editing data recorded thereon, wherein said first information processing apparatus comprises:

operation information transmitting means for transmitting an operation control command to said second information processing apparatus, the operation control command causing a remote control of a predetermined operation of the data recording and reproducing means of said second information processing apparatus to be performed; and reserve request command transmitting means for generating a reserve request command for requesting said first information processing apparatus for a reservation of a remote control against said second information processing apparatus and transmitting the reserve request command to said second information processing apparatus: and wherein said second information processing apparatus comprises:

receiving means for receiving data transmitted via the data bus;

response processing means for executing a predetermined process corresponding to one of various commands received by the receiving means so as to enable another information processing apparatus to perform a remote control of said second information processing apparatus;

local operation controlling means for locally performing an operation control for a predetermined operation against the data recording and reproducing means;

first reserve mode setting means for setting, as a reserve mode to be set corresponding to the reserve request command received by the receiving means, the response processing means so as to permit a remote control by said first information processing apparatus and prohibit a remote control by other information processing apparatuses; and second reserve mode setting means for setting, as a reserve mode to be set corresponding to the reserve request command received by said receiving means, the local information controlling means so as to enable a predetermined operation of those performed by the local operation controlling means and disable non-enabled operations, wherein said first information processing apparatus further comprises:

reserve cancellation request command transmitting means for generating a reserve cancellation request command for requesting said second information processing apparatus for a cancellation of the reservation of the remote control and transmitting the reserve cancellation request command thereto, wherein the first reserve mode setting means of said second information processing apparatus causes the response processing means to permit all the other information processing apparatuses connected to the data bus to perform a remote control of said second information processing apparatus corresponding to the reserve cancellation request command received by the receiving means so as to cancel the reserve mode, and wherein the second reserve mode setting means of said second information processing apparatus enables all the operations of the local operation controlling means corresponding to the reserve cancellation request command received by the receiving means so as to cancel the reserve mode.

2. The information processing system as set forth in claim 1, wherein the data bus corresponding to the predetermined communication format is an IEEE 1394 bus.

3. The information processing system as set forth in claim 1, wherein the second reserve mode setting means of said second information processing apparatus sets the reserve mode to the local operation controlling means so as to enable at least one of a record or reproduction stop operation, an eject operation for the record medium, and reproduction operations.

4. The information processing system as set forth in claim 1, wherein the reserve request command transmitting means of said first information processing apparatus transmits the reserve request command when the operation information transmitting means is activated and operated.

5. The information processing system as set forth in claim 1, wherein the reserve cancellation request command transmitting means transmits the reserve cancellation request command when the operation information transmitting means is deactivated.

6. The information processing system as set forth in claim 1, wherein said second information processing apparatus comprises:

bus reset detecting means for detecting an occurrence of a bus reset on the data bus, and wherein when the bus reset detecting means has detected an occurrence of a bus reset, the first reserve mode setting means causes the response processing means to permit all the other information processing apparatuses connected to the data bus to perform a remote control of said second information processing apparatus so as to cancel the reserve mode and the second reserve mode setting means enables all the operations of the local operation controlling means so as to cancel the reserve mode.

7. The information processing system as set forth in claim 1, wherein said second information processing apparatus further comprise:

rejection response transmitting means for transmitting a rejection response to said first information processing apparatus, the rejection response representing the rejection of the reservation of the remote control, when the operation state of said second information processing apparatus prohibits the reservation of the remote control by said first information processing apparatus as a response to the reserve request command received by the receiving means.

8. The information processing system as set forth in claim 7, wherein the reservation of the remote control by said first information processing apparatus is prohibited when the remote control of said second information processing apparatus is reserved by other than said first information processing apparatus.

9. The information processing system as set forth in claim 7, wherein the reservation of the remote control by said first information processing apparatus is prohibited when an operation control for the editing processing is being performed by the local operation controlling means of said second information processing apparatus.

10. The information processing system as set forth in claim 1, wherein said first information processing apparatus further comprises:

receiving means for receiving a rejection response transmitted from said second processing apparatus, the rejection response representing a rejection of the reserve request for the remote control by said first information processing apparatus; and presentation means for presenting that the remote control of said second information processing apparatus is prohibited, when the rejection response is received by the receiving means.

11. An information processing apparatus of an information processing system, having a plurality of information processing apparatuses connected via a data bus corresponding to a predetermined communication format, for performing remote control of data and various commands transmitted and received between the information processing apparatuses, comprising:

data recording and reproducing means for performing a predetermined process for reproducing data from a predetermined record medium, recording data thereto, or editing data recorded thereon;

local operation controlling means for locally performing an operation control for a predetermined operation against said data recording and reproducing means;

receiving means for receiving data transmitted via the data bus;

response processing means for executing a predetermined process corresponding to one of various commands received by said receiving means so as to enable an external information processing apparatus to perform a remote control of the local information processing apparatus;

local operation controlling means for locally performing an operation control for a predetermined operation against said data recording and reproducing means;

first reserve mode setting means for setting, as a reserve mode to be set corresponding to a reserve request command received by said receiving means, the reserve request command causing a remote control against the local information processing apparatus to be reserved, said response processing means so as to permit a remote control by an external information processing apparatus that has transmitted the reserve request command and prohibit a remote control by other external information processing apparatuses; and second reserve mode setting means for setting, as a reserve mode to be set corresponding to the reserve request command received by said receiving means, said local operation controlling means so as to enable a predetermined operation of those performed by said local operation controlling means and disable non-enabled operations, wherein when a reserve cancellation request command transmitted from an external information processing apparatus is received from said receiving means, the reserve cancellation request command causing the reservation of a remote control of the external information processing apparatus against the local information processing apparatus to be canceled, said first reserve mode setting means causes said response processing means to permit all the other information processing apparatuses connected to the data bus to perform a remote control of the local information processing apparatus corresponding to the reserve cancellation request command received by said receiving means so as to cancel the reserve mode, and said second reserve mode setting means enables all the operations of said local operation controlling means corresponding to the reserve cancellation request command received by said receiving means so as to cancel the reserve mode.

12. The information processing apparatus as set forth in claim 11, wherein the data bus corresponding to the predetermined communication format is an IEEE 1394 bus.

13. The information processing apparatus as set forth in claim 11, wherein said second reserve mode setting means sets the reserve mode to said local operation controlling means so as to enable at least one of a record or reproduction stop operation, an eject operation for the record medium, and reproduction operations.

14. The information processing apparatus as set forth in claim 11, further comprising:

bus reset detecting means for detecting an occurrence of a bus reset on the data bus, wherein when said bus reset detecting means has detected an occurrence of a bus reset, said first reserve mode setting means causes said response processing means to permit all the other information processing apparatuses connected to the data bus to perform a remote control of the local information processing apparatus so as to cancel the reserve mode and said second reserve mode setting means enables all the operations of said local operation controlling means so as no cancel the reserve made.

15. The information processing apparatus as set forth in claim 11, further comprising:

rejection response transmitting means for transmitting a rejection response to an external information processing apparatus that has transmitted the reserve request command, the rejection response representing the rejection of the reservation of the remote control, when the operation state of the local information processing apparatus prohibits the reservation of the remote control by the external information processing apparatus that has transmitted the reserve request command as a response to the reserve request command received by said receiving means.

16. The information processing apparatus as set forth in claim 15, wherein the reservation of the remote control by the external information processing apparatus that has transmitted the reserve request command is prohibited when the remote control of the local information processing apparatus is reserved by other than the external information processing apparatus that has transmitted the reserve request command.

17. The information processing apparatus as set forth in claim 15 wherein the reservation of the remote control by the external information processing apparatus that has transmitted the reserve request command is prohibited when an operation control for the editing process is being performed by said local operation controlling means.

18. An information processing apparatus of an information processing system, having a plurality of information processing apparatuses connected via a data bus corresponding to a predetermined communication format, for performing remote control of data and various commands transmitted and received between the information processing apparatuses, comprising:

receiving means for receiving data transmitted through the data bus;

response processing means for executing a predetermined process corresponding to one of various commands received by said receiving means so as to enable an external information processing apparatus to perform a remote control of the local information processing apparatus;

data recording means for receiving download data transmitted from a transmitting apparatus as an external information processing apparatus by said receiving means and recording the download data o a predetermined record medium;

local operation controlling means for locally performing an operation control for a predetermined operation against said data reproducing means;

first reserve mode setting means for setting, as a reserve mode to be set corresponding to a reserve request command transmitted by the transmitting apparatus and received by said receiving means, the reserve request command causing a remote control against the local information processing apparatus to be reserved, said response processing means so as to permit a remote control by the transmitting apparatus and prohibit a remote control by other external information processing apparatuses; and second reserve mode setting means for setting, as a reserve mode to be set corresponding to the reserve request command transmitted by the transmitting apparatus and received by said receiving means, the reserve request command causing a remote control against the local information processing apparatus to be reserved, said local operation, controlling means so as to enable a predetermined operation of those performed by said local operation controlling means and disable non-enabled operations, wherein after the download data has been transmitted, the transmitting apparatus transmits a reserve cancellation request command for requesting the information processing apparatus for a cancellation of a remote control, wherein said first reserve mode setting means causes said receiving means to permit all the other external information processing apparatuses connected to the data bus to perform a remote control of the local information processing apparatus corresponding to the reserve cancellation request command received by said receiving means so as to cancel the reserve mode, and wherein said second reserve mode setting means enables all the operations of said local operation controlling means corresponding to the reserve cancellation request command received by said receiving means so as to cancel the reserve mode.

19. The information processing apparatus as set forth in claim 18, wherein the data bus corresponding to the predetermined communication format is an IEEE 1394 bus.

20. The information processing apparatus as set forth in claim 18, wherein the transmitting apparatus does not transmit the reserve request command, and wherein said first reserve mode setting means and said second reserve mode setting means set the reserve mode corresponding to a download start request command transmitted from the transmitting apparatus and received by said receiving means, the download start request command representing that the transmission of the download data has started.

21. The information processing apparatus a set forth in claim 18, wherein said first reserve mode setting means causes said receiving means to permit all the other information processing apparatuses connected to the data bus to perform a remote control of the local, information processing apparatus corresponding to a download completion request command received by said receiving means, the download completion request representing that the transmission of the download data transmitted from the transmitting apparatus has been completed so as to cancel the reserve mode, and wherein said second reserve mode setting means enables all the operations of said local operation controlling means corresponding to the download completion request command received by said receiving means, the download completion request command representing that the transmission of the download data transmitted from the transmitting apparatus has been completed, so as to cancel the reserve mode.

22. The information processing apparatus a set forth in claim 18, further comprising:

bus reset detecting means for detecting an occurrence of a bus reset on the data bus, wherein when said bus reset detecting means has detected an occurrence of a bus reset, said first reserve mode setting means causes said receiving means to permit all the other information processing apparatuses connected to the data bus to perform a remote control of the local information processing apparatus so as to cancel the reserve mode and said second reserve mode setting means enables all the operations of said local operation controlling means so as to cancel the reserve mode.

23. The information processing apparatus as set forth in claim 18, further comprising:

rejection response transmitting means for transmitting a rejection response to the transmitting apparatus, the rejection response representing the rejection of the reservation of the remote control by the transmitting apparatus, when the operation state of the local information processing apparatus prohibits the reservation of the remote control by the transmitting apparatus as a response to the reserve request command or an equivalent command thereof received by said receiving means.

24. The information processing apparatus as set forth in claim 23, wherein the reservation of the remote control by the transmitting apparatus is prohibited when the remote control of the local information processing apparatus is reserved by other than the transmitting apparatus.

25. The information processing apparatus as set forth in claim 23, wherein the reservation of the remote control by the transmitting apparatus is prohibited when an operation control for the editing process is being performed by said local operation controlling means.

26. An information processing method for an information processing system, having a plurality of information processing apparatuses connected via a data bus corresponding to a predetermined communication format, for performing remote control of data and various commands transmitted and received between the information processing apparatuses, the information processing system comprising:

a first information processing apparatus; and a second information processing apparatus comprising:

data recording and reproducing means for reproducing data from a predetermined record medium, recording data thereto, or editing data recorded thereon, for the first information processing apparatus, the information processing method comprising the steps of:

transmitting an operation control command to the second information processing apparatus, the operation control command causing a remote control of a predetermined operation of the data recording and reproducing means of the second information processing apparatus to be performed; and generating a reserve request command for requesting the first information processing apparatus for a reservation of a remote control against the second information processing apparatus and transmitting the reserve request command to the second information processing apparatus; and for the second information processing apparatus, the information processing method comprising the steps of:

receiving data transmitted via the data bus;

executing a predetermined process corresponding to one of various commands received at the receiving step so as to enable another information processing apparatus to perform a remote control of the second information processing apparatus;

locally performing an operation control for a predetermined operation against the data recording and reproducing means;

setting, as a reserve mode to be set corresponding to the reserve request command received at the receiving step, at the response processing step so as to permit a remote control by the first information processing apparatus and prohibit a remote control by other information processing apparatuses; and setting, as a reserve mode to be set corresponding to the reserve request command received at the receiving step, at the local operation controlling step so as to enable a predetermined operation of those performed at the local operation controlling step and disable non-enabled operations;

wherein for the first information processing apparatus, the information processing method further comprises the step of:

generating a reserve cancellation request command for requesting the second information processing apparatus for a cancellation of the reservation of the remote control and transmitting the reserve cancellation request command thereto, wherein the first reserve mode setting step of the second information processing apparatus is performed by causing the response processing step to permit all the other information processing apparatuses connected to the data bus to perform a remote control of the second information processing apparatus corresponding to the reserve cancellation request command received at the receiving step so as to cancel the reserve mode, and wherein the second reserve mode setting step of the second information processing apparatus is performed by enabling ail the operations at the local operation controlling step corresponding to the reserve cancellation request command received at the receiving step so as to cancel the reserve mode.

27. The information processing method as set forth in claim 26, wherein the data bus corresponding to the predetermined communication, format is an IEEE 1394 bus.

28. The information processing method as set forth in claim 26, wherein the second reserve mode setting step of the second information processing apparatus is performed by setting the reserve mode at the local operation controlling step so as to enable at least one of a record or reproduction stop operation, an eject operation for the record medium, and reproduction operations.

29. The information processing method as set forth in claim 26, wherein the reserve request command transmitting step of the first information processing apparatus is performed by transmitting the reserve request command when the operation information transmitting step is performed.

30. The information processing method as set forth in claim 26, wherein the reserve cancellation request command transmitting step is performed by transmitting the reserve cancellation request command when the operation information transmitting step is deactivated.

31. The information processing method as set forth in claim 26, wherein for the second information processing apparatus, the information processing method further comprises the step of:

detecting an occurrence of a bus reset on the data bus, and wherein when at the bus reset detecting step an occurrence of a bus reset has been detected, the first reserve mode setting step is performed by causing the response processing step to permit all the other information processing apparatuses connected to the data bus to perform a remote control of the second information processing apparatus so as to cancel the reserve mode and the second reserve mode setting step is performed by enabling all the operations at the local operation controlling step so as to cancel the reserve mode.

32. The information processing method as set forth in claim 26, wherein for the second information processing apparatus, the information processing method further comprises the step of:

transmitting a rejection response to the first information processing apparatus, the rejection response representing the rejection of the reservation of the remote control, when the operation state of the second information processing apparatus prohibits the reservation of the remote control by the first information processing apparatus as a response to the reserve request command received at the receiving step.

33. The information processing method as set forth in claim 32, wherein the reservation of the remote control by the first information processing apparatus is prohibited when the remote control of the second information processing apparatus is reserved by other than the first information processing apparatus.

34. The information processing method as set forth in claim 32, wherein the reservation of the remote control by the first information processing apparatus is prohibited when an operation control for the editing process is being performed at the local operation controlling step for the second information processing apparatus.

35. The information processing method as set forth in claim 26, wherein for the first information processing apparatus, the information processing method further comprises the step of:

receiving a rejection response transmitted from the second processing apparatus the rejection response representing a rejection of the reserve request for the remote control by the first information processing apparatus, and presenting that the remote control of the second information processing apparatus is prohibited, when the rejection response is received at the receiving step.

36. An information processing method for an information processing apparatus of an information processing system, having a plurality of information processing apparatuses connected via a data bus corresponding to a predetermined communication format, for performing remote control of data and various commands transmitted and received between the information processing apparatuses, the information processing method comprising the steps of:

performing a predetermined process for reproducing data from a predetermined record medium, recording data thereto, or editing data recorded thereon;

locally performing an operation control for a predetermined operation against the data recording and reproducing step;

receiving data transmitted via the data bus;

executing a predetermined process corresponding to one of various commands received at the receiving step so as to enable an external information processing apparatus to perform a remote control of the local information processing apparatus;

locally performing an operation control for a predetermined operation against the data recording and reproducing step;

setting, as a reserve mode to be set corresponding to a reserve request command received at the receiving step, the reserve request command causing a remote control against the local information processing apparatus to be reserved, the response processing step so as to permit a remote control by an external information processing apparatus that has transmitted the reserve request command and prohibit a remote control by other external information processing apparatuses; and setting, as a reserve mode to be set corresponding to the reserve request command received at the receiving step, the local operation controlling step so as to enable a predetermined operation of those performed at the local operation controlling step and disable non-enabled operations, wherein when a reserve cancellation request command transmitted from an external information processing apparatus is received at the receiving step, the reserve cancellation request command causing the reservation of a remote control of the external information processing apparatus against the local information processing apparatus to be canceled, the first reserve mode setting step is performed by causing the response processing step to permit all the other information processing apparatuses connected to the data bus to perform a remote control of the local information processing apparatus corresponding to the reserve cancellation request command received at the receiving step so as to cancel the reserve mode, and the second reserve mode setting step is performed by enabling all the operations at the local operation controlling step corresponding to the reserve cancellation request command received at the receiving step so as to cancel the reserve mode.

37. The information processing method as set forth in claim 36, wherein the data bus corresponding to the predetermined communication format is an IEEE 1394 bus.

38. The information processing method as set forth in claim 36, wherein the second reserve mode setting step is performed by setting the reserve mode to the local operation controlling step so as to enable at least one of a record or reproduction stop operation, an eject operation for the record medium, and reproduction operations.

39. The information processing method as set forth in claim 36, further comprising the step of:

detecting an occurrence of a bus reset on the data bus, wherein when at the bus reset detecting step, an occurrence of a bus reset has been detected, the first reserve mode setting step is performed by causing the response processing step to permit all the other information processing apparatuses connected to the data bus to perform a remote control of the local information processing apparatus so as to cancel the reserve mode and the second reserve mode setting step is performed by enabling all the operations at the local operation controlling step so as to cancel the reserve mode.

40. The information processing method as set forth in claim 36, further comprising the step of:

transmitting a rejection response to an external information processing apparatus that has transmitted the reserve request command, the rejection response representing the rejection of the reservation of the remote control, when the operation state of the local information processing apparatus prohibits the reservation of the remote control by the external information processing apparatus that has transmitted the reserve request command as a response to the reserve request command received at the receiving step.

41. The information processing method as set forth in claim 40, wherein the reservation of the remote control by the external information processing apparatus that has transmitted the reserve request command is prohibited when the remote control of the local information processing apparatus is reserved by other than the external information processing apparatus that has transmitted the reserve request command.

42. The information processing method as set forth in claim 40, wherein the reservation of the remote control by the external information processing apparatus that has transmitted the reserve request command is prohibited when an operation control for the editing process is being performed at the local operation controlling step.

43. An information processing method for an information processing apparatus of an information processing system, having a plurality of information processing apparatuses connected via a data bus corresponding to a predetermined communication format, for performing remote control of data and various commands transmitted and received between the information processing apparatuses, the information processing method comprising the steps of:

receiving data transmitting through the data bus;

executing a predetermined process corresponding to one of various commands received at the receiving step so as to enable an external information processing apparatus to perform a remote control of the local information processing apparatus;

receiving download data transmitted from a transmitting apparatus as an external information processing apparatus received at the receiving step and recording the download data to a predetermined record medium;

locally performing an operation control for a predetermined operation against the data reproducing step;

setting, as a reserve mode to be set corresponding to a reserve request command transmitting by the transmitting apparatus and received at the receiving step, the reserve request command causing a remote control against the local information processing apparatus to be reserved, the response processing step so as to permit a remote control by the transmitting apparatus and prohibit a remote control by other external information processing apparatuses; and setting, as a reserve mode to be set corresponding to the reserve request command transmitted by the transmitting apparatus and received at the receiving step, the reserve request command causing a remote control against the local information processing apparatus to be reserved, the local operation controlling step so as to enable a predetermined operation of those performed at the local operation controlling step and disable non-enabled operations, wherein after the download data has been transmitted, the transmitting apparatus transmits a reserve cancellation request command for requesting the information processing apparatus for a cancellation of a remote control, wherein the first reserve mode setting step is performed by causing the receiving step to permit all the other external information processing apparatuses connected to the data bus to perform a remote control of the local information processing apparatus corresponding to the reserve cancellation request command received at the receiving step so as to cancel the reserve mode, and wherein the second reserve mode setting step is performed by enabling all the operations at the local operation controlling step corresponding to the reserve cancellation request command received at the receiving step so as to cancel the reserve mode.

44. The operation processing method as set forth in claim 43, wherein the data bus corresponding to the predetermined communication format is an IEEE 1394 bus.

45. The information processing method as set forth in claim 43, wherein the transmitting apparatus does not transmit the reserve request command, and wherein the first reserve mode setting step and the second reserve mode setting step are performed by setting the reserve mode corresponding to a download start request command transmitted from the transmitting apparatus and received at the receiving step, the download start request command representing that the transmission of the download data has started.

46. The information processing method as set forth in claim 43, wherein the first reserve mode setting step is performed by causing the receiving step to permit all the other information processing apparatuses, connected to the data bus to perform a remote control of the local information processing apparatus corresponding to a download completion request command received at the receiving step, the download completion request representing that the transmission of the download data transmitted from the transmitting apparatus has been completed so as to cancel the reserve mode, and wherein the second reserve mode setting step is performed by enabling all the operations at the local operation controlling step corresponding to the download completion request command received at the receiving step, the download completion request command representing that the transmission of the download data transmitted from the transmitting apparatus has been completed, so as to cancel the reserve mode.

47. The information processing method as set forth in claim 43, further comprising the steps of:

detecting an occurrence of a bus reset on the data bus, wherein when at the bus reset detecting step an occurrence of a bus reset has been detected, the first reserve mode setting step is performed by causing the receiving step to permit all the other information processing apparatuses connected to the data bus to perform a remote control of the local information processing apparatus so as to cancel the reserve mode and the second reserve mode setting step is performed by enabling all the operations at the local operation controlling step so as to cancel the reserve mode.

48. The information processing method as set forth in claim 43, further comprising the step of:

transmitting a rejection response to the transmitting apparatus, the rejection response representing the rejection of the reservation of the remote control by the transmitting apparatus, when the operation state of the local information processing apparatus prohibits the reservation of the remote control by the transmitting apparatus as a response to the reserve request command or an equivalent command thereof received at the receiving step.

49. The information processing method as set forth in claim 48, wherein the reservation of the remote control by the transmitting apparatus is prohibited when the remote control of the local information processing apparatus is reserved by other than the transmitting apparatus.

50. The information processing method as set forth in claim 48, wherein the reservation of the remote control by the transmitting apparatus is prohibited when an operation control for the editing process is being performed at the local operation controlling step.

* * * * *